US012378379B2

(12) United States Patent
Kakali et al.

(10) Patent No.: US 12,378,379 B2
(45) Date of Patent: Aug. 5, 2025

(54) THERMAL INSULATION

(71) Applicant: IMERTECH SAS, Paris (FR)

(72) Inventors: Glikeria Kakali, Athens (GR); Aggeliki Skaropoulou, Athens (GR); Anna Gaki, Amaroussion (GR); Maria Taxiarchou, KavalasPikermi (GR); Konstantina Papakonstantinou, Athens (GR); Christos Dedeloudis, Athens (GR)

(73) Assignee: Imertech SAS, Paris (FR)

( * ) Notice: Subject to any disclaimer, the term of this patent is extended or adjusted under 35 U.S.C. 154(b) by 778 days.

(21) Appl. No.: 17/604,195

(22) PCT Filed: Apr. 16, 2020

(86) PCT No.: PCT/EP2020/060716

§ 371 (c)(1),
(2) Date: Oct. 15, 2021

(87) PCT Pub. No.: WO2020/212496

PCT Pub. Date: Oct. 22, 2020

(65) Prior Publication Data

US 2022/0185983 A1 Jun. 16, 2022

(30) Foreign Application Priority Data

Apr. 16, 2019 (EP) .................................... 19386025

(51) Int. Cl.

| | |
|---|---|
| ***C08J 9/30*** | (2006.01) |
| ***C04B 26/28*** | (2006.01) |
| ***C08J 3/075*** | (2006.01) |
| ***C08J 9/00*** | (2006.01) |
| ***C08J 9/28*** | (2006.01) |
| ***C08K 3/34*** | (2006.01) |
| ***C08K 7/26*** | (2006.01) |
| ***F16L 59/02*** | (2006.01) |

(52) U.S. Cl.

CPC ........... *C08J 9/0066* (2013.01); *C04B 26/285* (2013.01); *C08J 3/075* (2013.01); *C08J 9/0033* (2013.01); *C08J 9/0061* (2013.01); *C08J 9/283* (2013.01); *C08J 9/30* (2013.01); *C08K 3/346* (2013.01); *C08K 7/26* (2013.01); *F16L 59/028* (2013.01); *C08J 2201/0484* (2013.01); *C08J 2205/022* (2013.01); *C08J 2205/026* (2013.01); *C08J 2329/04* (2013.01); *C08J 2333/02* (2013.01); *C08J 2425/06* (2013.01); *C08L 2203/14* (2013.01)

(58) Field of Classification Search

CPC ........ C08J 9/0066; C08J 3/075; C08J 9/0033; C08J 9/0061; C08J 9/283; C08J 9/30; C08J 2201/0484; C08J 2205/022; C08J 2205/026; C08J 2329/04; C08J 2333/02; C08J 2425/06; C08J 2201/05; C08J 2205/02; C08J 2301/02; C08J 2389/00; C08J 9/28; C08J 2201/048; C04B 26/285; C04B 26/026; C04B 2111/28; C04B 30/00; C04B 38/10; C04B 14/064; C04B 38/0074; C08K 3/346; C08K 7/26; C08K 3/013; F16L 59/0028; C08L 1/02; C08L 89/00

USPC .......................................................... 264/109

See application file for complete search history.

(56) References Cited

U.S. PATENT DOCUMENTS

| | | | | |
|---|---|---|---|---|
| 4,203,773 | A * | 5/1980 | Temple | C04B 28/26 106/606 |
| 4,248,810 | A | 2/1981 | Erskine | |
| 5,569,513 | A | 10/1996 | Fidler et al. | |
| 6,136,216 | A | 10/2000 | Fidler et al. | |
| 9,469,738 | B1 | 10/2016 | Nair et al. | |
| 2005/0031844 | A1* | 2/2005 | Wang | C03C 11/00 428/304.4 |
| 2005/0192366 | A1 | 9/2005 | Ou et al. | |
| 2012/0112117 | A1* | 5/2012 | Vo | C08J 9/36 252/62 |
| 2012/0315315 | A1* | 12/2012 | Neubourg | A61K 47/10 424/59 |
| 2015/0159365 | A1 | 6/2015 | Goletto et al. | |

FOREIGN PATENT DOCUMENTS

| | | | | |
|---|---|---|---|---|
| CN | 107399992 A | 11/2017 | | |
| CN | 107867876 A | 4/2018 | | |
| EP | 0106246 A1 * | 4/1984 | | C04B 19/04 |
| JP | 2007-519780 A | 7/2007 | | |
| JP | 2013-534958 A | 9/2013 | | |
| JP | 2018-80841 A | 5/2018 | | |
| WO | WO 2005/098553 A2 | 10/2005 | | |
| WO | WO 2012/000184 A1 | 1/2012 | | |
| WO | WO 2019/070193 A1 | 4/2019 | | |

OTHER PUBLICATIONS

International Search Report and Written Opinion mailed Jun. 22, 2020, in International Application No. PCT/EP2020/060716.

* cited by examiner

*Primary Examiner* — Hannah J Pak

(74) *Attorney, Agent, or Firm* — Finnegan, Henderson, Farabow, Garrett & Dunner, LLP

(57) ABSTRACT

A method of manufacturing a thermally insulating product comprises: (a) forming a mixture comprising solvent and gel network former and optionally foaming agent; (b) dispersing a thermally insulating filler in the mixture; and (c) drying the mixture to form the thermally insulating product.

15 Claims, No Drawings

THERMAL INSULATION

CLAIM FOR PRIORITY

This application is a U.S. national phase entry under 35 U.S.C. § 371 from PCT International Application No. PCT/EP2020/060716, filed Apr. 16, 2020, which claims the benefit of priority of European Patent Application No. 19386025.1, filed Apr. 16, 2019, from both of which this application claims priority and both of which are incorporated herein by reference.

TECHNICAL FIELD

The present invention is directed to thermally insulating products and methods of manufacturing thermally insulating products.

BACKGROUND TO THE INVENTION

Commercially-available thermally insulating materials, used for the production of insulating products such as insulating boards or panels, include inorganic fibrous materials and organic foamed materials. Organic foamed materials are widely used, but a major disadvantage is their high flammability. When exposed to fire, such materials tends to transmit flames and release toxic gases. In contrast, inorganic fibrous materials can be susceptible to humidity and, compared to organic foamed materials, they have higher densities and thermal conductivities.

The production of alternative, lightweight, thermally insulating products would therefore be desirable.

SUMMARY OF THE INVENTION

According to a first aspect, the present invention is directed to a method of manufacturing a thermally insulating product, the method comprising: (a) forming a mixture comprising solvent and gel network former and optionally foaming agent; (b) dispersing a thermally insulating filler in the mixture; and (c) drying the mixture to form the thermally insulating product.

According to a second aspect, the present invention is directed to a thermally insulating product comprising a thermally insulating filler dispersed in an aerated matrix, for example wherein the thermally insulating filler is a granular material, for example a porous granular material such as an expanded silicate material, optionally wherein the expanded silicate material: (a) has: a loose bulk density, measured according to PI 200-77, of from about 15 kg/m$^3$ to about 450 kg/m$^3$, for example from about 20 kg/m$^3$ to about 100 kg/m$^3$, or from about 30 kg/m$^3$ to about 60 kg/m$^3$, or from about 20 kg/m$^3$ to about 30 kg/m$^3$, or from about 20 kg/m$^3$ to about 40 kg/m$^3$, or from about 55 kg/m$^3$ to about 100 kg/m$^3$, or from about 70 kg/m$^3$ to about 100 kg/m$^3$, preferably from about 30 kg/m$^3$ to about 60 kg/m$^3$; a compaction resistance, measured according to PI 306-80, of from about 3 PSI to about 350 PSI at 2", for example from about 3 PSI to about 200 PSI at 2", or from about 3 PSI to about 100 PSI at 2", or from about 3 PSI to about 10 PSI at 2", or from about 30 PSI to about 80 PSI at 2", or from about 40 PSI to about 75 PSI at 2", or from about 5 PSI to about 20 PSI at 2"; and/or a thermal conductivity, measured according to EN 12667, of from about 0.0300 W/mK to about 0.0700 W/mk, for example from about 0.0320 W/mK to about 0.0420 W/mK, from about 0.0350 W/mK to about 0.0400 W/mK, or from about 0.0360 W/mK to about 0.0410 W/mK, or from about 0.0320 W/mK to about 0.0340 W/mK, or from about 0.042 W/mK to about 0.055 W/mK, or from about 0.055 W/mK to about 0.070 W/mK; (b) comprises: from about 3 wt. % to about 30 wt. %, for example from about 3.5 wt. % to about 22 wt. %, or from about 8 wt. % to about 30 wt. %, or from about 13 wt. % to about 22 wt. %, of $X_2O$, X being an alkali metal such as Na or Li; from about 0 wt. % to about 20 wt. %, for example from about 5 wt. % to about 15 wt. %, or from about 0 wt. % to about 15 wt. %, or from about 5 wt. % to about 9 wt. %, of $Al_2O_3$; and from about 50 wt. % to about 90 wt. %, for example from about 60 wt. % to about 80 wt. %, or from about 50 wt. % to about 80 wt. %, or from about 60 wt. % to about 75 wt. %, of $SiO_2$; and optionally from about 0 wt. % to about 10 wt. %, for example from about 0.5 wt. % to about 5 wt. % of $H_2O$; and optionally wherein the expanded silicate material comprises less than about 5 wt. %, for example less than about 3.5 wt. %, of $B_2O_3$; (c) is manufactured by: forming a silicate mixture comprising: at least one silicate material; an alkali compound; and water; curing the silicate mixture to form a solid precursor; crushing and/or milling the solid precursor to form a granular expandable silicate material; and heating the granular expandable silicate material to form the expanded silicate material; and/or (d) is expanded natural perlite.

According to a third aspect, the present invention provides a thermally insulating product manufactured by the method according to the first aspect.

DETAILED DESCRIPTION OF THE INVENTION

It has surprisingly been found that lightweight thermally insulating products can be manufactured by forming a mixture comprising solvent and gel network former (and optionally foaming agent), dispersing a thermally insulating filler in the mixture, and drying the mixture to form the thermally insulating product. In particular, thermally insulating products which comprise thermally insulating filler dispersed in an aerated matrix can be manufactured in such a way.

Mixture

A first step in forming the thermally insulating product is forming a mixture comprising solvent and gel network former, and optionally foaming agent. Accordingly, the mixture typically comprises at least solvent and gel network former and may further comprise foaming agent.

The solvent is typically a liquid solvent. The solvent may be polar. For example, the solvent may comprise (e.g. be) one or more of the following: water, a carboxylic acid (e.g. methanoic (i.e. formic) acid or ethanoic (i.e. acetic) acid), an alcohol (e.g. methanol, ethanol, propanol or butanol), a ketone (e.g. butanone (i.e. methyl ethyl ketone) or propanone (i.e. acetone)). Alternatively, the solvent may be non-polar.

The gel network former may be any substance or mixture of substances capable of forming a gel network structure. In this regard, it will be appreciated that a gel is a non-fluid network structure expanded (typically throughout its entire volume) by a fluid. A gel network structure can comprise, for example: a covalently bonded (i.e. crosslinked) polymer network: a polymer network formed through the physical aggregation of polymer chains (e.g. caused by hydrogen bonds, crystallization, helix formation or complexation which results in regions of local order acting as network junction points); a polymer network formed through glassy junction points (e.g. a polymer network based on block copolymers); lamellar structures (e.g. mesophases, soap gels, phospholipids or clays); particulate disordered structures (e.g. flocculent precipitates, or globular or fibrillar protein gels). The fluid may be a liquid or a gas (such as the solvent).

In some embodiments, the gel network former comprises (e.g. is) a binding agent. The binding agent may be a naturally occurring substance, i.e. a natural binding agent. The binding agent may be a (e.g. naturally occurring) polymer. The binding agent may comprise (e.g. be) a protein (e.g. collagen, for example hydrolysed collagen (i.e. gelatine), or gluten) and/or a polysaccharide (e.g. a carbohydrate, for example starch, cellulose or glycogen, a vegetable gum, chitosan, or pectin).

In some embodiments, the gel network former comprises (e.g. is) a clay mineral (i.e. a clay). It will be appreciated that clay minerals are hydrous phyllosilicates, typically hydrous aluminium phyllosilicates, which include, but are not limited to, the following mineral groups: kaolins (i.e. kaolinites), smectites, illites, chlorites. The clay mineral may be a smectite clay mineral, such as montmorillonite, nontronite, beidellite, saponite, hectorite.

In some embodiments, the gel network former comprises a reinforcing agent or a combination of reinforcing agents, for example at least two reinforcing agents. It will be appreciated that a reinforcing agent is a substance which reinforces (i.e. strengthens and supports) a gel network structure formed predominantly by another gel network forming substance (i.e. a primary gel network former substance). The reinforcing agent may be a polymer. The polymer may be a synthetic polymer or a naturally occurring polymer (i.e. a natural polymer). Examples of suitable synthetic polymers are poly(vinyl alcohol) (PVA), sodium polyacrylate and polyethylenimine (PEI). The polymer may be a protein such as casein. The polymer may be a polysaccharide such as pectin, cellulose or alginate (e.g. ammonium alginate or calcium alginate). The polymer may be an elastomer. The polymer may be a rubber, e.g. a natural rubber. The reinforcing agent may comprise at least two (i.e. different) polymers. For example, the reinforcing agent may comprise poly(vinyl alcohol) (PVA) and sodium polyacrylate. The reinforcing agent may comprise at least two (i.e. different) polymers selected from: poly(vinyl alcohol) (PVA), sodium polyacrylate, polyethylenimine (PEI), casein, pectin, cellulose or alginate (e.g. ammonium alginate or calcium alginate), a rubber (e.g. natural rubber). The reinforcing agent may comprise (e.g. be) natural or synthetic fibres or whiskers (e.g. cellulose whiskers).

In some embodiments, the gel network former comprises binding agent and does not comprise clay mineral or reinforcing agent, for example the gel network former is binding agent. The binding agent may be a naturally occurring substance, i.e. a natural binding agent. The binding agent may be a (e.g. naturally occurring) polymer. The binding agent may comprise (e.g. be) a protein (e.g. collagen, for example hydrolysed collagen (i.e. gelatine), or gluten) and/or a polysaccharide (e.g. a carbohydrate, for example starch, cellulose or glycogen, a vegetable gum, chitosan, or pectin).

In some embodiments, the gel network former comprises a clay mineral and a reinforcing agent (or combination of reinforcing agents). The clay mineral may be a smectite clay mineral, such as montmorillonite, nontronite, beidellite, saponite, hectorite. The reinforcing agent may be a polymer. The polymer may be a synthetic polymer or a naturally occurring polymer (i.e. a natural polymer). Examples of suitable synthetic polymers are poly(vinyl alcohol) (PVA), sodium polyacrylate and polyethylenimine (PEI). The polymer may be a protein such as casein. The polymer may be a polysaccharide such as pectin, cellulose or alginate (e.g. ammonium alginate or calcium alginate). The polymer may be an elastomer. The polymer may be a rubber, e.g. a natural rubber. The reinforcing agent may comprise at least two (i.e. different) polymers. For example, the reinforcing agent may comprise poly(vinyl alcohol) (PVA) and sodium polyacrylate. The reinforcing agent may comprise at least two (i.e. different) polymers selected from: poly(vinyl alcohol) (PVA), sodium polyacrylate, polyethylenimine (PEI), casein, pectin, cellulose or alginate (e.g. ammonium alginate or calcium alginate), a rubber (e.g. natural rubber). The reinforcing agent may comprise (e.g. be) natural or synthetic fibres or whiskers (e.g. cellulose whiskers).

It will be appreciated that a foaming agent is a substance which facilitates formation of a foam in a mixture, for example agitation or blowing of the mixture. The foaming agent may further act to stabilise the foam. The foaming agent may be a surfactant. The surfactant may be a surfactant which lowers the surface tension of the solvent. The surfactant may be anionic, cationic, zwitterionic or non-ionic. The surface may be an alkyl sulfate such as ammonium dodecyl sulfate (i.e. ammonium lauryl sulfate (ALS)) or sodium dodecyl sulfate (SDS) (i.e. sodium lauryl sulfate (SLS)) or an alkyl-ether sulfate such as sodium lauryl ether sulfate (SLES) (i.e. sodium laureth sulfate) or sodium myreth sulfate.

In some embodiments, the gel network former comprises (e.g. is) a binding agent and the mixture comprises foaming agent. For example, in some embodiments, the mixture comprises solvent, binding agent and foaming agent.

In some embodiments, the gel networker comprises a clay mineral and, optionally, a reinforcing agent, and the mixture does not comprise foaming agent. For example, in some embodiments, the mixture is a foaming-agent-free mixture comprising (e.g. consisting of) solvent, clay mineral and reinforcing agent. However, in other embodiments, the mixture may comprise foaming agent in addition to a clay mineral and reinforcing agent.

It may be that the mixture formed by combining solvent and gel network former, and optionally foaming agent, is a gel. Accordingly, the method may comprise combining solvent and gel networker former, and optionally foaming agent, to form a gel.

In embodiments in which the mixture formed by combining solvent and gel network former, and optionally foaming agent, is a gel, the fluid which expands the gel network structure is (i.e. at least predominantly) typically the liquid solvent, at least prior to drying. It may be that following drying, the liquid solvent in the gel is replaced by another fluid, for example air. The gel may be an aerated (e.g. foamed) gel.

It may be that the mixture (following dispersal of the thermally insulating filler) comprises no less than about 0.5 wt. %, for example, no less than about 1 wt. %, or no less than about 2 wt. %, or no less than about 3 wt. %, or no less than about 3.5 wt. %, or no less than about 5 wt. %, or no less than about 10 wt. %, or no less than about 15 wt. %, or no less than about 20 wt. %, or no less than about 25 wt. %, of gel network former, based on the total weight of the mixture (following dispersal of the thermally insulating filler). It may be that the mixture (following dispersal of the thermally insulating filler) comprise no greater than about 70 wt. %, for example, no greater than about 65 wt. %, or no greater than about 60 wt. %, or no greater than about 55 wt. %, or no greater than about 50 wt. %, or no greater than about 45 wt. %, or no greater than about 40 wt. %, or no greater than about 35 wt. %, or no greater than about 30 wt. %, or no greater than about 25 wt. %, or no greater than about 20 wt. %, or no greater than about 15 wt. %, or no greater than about 10 wt. %, or no greater than about 7 wt. %, or no greater than about 5 wt. %, of gel network former, based on the total weight of the mixture (following dispersal of the thermally insulating filler). For example, the mixture (following dispersal of the thermally insulating filler) may comprise no less than about 0.5 wt. % and no greater than about 10 wt. %, of gel network former, based on the total weight of the mixture. It may be that the mixture (following dispersal of the thermally insulating filler) comprises from about 0.5 wt. % to about 70 wt. %, for example, from about 0.5 wt. % to about 50 wt. %, or from about 0.5 wt. % to about 30 wt. %, or from about 0.5 wt. % to about 10 wt. %, or from about 0.5 wt. % to about 7 wt. %, or from about 0.5 wt. % to about 5 wt. %, or from about 1 wt. % to about 60 wt. %, or from about 1 wt. % to about 50 wt. %, or from about 1 wt. % to about 40 wt. %, or from about 1 wt. % to about 30 wt. %, or from about 1 wt. % to about 20 wt. %, or from about 1 wt. % to about 15 wt. %, or from about 1 wt. % to about 10 wt. %, or from about 2 wt. % to about 70 wt. %, or from about 2 wt. % to about 60 wt. %, or from about 2 wt. % to about 50 wt. %, or from about 2 wt. % to about 40 wt. %, or from about 2 wt. % to about 30 wt. %, or from about 2 wt. % to about 20 wt. %, or from about 2 wt. % to about 15 wt. %, or from about 2 wt. % to about 10 wt. %, or from about 2 wt. % to about 7 wt. %, or from about 2 wt. % to about 5 wt. %, or from about 3 wt. % to about 10 wt. %, or from about 3 wt. % to about 7 wt. %, or from about 3 wt. % to about 5 wt. %, or from about 3.5 wt. % to about 10 wt. %, or from about 3.5 wt. % to about 7 wt. %, or from about 3.5 wt. % to about 5 wt. %, or from about 5 wt. % to about 70 wt. %, or from about 5 wt. % to about 60 wt. %, or from about 5 wt. % to about 50 wt. %, or from about 5 wt. % to about 40 wt. %, or from about 5 wt. % to about 30 wt. %, or from about 5 wt. % to about 20 wt. %, or from about 5 wt. % to about 15 wt. %, or from about 5 wt. % to about 10 wt. %, of gel network former, based on the total weight of the mixture (following dispersal of the thermally insulating filler).

For example, it may be that the mixture (following dispersal of the thermally insulating filler) comprises no less than about 0.5 wt. %, for example, no less than about 1 wt. %, or no less than about 2 wt. %, or no less than about 5 wt. %, or no less than about 10 wt. %, or no less than about 15 wt. %, or no less than about 20 wt. %, or no less than about 25 wt. %, of binding agent, based on the total weight of the mixture (following dispersal of the thermally insulating filler). It may be that the mixture (following dispersal of the thermally insulating filler) comprise no greater than about 70 wt. %, for example, no greater than about 65 wt. %, or no greater than about 60 wt. %, or no greater than about 55 wt. %, or no greater than about 50 wt. %, or no greater than about 45 wt. %, or no greater than about 40 wt. %, or no greater than about 35 wt. %, or no greater than about 30 wt. %, or no greater than about 25 wt. %, or no greater than about 20 wt. %, or no greater than about 15 wt. %, or no greater than about 10 wt. %, of binding agent, based on the total weight of the mixture (following dispersal of the thermally insulating filler). It may be that the mixture (following dispersal of the thermally insulating filler) comprises from about 0.5 wt. % to about 70 wt. %, for example, from about 1 wt. % to about 60 wt. %, or from about 1 wt. % to about 50 wt. %, or from about 1 wt. % to about 40 wt. %, or from about 1 wt. % to about 30 wt. %, or from about 1 wt. % to about 20 wt. %, or from about 1 wt. % to about 15 wt. %, or from about 1 wt. % to about 10 wt. %, or from about 2 wt. % to about 70 wt. %, or from about 2 wt. % to about 60 wt. %, or from about 2 wt. % to about 50 wt. %, or from about 2 wt. % to about 40 wt. %, or from about 2 wt. % to about 30 wt. %, or from about 2 wt. % to about 20 wt. %, or from about 2 wt. % to about 15 wt. %, or from about 2 wt. % to about 10 wt. %, or from about 5 wt. % to about 70 wt. %, or from about 5 wt. % to about 60 wt. %, or from about 5 wt. % to about 50 wt. %, or from about 5 wt. % to about 40 wt. %, or from about 5 wt. % to about 30 wt. %, or from about 5 wt. % to about 20 wt. %, or from about 5 wt. % to about 15 wt. %, or from about 5 wt. % to about 10 wt. %, of binding agent, based on the total weight of the mixture (following dispersal of the thermally insulating filler).

Alternatively, it may be that the mixture (following dispersal of the thermally insulating filler) comprises no less than about 0.5 wt. %, for example, no less than about 1 wt. %, or no less than about 2 wt. %, or no less than about 5 wt. %, or no less than about 10 wt. %, or no less than about 15 wt. %, or no less than about 20 wt. %, or no less than about 25 wt. %, of clay mineral and/or reinforcing agent, based on the total weight of the mixture (following dispersal of the thermally insulating filler). It may be that the mixture (following dispersal of the thermally insulating filler) comprise no greater than about 70 wt. %, for example, no greater than about 65 wt. %, or no greater than about 60 wt. %, or no greater than about 55 wt. %, or no greater than about 50 wt. %, or no greater than about 45 wt. %, or no greater than about 40 wt. %, or no greater than about 35 wt. %, or no greater than about 30 wt. %, or no greater than about 25 wt. %, or no greater than about 20 wt. %, or no greater than about 15 wt. %, or no greater than about 10 wt. %, of clay mineral and/or reinforcing agent, based on the total weight of the mixture (following dispersal of the thermally insulating filler). It may be that the mixture (following dispersal of the thermally insulating filler) comprises from about 0.5 wt. % to about 70 wt. %, for example, from about 1 wt. % to about 60 wt. %, or from about 1 wt. % to about 50 wt. %, or from about 1 wt. % to about 40 wt. %, or from about 1 wt. % to about 30 wt. %, or from about 1 wt. % to about 20 wt. %, or from about 1 wt. % to about 15 wt. %, or from about 1 wt. % to about 10 wt. %, or from about 2 wt. % to about 70 wt. %, or from about 2 wt. % to about 60 wt. %, or from about 2 wt. % to about 50 wt. %, or from about 2 wt. % to about 40 wt. %, or from about 2 wt. % to about 30 wt. %, or from about 2 wt. % to about 20 wt. %, or from about 2 wt. % to about 15 wt. %, or from about 2 wt. % to about 10 wt. %, or from about 5 wt. % to about 70 wt. %, or from about 5 wt. % to about 60 wt. %, or from about 5 wt. % to about 50 wt. %, or from about 5 wt. % to about 40 wt. %, or from about 5 wt. % to about 30 wt. %, or from about 5 wt. % to about 20 wt. %, or from about 5 wt. % to about 15 wt. %, or from about 5 wt. % to about 10 wt. %, of clay mineral and/or reinforcing agent, based on the total weight of the mixture (following dispersal of the thermally insulating filler).

It may be that the mixture comprises clay mineral and reinforcing agent in a ratio from about 1:5 to about 5:1, for example, from about 1:4 to about 4:1, or from about 1:3 to about 3:1, or from about 1:2 to about 2:1, or from about 1:1.5 to about 1.5:1, for example about 1:1.

It may be that the mixture (following dispersal of the thermally insulating filler) comprises no less than about 0.5 wt. %, for example, no less than about 1 wt. %, or no less than about 2 wt. %, or no less than about 5 wt. %, or no less than about 10 wt. %, or no less than about 20 wt. %, or no less than about 30 wt. %, or no less than about 40 wt. %, or no less than about 50 wt. %, or no less than about 60 wt. %, or no less than about 70 wt. %, or no less than about 80 wt. %, or no less than about 90 wt. %, of thermally insulating filler, based on the total weight of the mixture (following dispersal of the thermally insulating filler). It may be that the mixture (following dispersal of the thermally insulating filler) comprises no greater than about 99 wt. %, for example, no greater than about 98 wt. %, or no greater than about 95 wt. %, or no greater than about 90 wt. %, or no greater than about 80 wt. %, or no greater than about 70 wt. %, or no greater than about 60 wt. %, or no greater than about 50 wt. %, or no greater than about 40 wt. %, or no greater than about 30 wt. %, or no greater than about 20 wt. %, or no greater than about 10 wt. %, or no greater than about 5 wt. %, of thermally insulating filler, based on the total weight of the mixture (following dispersal of the thermally insulating filler). It may be that the mixture (following dispersal of the thermally insulating filler) comprises from about 0.5 wt. % to about 99 wt. %, for example, from about 1 wt. % to about 98 wt. %, or from about 2 wt. % to about 98 wt. %, or from about 5 wt. % to about 98 wt. %, or from about 10 wt. % to about 98 wt. %, or from about 20 wt. % to about 98 wt. %, or from about 30 wt. % to about 98 wt. %, or from about 40 wt. % to about 98 wt. %, or from about 50 wt. % to about 98 wt. %, or from about 60 wt. % to about 98 wt. %, or from about 70 wt. % to about 98 wt. %, or from about 5 wt. % to about 20 wt. %, or from about 5 wt. % to about 30 wt. %, or from about 5 wt. % to about 40 wt. %, or from about 5 wt. % to about 50 wt. %, or from about 10 wt. % to about 20 wt. %, or from about 10 wt. % to about 30 wt. %, or from about 10 wt. % to about 40 wt. %, or from about 10 wt. % to about 50 wt. %, or from about 1 wt. % to about 10 wt. %, or from about 1 wt. % to about 5 wt. %, of thermally insulating filler, based on the total weight of the mixture (following dispersal of the thermally insulating filler).

It may be that the mixture (following dispersal of the thermally insulating filler) comprises no less than about 0.01 wt. %, for example, no less than about 0.1 wt. %, or no less than about 0.5 wt. %, or no less than about 1 wt. %, of foaming agent, based on the total weight of the mixture (following dispersal of the thermally insulating filler). It may be that the mixture (following dispersal of the thermally insulating filler) comprises no greater than about 5 wt. %, for example, no greater than about 3 wt. %, or no greater than about 2 wt. %, or no greater than about 1 wt. %, of foaming agent, based on the total weight of the mixture (following dispersal of the thermally insulating filler). It may be that the mixture (following dispersal of the thermally insulating filler) comprises from about 0.01 wt. % to about 5 wt. %, for example, from about 0.1 wt. % to about 3 wt. %, or from about 0.1 wt % to about 2 wt. %, or from about 0.5 wt. % to about 3 wt. %, or from about 0.5 wt. % to about 2 wt. %, or from about 1 wt. % to about 2 wt. %, or from about 0.1 wt. % to about 1 wt. %, of foaming agent, based on the total weight of the mixture (following dispersal of the thermally insulating filler).

It may be that the mixture comprises one or more additives. The one or more additives may be selected from: thickeners, emulsifiers, viscosity modifiers, softeners, plasticizers, fire retardants (such as aluminium hydroxide), antibacterial agents, anti-mould agents (such as propionic acid), hydrophobic agents (such as silicone oil), and/or thermal conductivity regulating agents (such as graphite), or any combination thereof. For example, the mixture may further comprise one or more additives selected from: an anti-mould agent (such as propionic acid), an antibacterial agent, a fire retardant (such as aluminium hydroxide), a hydrophobic agent (such as silicone oil), stearic acid, a thermal conductivity regulating agent (such as graphite), or any combination thereof. For example, the one or more additives may include: aluminium hydroxide, ammonium polyphosphate, silica gel, potassium carbonate, borax, boric acid, melamine, silicone oil, calcium stearate, oleic acid, stearic acid, silanes, and/or graphite. It may be that the mixture (following dispersal of the thermally insulating filler) comprises no less than about 0.001 wt. %, for example, no less than about 0.01 wt. %, or no less than about 0.1 wt. %, or no less than about 0.3 wt. %, or no less than about 0.5 wt. %, or no less than about 1 wt. %, or no less than about 5 wt. %, or no less than about 10 wt. %, of additives, based on the total weight of the mixture (following dispersal of the thermally insulating filler). It may be that the mixture (following dispersal of the thermally insulating filler) comprises no greater than about 40 wt. %, for example, no greater than about 30 wt. %, or no greater than about 20 wt. %, or no greater than about 10 wt. %, or no greater than about 5 wt. %, or no greater than about 4 wt. %, or no greater than about 1 wt. %, or no greater than about 0.5 wt. %, of additives, based on the total weight of the mixture (following dispersal of the thermally insulating filler). It may be that the mixture (following dispersal of the thermally insulating filler) comprises from about 0.001 wt. % to about 40 wt. %, for example, from about 0.01 wt. % to about 30 wt. %, or from about 0.1 wt. % to about 30 wt. %, or from about 0.1 wt. % to about 20 wt. %, or from about 0.1 wt. % to about 10 wt. %, or from about 0.1 wt. % to about 5 wt. %, or from about 0.1 wt. % to about 4 wt. %, or from about 0.3 wt. % to about 4 wt. %, or from about 0.1 wt. % to about 1 wt. %, or from about 0.01 wt. % to about 1 wt. %, or from about 0.01 wt. % to about 0.5 wt. %, of additives, based on the total weight of the mixture (following dispersal of the thermally insulating filler).

It may be that the balance of the mixture (following dispersal of the thermally insulating filler), other than gel network former (e.g. binding agent, clay mineral and/or reinforcing agent), foaming agent, thermally insulating filler and additives, consists of solvent. For example, it may be that the mixture (following dispersal of the thermally insulating filler) comprises no less than about 1 wt. %, for example, no less than about 5 wt. %, or no less than about 10 wt. %, or no less than about 15 wt. %, or no less than about 20 wt. %, or no less than about 25 wt. %, or no less than about 30 wt. %, or no less than about 35 wt. %, or no less than about 40 wt. %, or no less than about 45 wt. %, or no less than about 50 wt. %, or no less than about 55 wt. %, or no less than about 60 wt. %, or no less than about 65 wt. %, or no less than about 70 wt. %, of solvent, based on the total weight of the mixture (following dispersal of the thermally insulating filler). It may be that the mixture (following dispersal of the thermally insulating filler) comprises no greater than about 90 wt. %, for example, no greater than about 80 wt. %, or no greater than about 70 wt. %, or no greater than about 60 wt. %, or no greater than about 50 wt. %, or no greater than about 40 wt. %, or no greater than about 30 wt. %, or no greater than about 20 wt. %, of solvent, based on the total weight of the mixture (following dispersal of the thermally insulating filler). It may be that the mixture (following dispersal of the thermally insulating filler) comprises from about 1 wt. % to about 90 wt. %, for example, from about 1 wt. % to about 80 wt. %, or from about 1 wt. % to about 70 wt. %, or from about 1 wt. % to about 60 wt. %, or from about 1 wt. % to about 50 wt. %, or from about 1 wt. % to about 40 wt. %, or from about 1 wt. % to about 30 wt. %, or from about 1 wt. % to about 20 wt. %, or from about 5 wt. % to about 90 wt. %, or from about 5 wt. % to about 80 wt. %, or from about 5 wt. % to about 70 wt. %, or from about 5 wt. % to about 60 wt. %, or from about 5 wt. % to about 50 wt. %, or from about 5 wt. % to about 40 wt. %, or from about 5 wt. % to about 30 wt. %, or from about 5 wt. % to about 20 wt. %, or from about 10 wt. % to about 90 wt. %, or from about 10 wt. % to about 80 wt. %, or from about 10 wt. % to about 70 wt. %, or from about 10 wt. % to about 60 wt. %, or from about 10 wt. % to about 50 wt. %, or from about 10 wt. % to about 40 wt. %, or from about 10 wt. % to about 30 wt. %, or from about 10 wt. % to about 20 wt. %, or from about 20 wt. % to about 90 wt. %, or from about 20 wt. % to about 80 wt. %, or from about 20 wt. % to about 70 wt. %, or from about 20 wt. % to about 60 wt. %, or from about 20 wt. % to about 50 wt. %, or from about 20 wt. % to about 40 wt. %, or from about 20 wt. % to about 30 wt. %, or from about 30 wt. % to about 90 wt. %, or from about 30 wt. % to about 80 wt. %, or from about 30 wt. % to about 70 wt. %, or from about 30 wt. % to about 60 wt. %, or from about 30 wt. % to about 50 wt. %, or from about 30 wt. % to about 40 wt. %, or from about 40 wt. % to about 90 wt. %, or from about 40 wt. % to about 80 wt. %, or from about 40 wt. % to about 70 wt. %, or from about 40 wt. % to about 60 wt. %, or from about 40 wt. % to about 50 wt. %, or from about 50 wt. % to about 80 wt. %, or from about 50 wt. % to about 70 wt. %, or from about 50 wt. % to about 60 wt. %, or from about 60 wt. % to about 80 wt. %, or from about 60 wt. % to about 70 wt. %, or from about 70 wt. % to about 80 wt. %, of solvent, based on the total weight of the mixture (following dispersal of the thermally insulating filler). It will be understood that, unless stated otherwise, that the wt. % of solvent in the mixture (following dispersal of the thermally insulating filler) is the wt. % of the solvent in the mixture immediately following dispersal of the thermally insulating filler and prior to drying the mixture.

In some embodiments, the mixture (following dispersal of the thermally insulating filler) comprises (e.g. consists of): from about 1 wt. % to about 10 wt. %, for example from about 4 wt. % to about 7 wt. %, for example about 6 wt. %, binding agent (e.g. natural binding agent such as gelatine); from about 0.1 wt. % to about 5 wt. %, for example from about 0.5 wt. % to about 1.5 wt. %, foaming agent (e.g. surfactant, for example SDS); from about 2 wt. % to about 98 wt. % thermally insulating filler (e.g. expanded silicate material); and from about 0 wt. % to about 30 wt. % additives; wherein the balance is solvent (e.g. liquid solvent such as water).

In some embodiments, the mixture (following dispersal of the thermally insulating filler) comprises (e.g. consists of): from about 1 wt. % to about 10 wt. %, for example from about 1.5 wt. % to about 5 wt. %, or from about 1.8 wt. % to about 5 wt. %, or from about 2 wt. % to about 6 wt. %, of clay mineral (e.g. a smectite clay mineral such as montmorillonite); from about 1 wt. % to about 10 wt. %, for example from about 1 wt. % to about 5 wt. %, or from about 2 wt. % to about 6 wt. %, of reinforcing agent (e.g. a polymeric reinforcing agent such as polyvinyl alcohol and/or sodium polyacrylate); from about 1 wt. % to about 98 wt. %, for example from about 1 wt. % to about 10 wt. %, or from about 10 wt. % to about 98 wt. %, thermally insulating filler (e.g. expanded silicate material); and from about 0 wt. % to about 30 wt. %, for example from about 0 wt. % to about 10 wt. % additives; wherein the balance is solvent (e.g. liquid solvent such as water).

Thermally Insulating Filler

It will be appreciated that the thermally insulating filler is a filler material having thermally insulating properties. The thermally insulating filler typically has a thermal conductivity, measured according to EN 12667, which is equal to or greater than the thermal conductivity of the matrix in which it is dispersed. The thermally insulating filler may have a thermal conductivity, measured according to EN 12667, of no less than about 0.0200 W/mK, for example, no less than about 0.0300 W/mK, or no less than about 0.0400 W/mK, or no less than about 0.0500 W/mK. The thermally insulating filler may have a thermal conductivity, measured according to EN 12667, of no greater than about 0.0800 W/mK, for example, no greater than about 0.0700 W/mK, or no greater than about 0.0600 W/mK. The thermally insulating filler may have a thermal conductivity, measured according to EN 12667, of from about 0.0200 W/mK to about 0.0800 W/mK, for example, from about 0.0200 W/mK to about 0.0700 W/mK, or from about 0.0200 W/mK to about 0.0600 W/mK, or from about 0.0300 W/mK to about 0.0800 W/mK, or from about 0.0300 W/mK to about 0.0700 W/mK, or from about 0.0300 W/mK to about 0.0600 W/mK, or from about 0.0400 W/mK to about 0.0800 W/mK, or from about 0.0400 W/mK to about 0.0700 W/mK, or from about 0.0400 W/mK to about 0.0600 W/mK, or from about 0.0500 W/mK to about 0.0800 W/mK, or from about 0.0500 W/mK to about 0.0700 W/mK, or from about 0.0500 W/mK to about 0.0600 W/mK.

The thermally insulating filler may be a granular material. The thermally insulating filler may be a porous material. The thermally insulating filler may be a porous granular material.

The thermally insulating filler may be an expanded material. That is to say, the thermally insulating filler may be formed by expanding an expandable material, for example by heating the expandable material. Expansion of the expandable material may be achieved by release of bound water on heating the material. Accordingly, the expandable material may be a hydrated material.

The thermally insulating filler may be a silicate material. For example, the thermally insulating filler may be an expanded silicate material.

Throughout this specification and the appended claims, the term "silicate material" refers to a material which contains a substantial proportion of silicon and oxygen. Silicate materials include silicate salts, wherein a silicate salt is a salt of the family of silicate anions having the general formula $SiO_{4-x}^{(4-2x)}$, where $0 \leq x < 2$, which includes orthosilicate, metasilicate and pyrosilicate anions. Silicate materials also include silicate glasses, wherein a silicate glass is an amorphous (i.e. non-crystalline) solid material formed predominantly from a covalently-bonded silicon dioxide network, i.e. the material commonly referred to simply as "glass". Silicate materials also include silicate minerals, wherein silicate minerals are rock-forming minerals having predominantly silicate anions or formed predominantly from silicon dioxide.

Silicate materials include aluminosilicate materials. The term "aluminosilicate material" refers to a silicate material which contains aluminium in addition to silicon and oxygen. Accordingly, aluminosilicate materials include aluminosilicate salts, aluminosilicate glasses and aluminosilicate minerals.

The expanded silicate material may have a loose bulk density, measured according to PI 200-77, of no less than about 15 kg/m$^3$, for example, no less than about 20 kg/m$^3$, or no less than about 30 kg/m$^3$, or no less than about 40 kg/m$^3$, or no less than about 50 kg/m$^3$, or no less than about 55 kg/m$^3$, or no less than about 60 kg/m$^3$, or no less than about 65 kg/m$^3$, or no less than about 70 kg/m$^3$. The expanded silicate material may have a loose bulk density, measured according to PI 200-77, of no greater than about 450 kg/m$^3$, for example, no greater than about 400 kg/m$^3$, or no greater than about 350 kg/m$^3$, or no greater than about 300 kg/m$^3$, or no greater than about 250 kg/m$^3$, or no greater than about 200 kg/m$^3$, or no greater than about 150 kg/m$^3$, or no greater than about 100 kg/m$^3$, or no greater than about 80 kg/m$^3$, or no greater than about 70 kg/m$^3$, or no greater than about 60 kg/m$^3$, or no greater than about 50 kg/m$^3$, or no greater than about 40 kg/m$^3$.

The expanded silicate material may have a loose bulk density, measured according to PI 200-77, of from about 15 kg/m$^3$ to about 450 kg/m$^3$, for example, from about 15 kg/m$^3$ to about 400 kg/m$^3$, or from about 15 kg/m$^3$ to about 350 kg/m$^3$, or from about 15 kg/m$^3$ to about 300 kg/m$^3$, or from about 15 kg/m$^3$ to about 250 kg/m$^3$, or from about 15 kg/m$^3$ to about 200 kg/m$^3$, or from about 15 kg/m$^3$ to about 150 kg/m$^3$, or from about 15 kg/m$^3$ to about 100 kg/m$^3$, or from about 15 kg/m$^3$ to about 80 kg/m$^3$, or from about 15 kg/m$^3$ to about 70 kg/m$^3$, or from about 15 kg/m$^3$ to about 60 kg/m$^3$, or from about 15 kg/m$^3$ to about 50 kg/m$^3$, or from about 15 kg/m$^3$ to about 40 kg/m$^3$.

The expanded silicate material may have a loose bulk density, measured according to PI 200-77, of from about 20 kg/m$^3$ to about 450 kg/m$^3$, for example, from about 20 kg/m$^3$ to about 400 kg/m$^3$, or from about 20 kg/m$^3$ to about 350 kg/m$^3$, or from about 20 kg/m$^3$ to about 300 kg/m$^3$, or from about 20 kg/m$^3$ to about 250 kg/m$^3$, or from about 20 kg/m$^3$ to about 200 kg/m$^3$, or from about 20 kg/m$^3$ to about 150 kg/m$^3$, or from about 20 kg/m$^3$ to about 100 kg/m$^3$, or from about 20 kg/m$^3$ to about 80 kg/m$^3$, or from about 20 kg/m$^3$ to about 70 kg/m$^3$, or from about 20 kg/m$^3$ to about 60 kg/m$^3$, or from about 20 kg/m$^3$ to about 50 kg/m$^3$, or from about 20 kg/m$^3$ to about 40 kg/m$^3$.

The expanded silicate material may have a loose bulk density, measured according to PI 200-77, of from about 30 kg/m$^3$ to about 450 kg/m$^3$, for example, from about 30 kg/m$^3$ to about 400 kg/m$^3$, or from about 30 kg/m$^3$ to about 350 kg/m$^3$, or from about 30 kg/m$^3$ to about 300 kg/m$^3$, or from about 30 kg/m$^3$ to about 250 kg/m$^3$, or from about 30 kg/m$^3$ to about 200 kg/m$^3$, or from about 30 kg/m$^3$ to about 150 kg/m$^3$, or from about 30 kg/m$^3$ to about 100 kg/m$^3$, or from about 30 kg/m$^3$ to about 80 kg/m$^3$, or from about 30 kg/m$^3$ to about 70 kg/m$^3$, or from about 30 kg/m$^3$ to about 60 kg/m$^3$, or from about 30 kg/m$^3$ to about 50 kg/m$^3$, or from about 30 kg/m$^3$ to about 40 kg/m$^3$.

The expanded silicate material may have a loose bulk density, measured according to PI 200-77, of from about 40 kg/m$^3$ to about 450 kg/m$^3$, for example, from about 40 kg/m$^3$ to about 400 kg/m$^3$, or from about 40 kg/m$^3$ to about 350 kg/m$^3$, or from about 40 kg/m$^3$ to about 300 kg/m$^3$, or from about 40 kg/m$^3$ to about 250 kg/m$^3$, or from about 40 kg/m$^3$ to about 200 kg/m$^3$, or from about 40 kg/m$^3$ to about 150 kg/m$^3$, or from about 40 kg/m$^3$ to about 100 kg/m$^3$, or from about 40 kg/m$^3$ to about 80 kg/m$^3$, or from about 40 kg/m$^3$ to about 70 kg/m$^3$, or from about 40 kg/m$^3$ to about 60 kg/m$^3$, or from about 40 kg/m$^3$ to about 50 kg/m$^3$, or from about 40 kg/m$^3$ to about 40 kg/m$^3$.

The expanded silicate material may have a loose bulk density, measured according to PI 200-77, of from about 50 kg/m$^3$ to about 450 kg/m$^3$, for example, from about 50 kg/m$^3$ to about 400 kg/m$^3$, or from about 50 kg/m$^3$ to about 350 kg/m$^3$, or from about 50 kg/m$^3$ to about 300 kg/m$^3$, or from about 50 kg/m$^3$ to about 250 kg/m$^3$, or from about 50 kg/m$^3$ to about 200 kg/m$^3$, or from about 50 kg/m$^3$ to about 150 kg/m$^3$, or from about 50 kg/m$^3$ to about 100 kg/m$^3$, or from about 50 kg/m$^3$ to about 80 kg/m$^3$, or from about 50 kg/m$^3$ to about 70 kg/m$^3$, or from about 50 kg/m$^3$ to about 60 kg/m$^3$, or from about 50 kg/m$^3$ to about 50 kg/m$^3$, or from about 50 kg/m$^3$ to about 40 kg/m$^3$.

The expanded silicate material may have a loose bulk density, measured according to PI 200-77, of from about 55 kg/m$^3$ to about 450 kg/m$^3$, for example, from about 55 kg/m$^3$ to about 400 kg/m$^3$, or from about 55 kg/m$^3$ to about 350 kg/m$^3$, or from about 55 kg/m$^3$ to about 300 kg/m$^3$, or from about 55 kg/m$^3$ to about 250 kg/m$^3$, or from about 55 kg/m$^3$ to about 200 kg/m$^3$, or from about 55 kg/m$^3$ to about 150 kg/m$^3$, or from about 55 kg/m$^3$ to about 100 kg/m$^3$, or from about 55 kg/m$^3$ to about 80 kg/m$^3$, or from about 55 kg/m$^3$ to about 70 kg/m$^3$, or from about 55 kg/m$^3$ to about 60 kg/m$^3$, or from about 55 kg/m$^3$ to about 50 kg/m$^3$, or from about 55 kg/m$^3$ to about 40 kg/m$^3$.

The expanded silicate material may have a loose bulk density, measured according to PI 200-77, of from about 60 kg/m$^3$ to about 450 kg/m$^3$, for example, from about 60 kg/m$^3$ to about 400 kg/m$^3$, or from about 60 kg/m$^3$ to about 350 kg/m$^3$, or from about 60 kg/m$^3$ to about 300 kg/m$^3$, or from about 60 kg/m$^3$ to about 250 kg/m$^3$, or from about 60 kg/m$^3$ to about 200 kg/m$^3$, or from about 60 kg/m$^3$ to about 150 kg/m$^3$, or from about 60 kg/m$^3$ to about 100 kg/m$^3$, or from about 60 kg/m$^3$ to about 80 kg/m$^3$, or from about 60 kg/m$^3$ to about 70 kg/m$^3$, or from about 60 kg/m$^3$ to about 60 kg/m$^3$, or from about 60 kg/m$^3$ to about 50 kg/m$^3$, or from about 60 kg/m$^3$ to about 40 kg/m$^3$.

The expanded silicate material may have a loose bulk density, measured according to PI 200-77, of from about 65 kg/m$^3$ to about 450 kg/m$^3$, for example, from about 65 kg/m$^3$ to about 400 kg/m$^3$, or from about 65 kg/m$^3$ to about 350 kg/m$^3$, or from about 65 kg/m$^3$ to about 300 kg/m$^3$, or from about 65 kg/m$^3$ to about 250 kg/m$^3$, or from about 65 kg/m$^3$ to about 200 kg/m$^3$, or from about 65 kg/m$^3$ to about 150 kg/m$^3$, or from about 65 kg/m$^3$ to about 100 kg/m$^3$, or from about 65 kg/m$^3$ to about 80 kg/m$^3$, or from about 65 kg/m$^3$ to about 70 kg/m$^3$, or from about 65 kg/m$^3$ to about 60 kg/m$^3$, or from about 65 kg/m$^3$ to about 50 kg/m$^3$, or from about 65 kg/m$^3$ to about 40 kg/m$^3$.

The expanded silicate material may have a loose bulk density, measured according to PI 200-77, of from about 70 kg/m$^3$ to about 450 kg/m$^3$, for example, from about 70 kg/m$^3$ to about 400 kg/m$^3$, or from about 70 kg/m$^3$ to about 350 kg/m$^3$, or from about 70 kg/m$^3$ to about 300 kg/m$^3$, or from about 70 kg/m$^3$ to about 250 kg/m$^3$, or from about 70 kg/m$^3$ to about 200 kg/m$^3$, or from about 70 kg/m$^3$ to about 150 kg/m$^3$, or from about 70 kg/m$^3$ to about 100 kg/m$^3$, or from about 70 kg/m$^3$ to about 80 kg/m$^3$, or from about 70 kg/m$^3$ to about 70 kg/m$^3$, or from about 70 kg/m$^3$ to about 60 kg/m$^3$, or from about 70 kg/m$^3$ to about 50 kg/m$^3$, or from about 70 kg/m$^3$ to about 40 kg/m$^3$.

For example the expanded silicate material may have a loose bulk density, measured according to PI 200-77, or from about 30 to about 60 kg/m$^3$.

The loose bulk density of a material may be measured by taking a sample of the material with a sampler (750-1000 mL), pouring the sample into a weighed cylinder, taking care not to disturb the sample causing settlement. The weight and volume of the sample is then recorded and the loose bulk density is calculated according to:

$$\text{Loose Bulk Density [kg/m}^3\text{]} = 1000 \times \text{Weight [g]/Volume [mL]}$$

In addition to, or in alternative to, any loose bulk density described above, the expanded silicate material may have a compaction resistance, measured according to PI 306-80, of no less than about 3 PSI at 2", for example, no less than about 5 PSI at 2", or no less than about 10 PSI at 2", or no less than about 20 PSI at 2", or no less than about 30 PSI at 2", or no less than about 40 PSI at 2". The expanded silicate material may have a compaction resistance, measured according to PI 306-80, of no greater than about 350 PSI at 2", for example, no greater than about 300 PSI at 2", or no greater than about 250 PSI at 2", or no greater than about 200 PSI at 2", or no greater than about 100 PSI at 2", or no greater than about 90 PSI at 2", or no greater than about 80 PSI at 2", or no greater than about 75 PSI at 2", or no greater than about 50 PSI at 2", or no greater than about 40 PSI at 2", or no greater than about 30 PSI at 2", or no greater than about 20 PSI at 2", or no greater than about 15 PSI at 2", or no greater than about 10 PSI at 2".

The expanded silicate material may have a compaction resistance, measured according to PI 306-80, from about 3 PSI to about 350 PSI at 2", for example, from about 3 PSI to about 300 PSI at 2", or from about 3 PSI to about 250 PSI at 2", or from about 3 PSI to about 200 PSI at 2", or from about 3 PSI to about 100 PSI at 2", or from about 3 PSI to about 90 PSI at 2", or from about 3 PSI to about 80 PSI at 2", or from about 3 PSI to about 75 PSI at 2", or from about 3 PSI to about 50 PSI at 2", or from about 3 PSI to about 40 PSI at 2", or from about 3 PSI to about 30 PSI at 2", or from about 3 PSI to about 20 PSI at 2", or from about 3 PSI to about 15 PSI at 2", or from about 3 PSI to about 10 PSI at 2".

The expanded silicate material may have a compaction resistance, measured according to PI 306-80, from about 5 PSI to about 350 PSI at 2", for example, from about 5 PSI to about 300 PSI at 2", or from about 5 PSI to about 250 PSI at 2", or from about 5 PSI to about 200 PSI at 2", or from about 5 PSI to about 100 PSI at 2", or from about 5 PSI to about 90 PSI at 2", or from about 5 PSI to about 80 PSI at 2", or from about 5 PSI to about 75 PSI at 2", or from about 5 PSI to about 50 PSI at 2", or from about 5 PSI to about 40 PSI at 2", or from about 5 PSI to about 30 PSI at 2", or from about 5 PSI to about 20 PSI at 2", or from about 5 PSI to about 15 PSI at 2", or from about 5 PSI to about 10 PSI at 2".

The expanded silicate material may have a compaction resistance, measured according to PI 306-80, from about 10 PSI to about 350 PSI at 2", for example, from about 10 PSI to about 300 PSI at 2", or from about 10 PSI to about 250 PSI at 2", or from about 10 PSI to about 200 PSI at 2", or from about 10 PSI to about 100 PSI at 2", or from about 10 PSI to about 90 PSI at 2", or from about 10 PSI to about 80 PSI at 2", or from about 10 PSI to about 75 PSI at 2", or from about 10 PSI to about 50 PSI at 2", or from about 10 PSI to about 40 PSI at 2", or from about 10 PSI to about 30 PSI at 2", or from about 10 PSI to about 20 PSI at 2", or from about 10 PSI to about 15 PSI at 2", or from about 10 PSI to about 10 PSI at 2".

The expanded silicate material may have a compaction resistance, measured according to PI 306-80, from about 20 PSI to about 350 PSI at 2", for example, from about 20 PSI to about 300 PSI at 2", or from about 20 PSI to about 250 PSI at 2", or from about 20 PSI to about 200 PSI at 2", or from about 20 PSI to about 100 PSI at 2", or from about 20 PSI to about 90 PSI at 2", or from about 20 PSI to about 80 PSI at 2", or from about 20 PSI to about 75 PSI at 2", or from about 20 PSI to about 50 PSI at 2", or from about 20 PSI to about 40 PSI at 2", or from about 20 PSI to about 30 PSI at 2", or from about 20 PSI to about 20 PSI at 2", or from about 20 PSI to about 15 PSI at 2", or from about 20 PSI to about 10 PSI at 2".

The expanded silicate material may have a compaction resistance, measured according to PI 306-80, from about 30 PSI to about 350 PSI at 2", for example, from about 30 PSI to about 300 PSI at 2", or from about 30 PSI to about 250 PSI at 2", or from about 30 PSI to about 200 PSI at 2", or from about 30 PSI to about 100 PSI at 2", or from about 30 PSI to about 90 PSI at 2", or from about 30 PSI to about 80 PSI at 2", or from about 30 PSI to about 75 PSI at 2", or from about 30 PSI to about 50 PSI at 2", or from about 30 PSI to about 40 PSI at 2", or from about 30 PSI to about 30 PSI at 2", or from about 30 PSI to about 20 PSI at 2", or from about 30 PSI to about 15 PSI at 2", or from about 30 PSI to about 10 PSI at 2".

The expanded silicate material may have a compaction resistance, measured according to PI 306-80, from about 40 PSI to about 3500 PSI at 2", for example, from about 40 PSI to about 300 PSI at 2", or from about 40 PSI to about 250 PSI at 2", or from about 40 PSI to about 200 PSI at 2", or from about 40 PSI to about 100 PSI at 2", or from about 40 PSI to about 90 PSI at 2", or from about 40 PSI to about 80 PSI at 2", or from about 40 PSI to about 75 PSI at 2", or from about 40 PSI to about 50 PSI at 2", or from about 40 PSI to about 40 PSI at 2", or from about 40 PSI to about 30 PSI at 2", or from about 40 PSI to about 20 PSI at 2", or from about 40 PSI to about 15 PSI at 2", or from about 40 PSI to about 10 PSI at 2".

Additionally or alternatively, the expanded silicate material may have a compaction resistance, measured according to PI 306-80, of no less than about 0.5 PSI at 1", for example, no less than about 1 PSI at 1", or no less than about 2 PSI at 1", or no less than about 2.5 PSI at 1". The expanded silicate material may have a compaction resistance, measured according to PI 306-80, of no greater than about 50 PSI at 1", for example, no greater than about 40 PSI at 1", or no greater than about 30 PSI at 1". The expanded silicate material may have a compaction resistance, measured according to PI 306-80, from about 0.5 PSI to about 50 PSI at 1", for example, from about 1 PSI to about 40 PSI at 1", or from about 2 PSI to about 40 PSI at 1", or from about 2.5 PSI to about 30 PSI at 1".

Compaction resistance of a material may be measured by taking a representative sample of the material of about 500 mL volume with a sampler. The sample is put in a container of a computer-controlled hydraulic press. The container is shaken 25 times to settle the sample. Then another 250 mL of the material is added to the container. The sample is allowed to settle again by shaking another 25 times. The sample is then levelled on the top of the container. The sample is pressed under the automated hydraulic press at a speed of 20 mm/min and a maximum load of 6800 N (or 2800N for very lightweight samples). The computer continuously records the load and displacement of the sample and plots the data as a graph. Once the maximum load is reached, the instrument calculates the total displacement and the zero deformation point. The load/displacement data are exported, and the respective load values (B) for 1 inch (i.e. 1") and 2 inch (i.e. 2") displacement (adding the zero deformation point, i.e. 1 inch deformation distance (mm) =25.4+zero deformation point (mm)) are used to calculate the compaction resistance according to:

$$\text{Compaction Resistance [PSI]}=(B\ [\text{N}]/A\ [\text{m}^2])*0.000145037738007$$

where A is the cross-sectional area of the container.

In addition to, or in alternative to, the loose bulk density and/or compaction resistance described above, the expanded silicate material may have a thermal conductivity (i.e. A, lambda value), measured according to EN 12667, of no less than about 0.0300 W/mK, for example, no less than about 0.0310 W/mK, or no less than about 0.0320 W/mK, or no less than about 0.0330 W/mK, or no less than about 0.0340 W/mK, or no less than about 0.0350 W/mK, or no less than about 0.0360 W/mK. The expanded silicate material may have a thermal conductivity, measured according to EN 12667, of no greater than about 0.0700 W/mK, for example, no greater than about 0.0600 W/mK, or no greater than about 0.0500 W/mK, or no greater than about 0.0490 W/mK, or no greater than about 0.0480 W/mK, or no greater than about 0.0470 W/mK, or no greater than about 0.0460 W/mK, or no greater than about 0.0450 W/mK, or no greater than about 0.0440 W/mK, or no greater than about 0.0430 W/mK, or no greater than about 0.0420 W/mK, or no greater than about 0.0410 W/mK, or no greater than about 0.0400 W/mK, or no greater than about 0.0390 W/mK, or no greater than about 0.0380 W/mK, or no greater than about 0.0370 W/mK, or no greater than about 0.0360 W/mK, or no greater than about 0.0350 W/mK, or no greater than about 0.0340 W/mK.

The expanded silicate material may have a thermal conductivity (i.e. A, lambda value), measured according to EN 12667, of from about 0.0300 W/mK to about 0.0700 W/mK, for example, or from about 0.0300 W/mK to about 0.0600 W/mK, or from about 0.0300 W/mK to about 0.0500 W/mK, from about 0.0300 W/mK to about 0.0490 W/mK, or from about 0.0300 W/mK to about 0.0480 W/mK, or from about 0.0300 W/mK to about 0.0470 W/mK, or from about 0.0300 W/mK to about 0.0460 W/mK, or from about 0.0300 W/mK to about 0.0450 W/mK, or from about 0.0300 W/mK to about 0.0440 W/mK, or from about 0.0300 W/mK to about 0.0430 W/mK, or from about 0.0300 W/mK to about 0.0420 W/mK, or from about 0.0300 W/mK to about 0.0410 W/mK, or from about 0.0300 W/mK to about 0.0400 W/mK, or from about 0.0300 W/mK to about 0.0390 W/mK, or from 0.0300 W/mK to about 0.0380 W/mK, or from about 0.0300 W/mK to about 0.0370 W/mK, or from about 0.0300 W/mK to about 0.0360 W/mK, or from about 0.0300 W/mK to about 0.0350 W/mK, or from about 0.0300 W/mK to about 0.0340 W/mK.

The expanded silicate material may have a thermal conductivity (i.e. A, lambda value), measured according to EN 12667, of from about 0.0310 W/mK to about 0.0500 W/mK, for example, from about 0.0310 W/mK to about 0.0490 W/mK, or from about 0.0310 W/mK to about 0.0480 W/mK, or from about 0.0310 W/mK to about 0.0470 W/mK, or from about 0.0310 W/mK to about 0.0460 W/mK, or from about 0.0310 W/mK to about 0.0450 W/mK, or from about 0.0310 W/mK to about 0.0440 W/mK, or from about 0.0310 W/mK to about 0.0430 W/mK, or from about 0.0310 W/mK to about 0.0420 W/mK, or from about 0.0310 W/mK to about 0.0410 W/mK, or from about 0.0310 W/mK to about 0.0400 W/mK, or from about 0.0310 W/mK to about 0.0390 W/mK, or from 0.0310 W/mK to about 0.0380 W/mK, or from about 0.0310 W/mK to about 0.0370 W/mK, or from about 0.0310 W/mK to about 0.0360 W/mK, or from about 0.0310 W/mK to about 0.0350 W/mK, or from about 0.0310 W/mK to about 0.0340 W/mK.

The expanded silicate material may have a thermal conductivity (i.e. A, lambda value), measured according to EN 12667, of from about 0.0320 W/mK to about 0.0500 W/mK, for example, from about 0.0320 W/mK to about 0.0490 W/mK, or from about 0.0320 W/mK to about 0.0480 W/mK, or from about 0.0320 W/mK to about 0.0470 W/mK, or from about 0.0320 W/mK to about 0.0460 W/mK, or from about 0.0320 W/mK to about 0.0450 W/mK, or from about 0.0320 W/mK to about 0.0440 W/mK, or from about 0.0320 W/mK to about 0.0430 W/mK, or from about 0.0320 W/mK to about 0.0420 W/mK, or from about 0.0320 W/mK to about 0.0410 W/mK, or from about 0.0320 W/mK to about 0.0400 W/mK, or from about 0.0320 W/mK to about 0.0390 W/mK, or from 0.0320 W/mK to about 0.0380 W/mK, or from about 0.0320 W/mK to about 0.0370 W/mK, or from about 0.0320 W/mK to about 0.0360 W/mK, or from about 0.0320 W/mK to about 0.0350 W/mK, or from about 0.0320 W/mK to about 0.0340 W/mK.

The expanded silicate material may have a thermal conductivity (i.e. A, lambda value), measured according to EN 12667, of from about 0.0330 W/mK to about 0.0500 W/mK, for example, from about 0.0330 W/mK to about 0.0490 W/mK, or from about 0.0330 W/mK to about 0.0480 W/mK, or from about 0.0330 W/mK to about 0.0470 W/mK, or from about 0.0330 W/mK to about 0.0460 W/mK, or from about 0.0330 W/mK to about 0.0450 W/mK, or from about 0.0330 W/mK to about 0.0440 W/mK, or from about 0.0330 W/mK to about 0.0430 W/mK, or from about 0.0330 W/mK to about 0.0420 W/mK, or from about 0.0330 W/mK to about 0.0410 W/mK, or from about 0.0330 W/mK to about 0.0400 W/mK, or from about 0.0330 W/mK to about 0.0390 W/mK, or from 0.0330 W/mK to about 0.0380 W/mK, or from about 0.0330 W/mK to about 0.0370 W/mK, or from about 0.0330 W/mK to about 0.0360 W/mK, or from about 0.0330 W/mK to about 0.0350 W/mK, or from about 0.0330 W/mK to about 0.0340 W/mK.

The expanded silicate material may have a thermal conductivity (i.e. A, lambda value), measured according to EN 12667, of from about 0.0340 W/mK to about 0.0500 W/mK, for example, from about 0.0340 W/mK to about 0.0490 W/mK, or from about 0.0340 W/mK to about 0.0480 W/mK, or from about 0.0340 W/mK to about 0.0470 W/mK, or from about 0.0340 W/mK to about 0.0460 W/mK, or from about 0.0340 W/mK to about 0.0450 W/mK, or from about 0.0340 W/mK to about 0.0440 W/mK, or from about 0.0340 W/mK to about 0.0430 W/mK, or from about 0.0340 W/mK to about 0.0420 W/mK, or from about 0.0340 W/mK to about 0.0410 W/mK, or from about 0.0340 W/mK to about 0.0400 W/mK, or from about 0.0340 W/mK to about 0.0390 W/mK, or from 0.0340 W/mK to about 0.0380 W/mK, or from about 0.0340 W/mK to about 0.0370 W/mK, or from about 0.0340 W/mK to about 0.0360 W/mK, or from about 0.0340 W/mK to about 0.0350 W/mK.

The expanded silicate material may have a thermal conductivity (i.e. A, lambda value), measured according to EN 12667, of from about 0.0350 W/mK to about 0.0500 W/mK, for example, from about 0.0350 W/mK to about 0.0490 W/mK, or from about 0.0350 W/mK to about 0.0480 W/mK, or from about 0.0350 W/mK to about 0.0470 W/mK, or from about 0.0350 W/mK to about 0.0460 W/mK, or from about 0.0350 W/mK to about 0.0450 W/mK, or from about 0.0350 W/mK to about 0.0440 W/mK, or from about 0.0350 W/mK to about 0.0430 W/mK, or from about 0.0350 W/mK to about 0.0420 W/mK, or from about 0.0350 W/mK to about 0.0410 W/mK, or from about 0.0350 W/mK to about 0.0400 W/mK, or from about 0.0350 W/mK to about 0.0390 W/mK, or from 0.0350 W/mK to about 0.0380 W/mK, or from about 0.0350 W/mK to about 0.0370 W/mK, or from about 0.0350 W/mK to about 0.0360 W/mK.

The expanded silicate material may have a thermal conductivity (i.e. A, lambda value), measured according to EN 12667, of from about 0.0360 W/mK to about 0.0500 W/mK, for example, from about 0.0360 W/mK to about 0.0490 W/mK, or from about 0.0360 W/mK to about 0.0480 W/mK, or from about 0.0360 W/mK to about 0.0470 W/mK, or from about 0.0360 W/mK to about 0.0460 W/mK, or from about 0.0360 W/mK to about 0.0450 W/mK, or from about 0.0360 W/mK to about 0.0440 W/mK, or from about 0.0360 W/mK to about 0.0430 W/mK, or from about 0.0360 W/mK to about 0.0420 W/mK, or from about 0.0360 W/mK to about 0.0410 W/mK, or from about 0.0360 W/mK to about 0.0400 W/mK, or from about 0.0360 W/mK to about 0.0390 W/mK, or from 0.0360 W/mK to about 0.0380 W/mK, or from about 0.0360 W/mK to about 0.0370 W/mK.

The expanded silicate material may have a thermal conductivity (i.e. A, lambda value), measured according to EN 12667, of from about 0.042 W/mK to about 0.055 W/mK, or from about 0.055 W/mK to about 0.070 W/mK.

For example, it may be that the expanded silicate material has: a loose bulk density, measured according to PI 200-77, of from about 15 $kg/m^3$ to about 450 $kg/m^3$, for example from about 20 $kg/m^3$ to about 100 $kg/m^3$, or from about 20 $kg/m^3$ to about 30 $kg/m^3$, or from about 20 $kg/m^3$ to about 40 $kg/m^3$, or from about 55 $kg/m^3$ to about 100 $kg/m^3$, or from about 70 $kg/m^3$ to about 100 $kg/m^3$; a compaction resistance, measured according to PI 306-80, of from about 3 PSI to about 100 PSI at 2", for example from about 3 PSI to about 10 PSI at 2", or from about 30 PSI to about 80 PSI at 2", or from about 40 PSI to about 75 PSI at 2", or from about 5 PSI to about 20 PSI at 2"; and/or a thermal conductivity, measured according to EN 12667, of from about 0.0300 W/mK to about 0.0700 W/mk, for example from about 0.0320 W/mK to about 0.0420 W/mK, from about 0.0350 W/mK to about 0.0400 W/mK, or from about 0.0360 W/mK to about 0.0410 W/mK, or from about 0.0320 W/mK to about 0.0340 W/mK, or from about 0.042 W/mK to about 0.055 W/mK, or from about 0.055 W/mK to about 0.070 W/mK.

The thermal conductivity of a material can be measured using a NetzschHFM 436/3 Lambda Heat Flow meter. Samples of the material are held at standard laboratory conditions before the measurement is taken. Loose fill samples are placed in a custom frame constructed from a 30×30×2.5 cm XPS piece, with inner dimensions 15×15 cm, with a thin plastic membrane on the bottom to hold the loose fill sample in place. The mean temperature and the temperature difference between the cold and hot plate are both set to 10° C.

It may be that the expanded silicate material has a water absorption (in grams of water absorbed per gram of expanded silicate material) of no less than about 0.1 g/g, for example, no less than about 0.2 g/g, or no less than about 0.5 g/g, or no less than about 1 g/g. It may be that the expanded silicate material has a water absorption (in grams of water absorbed per gram of expanded silicate material) of no greater than about 15 g/g, for example, no greater than about 10 g/g. It may be that the expanded silicate material has a water absorption (in grams of water absorbed per gram of expanded silicate material) from about 0.1 g/g to about 15 g/g, for example, from about 0.2 g/g to about 15 g/g, or from about 0.5 g/g to about 10 g/g, or from about 1 g/g to about 10 g/g.

Water absorption of a granular material may be measured by first measuring exactly 500 ml of the granular material and recording the weight of the sample. The 500 ml sample is transferred to a 500 ml cylinder with a very fine sieve at the bottom sufficient to retain the granular material within the cylinder but also to allow water to pass therethrough. The cylinder is tapped 10 times to settle the material. 250 g of water is weighed and poured into the cylinder with the granular material. A timer is started and the mass of water which passes through the material and out of the cylinder is measured after 3, 5, 7, 10 and 30 minutes. The water absorption of the granular material is then the mass of water which has not passed out of the cylinder (i.e. the mass of water which has been absorbed) per mass of granular material in the cylinder (expressed in g/g).

It may be that the expanded silicate material has a water repellency of no less than about 40%, for example, no less than about 50%, or no less than about 60%, or no less than about 65%. It may be that the expanded silicate material has a water repellency of no greater than about 95%, for example, no greater than about 90%. It may be that the expanded silicate material has a water repellency of from about 40% to about 95%, for example, from about 50% to about 95%, or from about 60% to about 95%, or from about 65% to about 90%.

Water repellency of a material may be determined by taking a representative sample of the material with a sampler (500 mL) and weighing the sample. The sample is transferred to a graduated cylinder with the perforated base using a funnel. The cylinder is allowed to fall from a height of about 7.5 cm ten times in order for the sample to settle. 250 g of deionized water is poured into the cylinder with the sample slowly to avoid water losses or cavitation in the sample. Water passing through the sample is collected in a weighed glass beaker below the cylinder every 3 minutes, 5 minutes, 7 minutes, 10 minutes and 30 minutes and the water in the glass beaker is weighed. When the 30 minutes are over, the cylinder is tilted through 45° to allow any remaining water to drip out of the cylinder. The water absorption for 30 min is then calculated according to the following equation:

$$w.a. = \frac{250 - W_{H_2O,30min}}{A(g)}$$

Where $W_{H2O,30\ min}$ is the mass of water collected after 30 minutes and A(g) is the mass of 500 ml of the granular material.

It may be that the expanded silicate material contains no less than about 95%, for example, no less than about 97%, or no less than about 99%, of floaters. It may be that the expanded silicate material contains up to 100% floaters. It may be that the expanded silicate material contains from about 95% to about 100%, for example, from about 97% to about 100%, or from about 99% to about 100%, of floaters.

The number of floaters in a sample of material is determined using an Imhoff cone. In particular, 600 mL deionized water is poured into the Imhoff cone which is fixed vertically in a rack. An additional 50 mL of deionized water containing 20 drops of bromothymol blue or methylene blue indicator are added to the cone. The indicator is used to facilitate reading of the cone with the colour it gives to the water. A representative sample of 300 mL of the material to be investigated is taken with a sampler. The exact volume (A mL) and the weight (B g) of the sample are recorded, and the sample is added to the cone. An additional 300 mL deionized water is added over the sample into the cone so that a total of 950 mL water is in the Imhoff cone. The sample and the water are stirred with a rod 20 times. The walls at the top of the cone and the rod are rinsed with 50 mL deionized water (so that a total of 1000 mL water is present in the cone) so as to flush any grains that are stuck on to them into the cone. The cone and its contents are allowed to stand for 45 minutes. After this time, the volume (C mL) of the cone which corresponds to the level of dark particles (i.e. "sinks") in the bottom of the cone (C mL) is recorded. The volume (D mL) of the cone which corresponds to the level of total sediment at the bottom of the cone is also recorded. The percentage of "sink", "shattered" and "floaters" is then determined according to the following equations:

$$\text{sinks}\,(\%\ v/v) = 100 * \frac{C(\text{mL})}{A(\text{mL})}$$

$$\text{shattered}\,(\%\ v/v) = 100 * \frac{D(\text{mL}) - C(\text{mL})}{A(\text{mL})}$$

$$\text{floaters}\,(\%\ v/v) = 100 * \frac{A(\text{mL}) - D(\text{mL})}{A(\text{mL})}$$

It may be that the expanded silicate material has a pH, measured according to PI 202-77, of no less than about 8, for example, no less than about 9, or no less than about 9.5. It may be that the expanded silicate material has a pH, measured according to PI 202-77, of no greater than about 12, for example, no greater than about 11. It may be that the expanded silicate material has a pH, measured according to PI 202-77, of from about 8 to about 12, for example, from about 9 to about 11, or from about 9.5 to about 11. The pH of an expanded silicate material may be determined by mixing 0.5 g of the granular material with 50 mL deionized water and stirring for 30 min at room temperature. During the last 2 minutes of stirring the pH value is measured (for example, using a pH probe) and recorded. Natural perlite may have a pH up to about 8.5.

It may be that the expanded silicate material has a skeletal density of no less than about 0.4 g/cm$^3$, for example, no less than about 0.5 g/cm$^3$, or no less than about 0.6 g/cm$^3$. It may be that the expanded silicate material has a skeletal density of no greater than about 2 g/cm$^3$, for example, no greater than about 1.8 g/cm$^3$, or no greater than about 1.6 g/cm$^3$. It may be that the expanded silicate material has a skeletal density from about 0.4 g/cm$^3$ to about 2 g/cm$^3$, for example, from about 0.5 g/cm$^3$ to about 1.8 g/cm$^3$, or from about 0.6 g/cm$^3$ to about 1.6 g/cm$^3$. The skeletal density of a porous material (i.e. the absolute density of the porous material determined using a volume which excludes both the volume of any pores in the porous material and the volume of any void spaces between particles) may be measured using a stereopycnometer, for example as available from Quantachrome.

The expanded silicate material may comprise no less than about 0.01 wt. %, for example, no less than about 0.1 wt. %, or no less than about 0.2 wt. %, or no less than about 0.3 wt. %, or no less than about 0.4 wt. %, or no less than about 1 wt. %, or no less than about 1.5 wt. %, or no less than about 2 wt. %, or no less than about 3 wt. %, of $X_2O$, wherein X is an alkali metal such as Na or Li. The expanded silicate material may comprise no more than about 25 wt. %, for example, no more than about 20 wt. %, or no more than about 15 wt. %, or no more than about 10 wt. %, or no more than about 5 wt. %, or no more than about 3 wt. %, or no more than about 2 wt. %, or no more than about 1 wt. %, or no more than about 0.6 wt. %, of $X_2O$, wherein X is an alkali metal such as Na or Li. The expanded silicate material may comprise from about 0.01 wt. % to about 25 wt. %, for example, from about 0.01 wt. % to about 20 wt. %, or from about 0.01 wt. % to about 15 wt. %, or from about 0.01 wt. % to about 10 wt. %, or from about 0.1 wt. % to about 20 wt. %, or from about 0.1 wt. % to about 15 wt. %, or from about 0.1 wt. % to about 10 wt. %, or from about 1 wt. % to about 20 wt. %, or from about 1 wt. % to about 15 wt. %, or from about 1 wt. % to about 10 wt. %, or from about 3 wt. % to about 20 wt. %, or from about 3 wt. % to about 15 wt. %, or from about 3 wt. % to about 10 wt. %, or from about 0.1 wt. % to about 5 wt. %, or from about 0.2 wt. % to about 5 wt. %, or from about 0.2 wt. % to about 1 wt. %, or from about 0.4 wt. % to about 1 wt. %, or from about 0.4 wt. % to about 0.6 wt. %, or from about 1 wt. % to about 3 wt. %, or from about 1 wt. % to about 2 wt. %, of $X_2O$, wherein X is an alkali metal such as Na or Li.

For example, the expanded silicate material may comprise no less than about 0.01 wt. %, for example, no less than about 0.1 wt. %, or no less than about 0.2 wt. %, or no less than about 0.3 wt. %, or no less than about 0.4 wt. %, or no less than about 1 wt. %, or no less than about 1.5 wt. %, or no less than about 2 wt. %, or no less than about 3 wt. %, of $Na_2O$. The expanded silicate material may comprise no more than about 25 wt. %, for example, no more than about 20 wt. %, or no more than about 15 wt. %, or no more than about 10 wt. %, or no more than about 5 wt. %, or no more than about 3 wt. %, or no more than about 2 wt. %, or no more than about 1 wt. %, or no more than about 0.6 wt. %, of $Na_2O$. The expanded silicate material may comprise from about 0.01 wt. % to about 25 wt. %, for example, from about 0.01 wt. % to about 20 wt. %, or from about 0.01 wt. % to about 15 wt. %, or from about 0.01 wt. % to about 10 wt. %, or from about 0.1 wt. % to about 20 wt. %, or from about 0.1 wt. % to about 15 wt. %, or from about 0.1 wt. % to about 10 wt. %, or from about 1 wt. % to about 20 wt. %, or from about 1 wt. % to about 15 wt. %, or from about 1 wt. % to about 10 wt. %, or from about 3 wt. % to about 20 wt. %, or from about 3 wt. % to about 15 wt. %, or from about 3 wt. % to about 10 wt. %, or from about 0.1 wt. % to about 5 wt. %, or from about 0.2 wt. % to about 5 wt. %, or from about 0.2 wt. % to about 1 wt. %, or from about 0.4 wt. % to about 1 wt. %, or from about 0.4 wt. % to about 0.6 wt. %, or from about 1 wt. % to about 3 wt. %, or from about 1 wt. % to about 2 wt. %, of $Na_2O$.

The expanded silicate material may comprise no less than about 0.01 wt. %, for example, no less than about 0.1 wt. %, or no less than about 0.2 wt. %, or no less than about 0.3 wt. %, or no less than about 0.4 wt. %, or no less than about 1 wt. %, or no less than about 1.5 wt. %, or no less than about 2 wt. %, or no less than about 3 wt. %, of $Li_2O$. The expanded silicate material may comprise no more than about 25 wt. %, for example, no more than about 20 wt. %, or no more than about 15 wt. %, or no more than about 10 wt. %, or no more than about 5 wt. %, or no more than about 3 wt. %, or no more than about 2 wt. %, or no more than about 1 wt. %, or no more than about 0.6 wt. %, of $Li_2O$. The expanded silicate material may comprise from about 0.01 wt. % to about 25 wt. %, for example, from about 0.01 wt. % to about 20 wt. %, or from about 0.01 wt. % to about 15 wt. %, or from about 0.01 wt. % to about 10 wt. %, or from about 0.1 wt. % to about 20 wt. %, or from about 0.1 wt. % to about 15 wt. %, or from about 0.1 wt. % to about 10 wt. %, or from about 1 wt. % to about 20 wt. %, or from about 1 wt. % to about 15 wt. %, or from about 1 wt. % to about 10 wt. %, or from about 3 wt. % to about 20 wt. %, or from about 3 wt. % to about 15 wt. %, or from about 3 wt. % to about 10 wt. %, or from about 0.1 wt. % to about 5 wt. %, or from about 0.2 wt. % to about 5 wt. %, or from about 0.2 wt. % to about 1 wt. %, or from about 0.4 wt. % to about 1 wt. %, or from about 0.4 wt. % to about 0.6 wt. %, or from about 1 wt. % to about 3 wt. %, or from about 1 wt. % to about 2 wt. %, of $Li_2O$.

The expanded silicate material may comprise no less than about 0.1 wt. %, for example, no less than about 0.2 wt. %, or no less than about 0.4 wt. %, or no less than about 1 wt.

%, or no less than about 2 wt. %, or no less than about 3 wt. %, or no less than about 4 wt. %, of $Al_2O_3$. The expanded silicate material may comprise no more than about 30 wt. %, for example, no more than about 25 wt. %, or no more than about 20 wt. %, or no more than about 15 wt. %, or no more than about 10 wt. %, or no more than about 8 wt. %, or no more than about 6 wt. %, or no more than about 5 wt. %, or no more than about 4 wt. %, or no more than about 1 wt. %, or no more than about 0.8 wt. %, of $Al_2O_3$. The expanded silicate material may comprise from about 0.1 wt. % to about 30 wt. %, for example, from about 0.1 wt. % to about 25 wt. %, or from about 0.1 wt. % to about 20 wt. %, or from about 0.1 wt. % to about 15 wt. %, or from about 0.2 wt. % to about 10 wt. %, or from about 0.4 wt. % to about 1 wt. %, or from about 0.4 wt. % to about 0.8 wt. %, or from about 1 wt. % to about 5 wt. %, or from about 2 wt. % to about 5 wt. %, or from about 2 wt. % to about 4 wt. %, or from about 4 wt. % to about 5 wt. %, of $Al_2O_3$.

The expanded silicate material may comprise no less than about 30 wt. %, for example, no less than about 35 wt. %, or no less than about 40 wt. %, or no less than about 45 wt. %, of $SiO_2$. The expanded silicate material may comprise no more than about 80 wt. %, for example, no more than about 70 wt. %, or no more than about 60 wt. %, or no more than about 55 wt. %, or no more than about 50 wt. %, of $SiO_2$. The expanded silicate material may comprise from about 30 wt. % to about 80 wt. %, for example, from about 30 wt. % to about 70 wt. %, or from about 30 wt. % to about 60 wt. %, or from about 35 wt. % to about 55 wt. %, or from about 40 wt. % to about 50 wt. %, of $SiO_2$.

The expanded silicate material may comprise no less than about 0.001 wt. %, for example, no less than about 0.01 wt. %, or no less than about 0.05 wt. %, or no less than about 0.1 wt. %, or no less than about 0.2 wt. %, or no less than about 0.3 wt. %, of $Fe_2O_3$. The expanded silicate material may comprise no more than about 1 wt. %, or no more than about 0.5 wt. %, or no more than about 0.4 wt. %, or no more than about 0.1 wt. %, of $Fe_2O_3$. The expanded silicate material may comprise from about 0.001 wt. % to about 1 wt. %, for example, from about 0.01 wt. % to about 0.5 wt. %, or from about 0.05 wt. % to about 0.5 wt. %, or from about 0.05 wt. % to about 0.1 wt. %, or from about 0.3 wt. % to about 0.5 wt. %, or from about 0.3 wt. % to about 0.4 wt. %, of $Fe_2O_3$.

The expanded silicate material may comprise no less than about 0.01 wt. %, for example, no less than about 0.05 wt. %, or no less than about 0.1 wt. %, or no less than about 0.15 wt. %, or no less than about 0.2 wt. %, or no less than about 0.3 wt. %, or no less than about 0.4 wt. %, or no less than about 0.5 wt. %, of CaO. The expanded silicate material may comprise no more than about 2 wt. %, for example, no more than about 1 wt. %, or no more than about 0.8 wt. %, or no more than about 0.6 wt. %, or no more than about 0.5 wt. %, or no more than about 0.2 wt. %, of CaO. The expanded silicate material may comprise from about 0.01 wt. % to about 2 wt. %, for example, from about 0.05 wt. % to about 1 wt. %, or from about 0.1 wt. % to about 0.8 wt. %, or from about 0.15 wt. % to about 0.2 wt. %, or from about 0.3 wt. % to about 0.6 wt. %, or from about 0.3 wt. % to about 0.5 wt. %, or from about 0.5 wt. % to about 0.6 wt. %, of CaO.

The expanded silicate material may comprise no less than about 0.001 wt. %, for example, no less than about 0.005 wt. %, or no less than about 0.01 wt. %, or no less than about 0.05 wt. %, of MgO. The expanded silicate material may comprise no more than about 1 wt. %, or no more than about 0.5 wt. %, or no more than about 0.1 wt. %, of MgO. The expanded silicate material may comprise from about 0.001 wt. % to about 1 wt. %, for example, from about 0.005 wt. % to about 0.5 wt. %, or from about 0.01 wt. % to about 0.1 wt. %, or from about 0.05 wt. % to about 0.1 wt. %, of MgO.

The expanded silicate material may comprise no less than about 0.05 wt. %, for example, no less than about 0.1 wt. %, or no less than about 0.15 wt. %, or no less than about 0.2 wt. %, or less than about 0.5 wt. %, or no less than about 1 wt. %, or no less than about 1.2 wt. %, of $K_2O$. The expanded silicate material may comprise no more than about 5 wt. %, for example, no more than about 3 wt. %, or no more than about 2 wt. %, or no more than about 1.6 wt. %, or no more than about 1 wt. %, or no more than about 0.5 wt. %, of $K_2O$. The expanded silicate material may comprise from about 0.05 wt. % to about 5 wt. %, for example, from about 0.1 wt. % to about 3 wt. %, or from about 0.15 wt. % to about 2 wt. %, or from about 0.15 wt. % to about 1 wt. %, or from about 0.15 wt. % to about 0.5 wt. %, or from about 0.5 wt. % to about 3 wt. %, or from about 0.5 wt. % to about 2 wt. %, or from about 1 wt. % to about 2 wt. %, or from about 1.2 wt. % to about 1.6 wt. %, of $K_2O$.

The expanded silicate material may comprise no less than about 0.1 wt. %, for example, no less than about 0.5 wt. %, or no less than about 1 wt. %, or no less than about 1.5 wt. %, of $B_2O_3$. The expanded silicate material may comprise no more than about 5 wt. %, for example, no more than about 3.5 wt. %, or no more than about 3 wt. %, or no more than about 2.5 wt. %, of $B_2O_3$. The expanded silicate material may comprise from about 0.1 wt. % to about 5 wt. %, for example, from about 0.5 wt. % to about 3.5 wt. %, or from about 1 wt. % to about 2.5 wt. %, of $B_2O_3$.

The expanded silicate material may comprise no less than about 10 wt. %, for example, no less than about 15 wt. %, or no less than about 20 wt. %, or no less than about 25 wt. %, of water and/or volatile substances (i.e. substances which contribute to "loss on ignition" (LOI)). The expanded silicate material may comprise no more than about 50 wt. %, for example, no more than about 40 wt. %, or no more than about 30 wt. %, of water and/or volatile substances (i.e. substances which contribute to "loss on ignition" (LOI)). The expanded silicate material may comprise from about 10 wt. % to about 50 wt. %, for example, from about 15 wt. % to about 40 wt. %, or from about 20 wt. % to about 30 wt. %, or from about 25 wt. % to about 40 wt. %, or from about 25 wt. % to about 30 wt. %, of water and/or volatile substances (i.e. substances which contribute to "loss on ignition" (LOI)).

The expanded silicate material may comprise: from about 0.1 wt. % to about 25 wt. %, for example from about 0.2 wt. % to about 5 wt. %, of $X_2O$, wherein X is an alkali metal such as Na or Li; from about 0.1 wt. % to about 30 wt. %, for example from about 0.2 wt. % to about 20 wt. %, of $Al_2O_3$; from about 30 wt. % to about 80 wt. %, for example from about 40 wt. % to about 60 wt. %, of $SiO_2$; from about 10 wt. % to about 40 wt. %, for example from about 15 wt. % to about 30 wt. %, of $H_2O$; and optionally no more than about 5 wt. %, for example no more than about 3.5 wt. %, of $B_2O_3$.

The expanded silicate material may comprise: from about 0.1 wt. % to about 25 wt. %, for example from about 0.2 wt. % to about 5 wt. %, of $X_2O$, wherein X is an alkali metal such as Na or Li; from about 0.1 wt. % to about 30 wt. %, for example from about 0.2 wt. % to about 10 wt. %, of $Al_2O_3$; from about 30 wt. % to about 80 wt. %, for example from about 40 wt. % to about 60 wt. %, of $SiO_2$; from about 0.01 wt. % to about 2 wt. %, for example from about 0.05 wt. % to about 1 wt. %, of $Fe_2O_3$; from about 0.01 wt. % to about 1 wt. %, for example from about 0.05 wt. % to about 0.8 wt. % of CaO; no greater than about 1 wt. %, for example no greater than about 0.5 wt. % of MgO; from about 0.05 wt. % to about 3 wt. %, for example from about 0.1 wt. % to about 2 wt. %, of $K_2O$; from about 10 wt. % to about 40 wt. %, for example from about 15 wt. % to about 30 wt. %, of $H_2O$; and optionally no more than about 5 wt. %, for example no more than about 3.5 wt. %, of $B_2O_3$.

The expanded silicate material may be amorphous (i.e. non-crystalline). The expanded silicate material may comprise (e.g. be formed from) an inorganic polymer network, i.e. an inorganic polymer network incorporating water, for example, in the form of hydroxyl groups. The expanded silicate material may therefore be described as a synthetic perlitic material, e.g. a synthetic perlite.

The expanded silicate material may be manufactured by: forming a silicate mixture comprising: a silicate material; an alkali compound; and water; curing the silicate mixture to form a solid precursor; crushing and/or milling the solid precursor to form a granular expandable silicate material; and heating the granular expandable silicate material to form an expanded silicate material.

The silicate material in the silicate mixture may be a silicate salt. The silicate material in the silicate mixture may be an aluminosilicate salt. For example, the silicate material in the silicate mixture may be sodium silicate, i.e. water-glass, or sodium aluminosilicate.

The silicate material in the silicate mixture may be a silicate glass. The silicate glass may comprise (e.g. consist of) predominantly silicon and oxygen. However, the silicate glass may also contain one or more elements in addition to silicon and oxygen. For example, the silicate glass may contain aluminium, sodium, iron, chromium, lead, zinc, calcium, manganese, magnesium, barium, potassium, boron, fluorine, germanium, sulphur, selenium and/or tellurium, in addition to silicon and oxygen.

The silicate glass may be selected from: fused silica glass, soda-lime glass, borosilicate glass, lead-oxide glass, aluminosilicate glass, and silica-germania glass.

The silicate glass may comprise (e.g. be) virgin glass. Additionally or alternatively, the silicate glass may comprise (e.g. be) recycled glass, for example recycled glass cullet.

Unless otherwise stated, particle size properties referred to herein for particulate materials such as ground glass or minerals, where the particle sizes are quoted as being less than 300 μm, are as measured in a well-known manner by wet Malvern laser scattering (standard ISO 13320-1). In this technique, the size of particles in powders, suspensions and emulsions may be measured using the diffraction of a laser beam, based on the application of Mie theory. Such a machine, for example a Malvern Mastersizer S (as supplied by Malvern instruments) provides measurements and a plot of the cumulative percentage by volume of particles having a size, referred to in the art as the "equivalent spherical diameter" (e.s.d), less than given e.s.d values. The mean particle size $d_{50}$ is the value determined in this way of the particle e.s.d. at which there are 50% by volume of the particles which have an equivalent spherical diameter less than that $d_{50}$ value.

Where particle sizes are quoted as being equal to or greater than 300 μm, the particle sizes are as measured by applying sieve granulometric analysis. In particular, a representative sample of the material is taken with a sampler (300-400 mL) and weighed. The sample is placed above sieves with openings of 300 μm and above (smaller sieves can be used for finer samples). The sample is thrown on the sieve with the largest opening (located above) and the lid is put on top. The column with the sieves is shaken back and forth 30 times without losing contact with the ground (like scrolling). Then the column is allowed to fall freely from a height of 10 cm for 4 times. The column is rotated by 90° and the procedure is repeated. The fraction that is under 300 microns is then analyzed using a laser particle analyser.

The silicate glass may be provided in the form of ground silicate glass (i.e. silicate glass cullet). The ground silicate glass may have a maximum particle size of about 200 μm, for example, about 150 μm, or about 100 μm, or about 80 μm, or about 70 μm, or about 65 μm. The ground silicate glass may have a $d_{50}$ of no greater than about 100 μm, for example, no greater than about 80 μm, or no greater than about 60 μm, or no greater than about 50 μm, or no greater than about 40 μm, or no greater than about 35 μm, or no greater than about 30 μm, or no greater than about 29 μm, or no greater than about 28 μm. The ground silicate glass may have a $d_{50}$ of no less than about 5 μm, for example, no less than about 10 μm, or no less than about 15 μm, or no less than about 20 μm, or no less than about 25 μm, or no less than about 26 μm, or no less than about 27 μm, or no less than about 28 μm. The ground silicate glass may have a $d_{50}$ of from about 5 μm to about 100 μm, for example, from about 10 μm to about 80 μm, or from about 15 μm to about 50 μm, or from about 20 μm to about 35 μm, or from about 25 μm to about 30 μm, or from about 26 μm to about 28 μm, or from about 27 μm to about 28 μm, or from about 27 μm to about 29 μm, or from about 28 μm to about 29 μm.

It may be that the silicate glass is ground soda-lime glass having a maximum particle size of about 200 μm, for example, about 150 μm, or about 100 μm, or about 80 μm, or about 70 μm, or about 65 μm. It may be that the silicate glass is ground soda-lime glass having a $d_{50}$ of from about 5 μm to about 100 μm, for example, from about 10 μm to about 80 μm, or from about 15 μm to about 50 μm, or from about 20 μm to about 35 μm, or from about 25 μm to about 30 μm, or from about 27 μm to about 29 μm, or from about 28 μm to about 29 μm.

It may be that the silicate glass is ground borosilicate glass having a maximum particle size of about 200 μm, for example, about 150 μm, or about 100 μm, or about 80 μm, or about 70 μm. It may be that the silicate glass is ground borosilicate glass having a $d_{50}$ of from about 5 μm to about 100 μm, for example, from about 10 μm to about 80 μm, or from about 15 μm to about 50 μm, or from about 20 μm to about 35 μm, or from about 25 μm to about 30 μm, or from about 26 μm to about 28 μm, or from about 27 μm to about 28 μm, or from about 27 μm to about 29 μm.

It will be appreciated that, throughout this specification and the appended claims, unless stated otherwise, the elemental composition of a glass, mineral or silicate mixture is expressed in terms of the oxide equivalents of the elements present, as is standard in the field. For example, the composition of a glass, mineral or silicate mixture containing silicon, aluminium, iron, calcium, magnesium, potassium sodium and/or boron is expressed in terms of the equivalent content of $SiO_2$, $Al_2O_3$, $Fe_2O_3$, CaO, MgO, $K_2O$, $Na_2O$ and/or $B_2O_3$ respectively. The elemental composition of a glass, mineral or silicate mixture may be determined using Energy Dispersive X-Ray Fluoresence (EDXRF), for example using the Xepos instrument available from SPECTRO A. I. GmbH. Similarly, the mineralogical content of a material may be determined using X-Ray Diffractometry, for example using a SIEMENS D5000 Diffractometer with Cu Kα1 (Ni filtered) radiation, in the 2θ range from 2° to 72° and a 0.02°/sec step.

The silicate glass may comprise no less than about 50 wt. %, for example, no less than about 60 wt. %, or no less than about 70 wt. %, or no less than about 75 wt. %, or no less than about 78 wt. %, of $SiO_2$. The silicate glass may comprise no greater than about 100 wt. %, for example, no greater than about 90 wt. %, or no greater than about 85 wt. %, or no greater than about 80 wt. %, or no greater than about 75 wt. %, or no greater than about 72 wt. %, of $SiO_2$. The silicate glass may comprise from about 50 wt. % to about 100 wt. %, for example, from about 60 wt. % to about 90 wt. %, or from about 70 wt. % to about 80 wt. %, or from about 70 wt. % to about 75 wt. %, or from about 70 wt. % to about 72 wt. %, or from about 75 wt. % to about 80 wt. %, or from about 78 wt. % to about 80 wt. %, of $SiO_2$. It may be that the silicate glass is soda-lime glass comprising from about 50 wt. % to about 95 wt. %, for example, from about 60 wt. % to about 90 wt. %, or from about 70 wt. % to about 80 wt. %, or from about 70 wt. % to about 75 wt. %, or from about 70 wt. % to about 72 wt. %, of $SiO_2$. It may be that the silicate glass is borosilicate glass comprising from 50 wt. % to about 95 wt. %, for example, from about 60 wt. % to about 90 wt. %, or from about 70 wt. % to about 80 wt. %, or from about 75 wt. % to about 80 wt. %, or from about 78 wt. % to about 80 wt. %, of $SiO_2$.

The silicate glass may comprise no less than about 0.1 wt. %, for example, no less than about 0.2 wt. %, or no less than about 0.3 wt. %, or no less than about 0.5 wt. %, or no less than about 1.0 wt. %, or no less than about 2.0 wt. %, or no less than about 3.0 wt. %, of $Al_2O_3$. The silicate glass may comprise no greater than about 10 wt. %, for example, no greater than about 8.0 wt. %, or no greater than about 6.0 wt. %, or no greater than about 5.0 wt. %, or no greater than about 4.0 wt. %, or no greater than about 3.5 wt. %, or no greater than about 3.0 wt. %, or no greater than about 2.0 wt. %, or no greater than about 1.0 wt. %, or no greater than about 0.5 wt. %, of $Al_2O_3$. The silicate glass may comprise from about 0.1 wt. % to about 10 wt. %, for example, from about 0.2 wt. % to about 8.0 wt. %, or from about 0.3 wt. % to about 6.0 wt. %, or from about 0.3 wt. % to about 0.5 wt. %, or from about 0.3 wt. % to about 0.4 wt. %, or from about 2 wt. % to about 6 wt. %, or from about 3 wt. % to about 4 wt. %, of $Al_2O_3$. It may be that the silicate glass is soda-lime glass comprising from about 0.1 wt. % to about 10 wt. %, for example, from about 0.2 wt. % to about 8.0 wt. %, or from about 0.3 wt. % to about 6.0 wt. %, or from about 0.3 wt. % to about 0.5 wt. %, or from about 0.3 wt. % to about 0.4 wt. %, of $Al_2O_3$. It may be that the silicate glass is borosilicate glass comprising from about 0.1 wt. % to about 10 wt. %, for example, from about 0.2 wt. % to about 8.0 wt. %, or from about 0.3 wt. % to about 6.0 wt. %, or from about 2 wt. % to about 6 wt. %, or from about 3 wt. % to about 4 wt. %, of $Al_2O_3$.

The silicate glass may comprise no less than about 0.001 wt. %, for example, no less than about 0.005 wt. %, or no less than about 0.01 wt. %, or no less than about 0.02 wt. %, or no less than about 0.03 wt. %, or no less than about 0.03 wt. %, or no less than about 0.04 wt. %, or no less than about 0.05 wt. %, or no less than about 0.06 wt. %, or no less than about 0.07 wt. %, or no less than about 0.08 wt. %, of $Fe_2O_3$. The silicate glass may comprise no greater than about 1.0 wt. %, for example, no greater than about 0.5 wt. %, or no greater than about 0.1 wt. %, or no greater than about 0.09 wt. %, or no greater than about 0.08 wt. %, or no greater than about 0.07 wt. %, or no greater than about 0.06 wt. %, of $Fe_2O_3$. The silicate glass may comprise from about 0.001 wt. % to about 1.0 wt. %, for example, from about 0.005 wt. % to about 0.5 wt. %, or from about 0.01 wt. % to about 0.1 wt. %, or from about 0.04 wt. % to about 0.08 wt. %, or from about 0.05 wt. % to about 0.07 wt. %, or from about 0.05 wt. % to about 0.1 wt. %, or from about 0.06 wt. % to about 0.1 wt. %, or from about 0.07 wt. % to about 0.09 wt. %, of $Fe_2O_3$. It may be that the silicate glass is soda-lime glass comprising from about 0.001 wt. % to about 1.0 wt. %, for example, from about 0.005 wt. % to about 0.5 wt. %, or from about 0.01 wt. % to about 0.1 wt. %, or from about 0.04 wt. % to about 0.08 wt. %, or from about 0.05 wt. % to about 0.07 wt. %, of $Fe_2O_3$. It may be that the silicate glass is borosilicate glass comprising from about 0.001 wt. % to about 1.0 wt. %, for example, from about 0.005 wt. % to about 0.5 wt. %, or from about 0.01 wt. % to about 0.1 wt. %, or from about 0.05 wt. % to about 0.1 wt. %, or from about 0.06 wt. % to about 0.1 wt. %, or from about 0.07 wt. % to about 0.09 wt. %, of $Fe_2O_3$.

The silicate glass may comprise no less than about 0.01 wt. %, for example, no less than about 0.05 wt. %, or no less than about 0.1 wt. %, or no less than about 0.15 wt. %, or no less than about 1 wt. %, or no less than about 5 wt. %, or no less than about 10 wt. %, or no less than about 11 wt. %, of CaO. The silicate glass may comprise no greater than about 20 wt. %, for example, no greater than about 15 wt. %, or no greater than about 13 wt. %, or no greater than about 10 wt. %, or no greater than about 5 wt. %, or no greater than about 1 wt. %, or no greater than about 0.5 wt. %, or no greater than about 0.2 wt. %, of CaO. The silicate glass may comprise from about 0.01 wt. % to about 20 wt. %, for example, from about 0.05 wt. %, to about 15 wt. %, or from about 0.1 wt. % to about 13 wt. %, or from about 10 wt. % to about 20 wt. %, or from about 10 wt. % to about 15 wt. %, or from about 11 wt. % to about 13 wt. %, or from about 0.05 wt. % to about 1 wt. %, or from about 0.1 wt. % to about 1 wt. %, or from about 0.1 wt. % to about 0.2 wt. %, of CaO. It may be that the silicate glass is soda-lime glass comprising from about 0.01 wt. % to about 20 wt. %, for example, from about 0.05 wt. %, to about 15 wt. %, or from about 0.1 wt. % to about 13 wt. %, or from about 10 wt. % to about 20 wt. %, or from about 10 wt. % to about 15 wt. %, or from about 11 wt. % to about 13 wt. %, of CaO. It may be that the silicate glass is borosilicate glass comprising from about 0.01 wt. % to about 20 wt. %, for example, from about 0.05 wt. %, to about 15 wt. %, or from about 0.1 wt. % to about 13 wt. %, or from about 0.05 wt. % to about 1 wt. %, or from about 0.1 wt. % to about 1 wt. %, or from about 0.1 wt. % to about 0.2 wt. %, of CaO.

The silicate glass may comprise no greater than about 10 wt. %, for example, no greater than about 5 wt. %, or no greater than about 3 wt. %, of MgO. The silicate glass may comprise no less than about 1 wt. %, for example, no less than about 2 wt. %, or no less than about 2.5 wt. %, of MgO. The silicate glass may comprise from about 1 wt. % to about 10 wt. %, for example, from about 2 wt. % to about 5 wt. %, or from about 2.5 wt. % to about 3 wt. %, of MgO. It may be that the silicate glass is soda-lime glass comprising from about 1 wt. % to about 10 wt. %, for example, from about 2 wt. % to about 5 wt. %, or from about 2.5 wt. % to about 3 wt. %, of MgO. It may be that the silicate glass contains substantially no MgO, i.e. the silicate glass may be substantially MgO-free. For example, it may be that the silicate glass comprises no greater than 0.1 wt. %, for example, no greater than 0.01 wt. %, or no greater than 0.001 wt. %, of MgO. It may be that the silicate glass is borosilicate glass containing substantially no MgO, e.g. comprising no greater than 0.1 wt. %, for example, no greater than 0.01 wt. %, or no greater than 0.001 wt. %, of MgO.

The silicate glass may comprise no less than about 0.001 wt. %, for example, no less than about 0.01 wt. %, or no less than about 0.04 wt. %, or no less than about 0.05 wt. %, or no less than about 0.1 wt. %, or no less than about 0.2 wt. %, or no less than about 0.3 wt. %, or no less than about 0.4 wt. %, of $K_2O$. The silicate glass may comprise no greater than about 5 wt. %, for example, no greater than about 1 wt. %, or no greater than about 0.5 wt. %, or no greater than about 0.45 wt. %, or no greater than about 0.2 wt. %, or no greater than about 0.1 wt. %, or no greater than about 0.06 wt. %, of $K_2O$. The silicate glass may comprise from about 0.001 wt. % to about 5 wt. %, for example, from about 0.01 wt. % to about 1 wt. %, or from about 0.04 wt. % to about 0.5 wt. %, or from about 0.04 wt. % to about 0.1 wt. %, or from about 0.04 wt. % to about 0.06 wt. %, or from about 0.1 wt. % to about 1 wt. %, or from about 0.2 wt. % to about 0.5 wt. %, or from about 0.4 wt. % to about 0.5 wt. %, of $K_2O$. It may be that the silicate glass is soda-lime glass comprising from about 0.001 wt. % to about 5 wt. %, for example, from about 0.01 wt. % to about 1 wt. %, or from about 0.04 wt. % to about 0.5 wt. %, or from about 0.04 wt. % to about 0.1 wt. %, or from about 0.04 wt. % to about 0.06 wt. %, of $K_2O$. It may be that the silicate glass is borosilicate glass comprising from about 0.01 wt. % to about 1 wt. %, or from about 0.04 wt. % to about 0.5 wt. %, or from about 0.1 wt. % to about 1 wt. %, or from about 0.2 wt. % to about 0.5 wt. %, or from about 0.4 wt. % to about 0.5 wt. %, of $K_2O$.

The silicate glass may comprise no less than about 1 wt. %, for example, no less than about 2 wt. %, or no less than about 3 wt. %, or no less than about 5 wt. %, or no less than about 10 w. %, or no less than about 11 wt. %, or no less than about 12 wt. %, of $Na_2O$. The silicate glass may comprise no greater than about 20 wt. %, for example, no greater than about 15 wt. %, or no greater than about 13 wt. %, or no greater than about 10 wt. %, or no greater than about 5 wt. %, or no greater than about 4 wt. %, of $Na_2O$. The silicate glass may comprise from about 1 wt. % to about 20 wt. %, for example, from about 2 wt. % to about 15 wt. %, or from about 3 wt. % to about 13 wt. %, or from about 10 wt. % to about 15 wt. %, or from about 11 wt. % to about 13 wt. %, or from about 12 wt. % to about 13 wt. %, or from about 1 wt. % to about 5 wt. %, or from about 2 wt. % to about 4 wt. %, of $Na_2O$. It may be that the silicate glass is soda-lime glass comprising from about 1 wt. % to about 20 wt. %, for example, from about 2 wt. % to about 15 wt. %, or from about 3 wt. % to about 13 wt. %, or from about 10 wt. % to about 15 wt. %, or from about 11 wt. % to about 13 wt. %, or from about 12 wt. % to about 13 wt. %, of $Na_2O$. It may be that the silicate glass is borosilicate glass comprising from about 1 wt. % to about 20 wt. %, for example, from about 2 wt. % to about 15 wt. %, or from about 3 wt. % to about 13 wt. %, or from about 1 wt. % to about 5 wt. %, or from about 2 wt. % to about 4 wt. %, of $Na_2O$.

The silicate glass may comprise no less than about 1 wt. %, for example, no less than about 5 wt. %, or no less than about 10 wt. %, or no less than about 13 wt. %, of $B_2O_3$. The silicate glass may comprise no greater than about 25 wt. %, for example, no greater than about 20 wt. %, or no greater than about 15 wt. %, or no greater than about 14 wt. %, of $B_2O_3$. The silicate glass may comprise from about 1 wt. % to about 25 wt. %, for example, from about 5 wt. % to about 20 wt. %, or from about 10 wt. % to about 15 wt. %, or from about 13 wt. % to about 14 wt. %, of $B_2O_3$. It may be that the silicate glass is borosilicate glass comprising from about 1 wt. % to about 25 wt. %, for example, from about 5 wt. % to about 20 wt. %, or from about 10 wt. % to about 15 wt. %, or from about 13 wt. % to about 14 wt. %, of $B_2O_3$.

The silicate glass may consist predominantly of $SiO_2$, $Al_2O_3$, $Fe_2O_3$, CaO, MgO, $K_2O$, $Na_2O$ and/or $B_2O_3$. The silicate glass may comprise at least 80 wt. %, for example, at least 90 wt. %, or at least 95 wt. %, or at least 98 wt. %, or at least 99 wt. %, of $SiO_2$, $Al_2O_3$, $Fe_2O_3$, CaO, MgO, $K_2O$, $Na_2O$ and/or $B_2O_3$. It may be that the silicate glass is soda-lime glass consisting predominantly of $SiO_2$, $Al_2O_3$, $Fe_2O_3$, CaO, MgO, $K_2O$ and $Na_2O$. It may be that the silicate glass is borosilicate glass consisting predominantly of $SiO_2$, $Al_2O_3$, $Fe_2O_3$, CaO, $K_2O$, $Na_2O$ and $B_2O_3$.

The silicate glass may comprise one or more elements or compounds in addition to $SiO_2$, $Al_2O_3$, $Fe_2O_3$, CaO, MgO, $K_2O$, $Na_2O$ and/or $B_2O_3$. The silicate glass may comprise no less than about 0.001 wt. %, for example, no less than about 0.01 wt. %, or no less than about 0.05 wt. %, or no less than about 0.1 wt. %, of water and/or volatile substances (i.e. substances which contribute to "loss on ignition" (LOI)). The silicate glass may comprise no greater than about 1 wt. %, for example, no greater than about 0.5 wt. %, or no greater than about 0.2 wt. %, or no greater than about 0.1 wt. %, of water and/or volatile substances (i.e. substances which contribute to "loss on ignition" (LOI)). The silicate glass may comprise from about 0.001 wt. % to about 1 wt. %, for example, from about 0.01 wt. % to about 0.5 wt. %, or from about 0.05 wt. % to about 0.2 wt. %, or from about 0.1 wt. % to about 0.2 wt. %, of water and/or volatile substances (i.e. substances which contribute to "loss on ignition" (LOI)).

Loss on ignition (LOI) of a material may be determined by heating a dried (i.e. moisture-free) and pulverized sample of the material up to 1050° C. for 1 hour and measuring the weight loss on heating.

It may be that the silicate glass is soda-lime glass comprising: from about 60 wt. % to about 80 wt. % $SiO_2$; from about 0.1 wt. % to about 1 wt. % of $Al_2O_3$; from about 0.01 wt. % to about 0.1 wt. % of $Fe_2O_3$; from about 5 wt. % to about 20 wt. % of CaO; from about 1 wt. % to about 5 wt. % of MgO; from about 0.01 wt. % to about 0.1 wt. % of $K_2O$; from about 5 wt. % to about 20 wt. % of $Na_2O$; and optionally from about 0.01 wt. % to about 0.5 wt. % of water and/or volatile substances (i.e. substances which contribute to "loss on ignition" (LOI)).

It may be that the silicate glass is borosilicate glass comprising: from about 70 wt. % to about 90 wt. % of $SiO_2$; from about 1 wt. % to about 10 wt. % of $Al_2O_3$; from about 0.01 wt. % to about 0.15 wt. % of $Fe_2O_3$; from about 0.05 wt. % to about 0.25 wt. % of CaO; from about 0.1 wt. % to about 1 wt. % of $K_2O$; from about 1 wt. % to about 5 wt. % of $Na_2O$; from about 5 wt. % to about 20 wt. % of $B_2O_3$; and optionally from about 0.01 wt. % to about 0.5 wt. % of water and/or volatile substances (i.e. substances which contribute to "loss on ignition" (LOI)).

The silicate material in the silicate mixture may be a silicate mineral.

For the purposes of this specification, the term "mineral" is not limited to crystalline materials but also encompasses naturally-occurring glasses (e.g. volcanic glasses, such as obsidian or perlite), amorphous phases of minerals (e.g. metakaolin), sedimentary rocks (e.g. siliceous rocks), and fossilised biological matter (e.g. diatomaceous earth).

The silicate mineral in the silicate mixture may be a naturally-occurring silicate mineral. The silicate mineral in the silicate mixture may be a naturally-occurring silicate mineral which has undergone physical and/or chemical treatment, for example calcination or thermal treatment. Alternatively, the silicate mineral in the silicate mixture may be a synthetic silicate mineral.

The silicate mineral may be an aluminosilicate mineral. The silicate material may be a volcanic glass.

The volcanic glass may comprise no less than about 50 wt. %, for example, no less than about 60 wt. %, or no less than about 65 wt. %, or no less than about 70 wt. %, or no less than about 75 wt. %, of $SiO_2$. The volcanic glass may comprise no more than about 95 wt. %, for example, no more than about 90 wt. %, or no more than about 85 wt. %, or no more than about 80 wt. %, or no more than about 75 wt. %, or no more than about 70 wt. %, of $SiO_2$. The volcanic glass may comprise from about 50 wt. % to about 95 wt. %, for example, from about 60 wt. % to about 90 wt. %, or from about 60 wt. % to about 80 wt. %, or from about 60 wt. % to about 70 wt. %, or from about 70 wt. % to about 80 wt. %, of $SiO_2$.

The volcanic glass may comprise no less than about 5 wt. %, for example, no less than about 8 wt. %, or no less than about 10 wt. %, or no less than about 12 wt. %, of $Al_2O_3$. The volcanic glass may comprise no more than about 25 wt. %, for example, no more than about 20 wt. %, or no more than about 15 wt. %, or more than about 12 wt. %, of $Al_2O_3$. The volcanic glass may comprise from about 5 wt. % to about 25 wt. %, for example, from about 8 wt. % to about 20 wt. %, for example from about 8 wt. % to about 12 wt. %, or from about 12 wt. % to about 15 wt. %, of $Al_2O_3$.

The volcanic glass may comprise no less than about 0.5 wt. %, for example, no less than about 1 wt. %, or no less than about 2 wt. %, of $Fe_2O_3$. The volcanic glass may comprise no greater than about 5 wt. %, for example, no greater than about 3 wt. %, or no greater than about 2 wt. %, of $Fe_2O_3$. The volcanic glass may comprise from about 0.5 wt. % to about 5 wt. %, for example, from about 1 wt. % to about 3 wt. %, or from about 2 wt. % to about 3 wt. %, or from about 1 wt. % to about 2 wt. %, of $Fe_2O_3$.

The volcanic glass may comprise no less than about 0.5 wt. %, for example, no less than about 0.8 wt. %, of CaO. The volcanic glass may comprise no greater than about 5 wt. %, for example, no greater than about 3 wt. %, or no greater than about 2 wt. %, of CaO. The volcanic glass may comprise from about 0.5 wt. % to about 5 wt. %, for example, from about 0.8 wt. % to about 3 wt. %, or from about 0.8 wt. % to about 2 wt. %, of CaO.

The volcanic glass may comprise no less than about 0.05 wt. %, for example, no less than about 0.1 wt. %, or no less than about 0.2 wt. %, or no less than about 0.5 wt. %, or no less than about 1 wt. %, or no less than about 1.2 wt. %, of MgO. The volcanic glass may comprise no more than about 10 wt. %, for example, no more than about 5 wt. %, or no more than about 2 wt. %, or no more than about 1 wt. %, or no more than about 0.5 wt. %, or no more than about 0.3 wt. %, of MgO. The volcanic glass may comprise from about 0.05 wt. % to about 10 wt. %, for example, from about 0.1 wt. % to about 5 wt. %, or from about 0.2 wt. % to about 2 wt. %, or from about 0.2 wt. % to about 1 wt. %, or from about 0.2 wt. % to about 0.5 wt. %, or from about 0.2 wt. % to about 0.3 wt. %, or from about 1 wt. % to about 5 wt. %, or from about 1 wt. % to about 2 wt. %, of MgO.

The volcanic glass may comprise no less than about 1 wt. %, for example, no less than about 2 wt. %, or no less than about 3 wt. %, or no less than about 4 wt. %, of $K_2O$. The volcanic glass may comprise no greater than about 10 wt. %, for example, no greater than about 8 wt. %, or no greater than about 6 wt. %, or no greater than about 5 wt. %, of $K_2O$. The volcanic glass may comprise from about 1 wt. % to about 10 wt. %, for example, from about 2 wt. % to about 8 wt. %, or from about 3 wt. % to about 6 wt. %, or from about 4 wt. % to about 5 wt. %, of $K_2O$.

The volcanic glass may comprise no less than about 1 wt. %, for example, no less than about 2 wt. %, or no less than about 3 wt. %, of $Na_2O$. The volcanic glass may comprise no greater than about 10 wt. %, for example, no greater than about 8 wt. %, or no greater than about 6 wt. %, or no greater than about 4 wt. %, of $Na_2O$. The volcanic glass may comprise from about 1 wt. % to about 10 wt. %, for example, from about 2 wt. % to about 8 wt. %, or from about 3 wt. % to about 6 wt. %, or from about 3 wt. % to about 4 wt. %, of $Na_2O$.

The volcanic glass may comprise substantially no $B_2O_3$. For example, the volcanic glass may comprise less than 1 wt. %, for example, less than 0.1 wt. %, or less than 0.01 wt. %, of $B_2O_3$.

The volcanic glass may comprise no less than about 1 wt. %, for example, no less than about 2 wt. %, or no less than about 2.5 wt. %, or no less than about 3 wt. %, or no less than about 4 wt. %, or no less than about 5 wt. %, of chemically bound water and/or volatile substances (i.e. substances which contribute to "loss on ignition" (LOI)). The volcanic glass may comprise no greater than about 10 wt. %, for example, no greater than about 8 wt. %, or no greater than about 6 wt. %, or no greater than about 4 wt. %, or no greater than about 3 wt. %, of chemically bound water and/or volatile substances (i.e. substances which contribute to "loss on ignition" (LOI)). The volcanic glass may comprise from about 1 wt. % to about 10 wt. %, for example, from about 2 wt. % to about 8 wt. %, or from about 2 wt. % to about 6 wt. %, or from about 2 wt. % to about 3 wt. %, or from about 5 wt. % to about 6 wt. %, of chemically bound water and/or volatile substances (i.e. substances which contribute to "loss on ignition" (LOI)).

The volcanic glass may comprise: from about 70 wt. % to about 80 wt. % of $SiO_2$; from about 5 wt. % to about 15 wt. % of $Al_2O_3$; from about 0.5 wt. % to about 1.5 wt. % of $Fe_2O_3$; from about 0.5 wt. % to about 2 wt. % of CaO; from about 0.05 wt. % to about 1 wt. % of MgO; from about 1 wt. % to about 10 wt. % of $K_2O$; from about 1 wt. % to about 8 wt. % of $Na_2O$; from about 1 wt. % to about 5 wt. % of chemically bound water and/or volatile substances (i.e. substances which contribute to "loss on ignition" (LOI)); and optionally less than about 1 wt. % of $B_2O_3$.

The volcanic glass may comprise: from about 65 wt. % to about 75 wt. % of $SiO_2$; from about 8 wt. % to about 17 wt. % of $Al_2O_3$; from about 1 wt. % to about 5 wt. % of $Fe_2O_3$; from about 0.5 wt. % to about 2 wt. % of CaO; from about 0.5 wt. % to about 5 wt. % of MgO; from about 1 wt. % to about 10 wt. % of $K_2O$; from about 1 wt. % to about 8 wt. % of $Na_2O$; from about 3 wt. % to about 8 wt. % of chemically bound water and/or volatile substances (i.e. substances which contribute to "loss on ignition" (LOI)); and optionally less than about 1 wt. % of $B_2O_3$.

The volcanic glass may have a $d_{50}$ of no less than about 1 μm, for example, no less than about 3 μm, or no less than about 5 μm, or no less than about 6 μm, or no less than about 10 μm, or no less than about 20 μm, or no less than about 25 μm, or no less than about 30 μm. The volcanic glass may have a $d_{50}$ of no greater than about 250 μm, for example, no greater than about 200 μm, or no greater than about 150 μm, or no greater than about 100 μm, or no greater than about 80 μm, or no greater than about 60 μm, or no greater than about 50 μm, or no greater than about 40 μm, or no greater than about 35 μm, or no greater than about 30 μm, or no greater than about 15 μm, or no greater than about 10 μm, or no greater than about 8 μm, or no greater than about 7 μm. The volcanic glass may have a $d_{50}$ of from about 1 μm to about 250 μm, for example, from about 1 μm to about 200 μm, or from about 1 μm to about 150 μm, or from about 1 μm to about 100 μm, or from about 1 μm to about 80 μm, or from about 1 μm to about 60 μm, or from about 1 μm to about 50 μm, from about 3 μm to about 40 μm, or from about 5 μm to about 35 μm, or from about 5 μm to about 10 μm, or from about 5 μm to about 8 μm, or from about 6 μm to about 7 μm, or from about 20 μm to about 40 μm, or from about 25 μm to about 35 μm.

The silicate material (e.g. the silicate glass or silicate mineral) may be a perlitic material. The perlitic material may be perlite. The perlitic material may be naturally occurring perlite, for example naturally occurring perlite ore. Naturally occurring perlite is an amorphous volcanic glass formed predominantly from silicon dioxide, typically in combination with aluminium oxide, sodium oxide, potassium oxide, iron oxide, magnesium oxide and/or calcium oxide. Perlite may be formed naturally by the hydration of obsidian. The perlitic material may contain small quantities of crystalline phases, such as biotite, quartz, cristobalite, feldspars or hydroxysodalite.

The perlitic material may be unexpanded perlite, for example unexpanded natural perlite ore. The unexpanded perlite, for example unexpanded natural perlite ore, may have a water content of greater than about 2 wt. %. The unexpanded perlite, for example unexpanded natural perlite ore, may be unexpanded perlite, for example unexpanded natural perlite ore, derived from natural perlite ore tailings. That is to say, the unexpanded perlite may be the perlitic material (i.e. by-product) which is left over after a more valuable fraction has been removed from unexpanded natural perlite ore. The natural perlite ore tailings may be derived from different stages of perlite ore processing.

The perlitic material (e.g. the unexpanded natural perlite ore) may comprise no less than about 50 wt. %, for example, no less than about 60 wt. %, or no less than about 65 wt. %, or no less than about 70 wt. %, or no less than about 75 wt. %, of $SiO_2$. The perlitic material (e.g. the unexpanded natural perlite ore) may comprise no more than about 95 wt. %, for example, no more than about 90 wt. %, or no more than about 85 wt. %, or no more than about 80 wt. %, or no more than about 75 wt. %, or no more than about 70 wt. %, of $SiO_2$. The perlitic material (e.g. the unexpanded natural perlite ore) may comprise from about 50 wt. % to about 95 wt. %, for example, from about 60 wt. % to about 90 wt. %, or from about 60 wt. % to about 80 wt. %, or from about 60 wt. % to about 70 wt. %, or from about 70 wt. % to about 80 wt. %, of $SiO_2$.

The perlitic material (e.g. the unexpanded natural perlite ore) may comprise no less than about 5 wt. %, for example, no less than about 8 wt. %, or no less than about 10 wt. %, or no less than about 12 wt. %, of $Al_2O_3$. The perlitic material (e.g. the unexpanded natural perlite ore) may comprise no more than about 25 wt. %, for example, no more than about 20 wt. %, or no more than about 15 wt. %, or more than about 12 wt. %, of $Al_2O_3$. The perlitic material (e.g. the unexpanded natural perlite ore) may comprise from about 5 wt. % to about 25 wt. %, for example, from about 8 wt. % to about 20 wt. %, for example from about 8 wt. % to about 12 wt. %, or from about 12 wt. % to about 15 wt. %, of $Al_2O_3$.

The perlitic material (e.g. the unexpanded natural perlite ore) may comprise no less than about 0.5 wt. %, for example, no less than about 1 wt. %, or no less than about 2 wt. %, of $Fe_2O_3$. The perlitic material (e.g. the unexpanded natural perlite ore) may comprise no greater than about 5 wt. %, for example, no greater than about 3 wt. %, or no greater than about 2 wt. %, of $Fe_2O_3$. The perlitic material (e.g. the unexpanded natural perlite ore) may comprise from about 0.5 wt. % to about 5 wt. %, for example, from about 1 wt. % to about 3 wt. %, or from about 2 wt. % to about 3 wt. %, or from about 1 wt. % to about 2 wt. %, of $Fe_2O_3$.

The perlitic material (e.g. the unexpanded natural perlite ore) may comprise no less than about 0.5 wt. %, for example, no less than about 0.8 wt. %, of CaO. The perlitic material (e.g. the unexpanded natural perlite ore) may comprise no greater than about 5 wt. %, for example, no greater than about 3 wt. %, or no greater than about 2 wt. %, of CaO. The perlitic material (e.g. the unexpanded natural perlite ore) may comprise from about 0.5 wt. % to about 5 wt. %, for example, from about 0.8 wt. % to about 3 wt. %, or from about 0.8 wt. % to about 2 wt. %, of CaO.

The perlitic material (e.g. the unexpanded natural perlite ore) may comprise no less than about 0.05 wt. %, for example, no less than about 0.1 wt. %, or no less than about 0.2 wt. %, or no less than about 0.5 wt. %, or no less than about 1 wt. %, or no less than about 1.2 wt. %, of MgO. The perlitic material (e.g. the unexpanded natural perlite ore) may comprise no more than about 10 wt. %, for example, no more than about 5 wt. %, or no more than about 2 wt. %, or no more than about 1 wt. %, or no more than about 0.5 wt. %, or no more than about 0.3 wt. %, of MgO. The perlitic material (e.g. the unexpanded natural perlite ore) may comprise from about 0.05 wt. % to about 10 wt. %, for example, from about 0.1 wt. % to about 5 wt. %, or from about 0.2 wt. % to about 2 wt. %, or from about 0.2 wt. % to about 1 wt. %, or from about 0.2 wt. % to about 0.5 wt. %, or from about 0.2 wt. % to about 0.3 wt. %, or from about 1 wt. % to about 5 wt. %, or from about 1 wt. % to about 2 wt. %, of MgO.

The perlitic material (e.g. the unexpanded natural perlite ore) may comprise no less than about 1 wt. %, for example, no less than about 2 wt. %, or no less than about 3 wt. %, or no less than about 4 wt. %, of $K_2O$. The perlitic material (e.g. the unexpanded natural perlite ore) may comprise no greater than about 10 wt. %, for example, no greater than about 8 wt. %, or no greater than about 6 wt. %, or no greater than about 5 wt. %, of $K_2O$. The perlitic material (e.g. the unexpanded natural perlite ore) may comprise from about 1 wt. % to about 10 wt. %, for example, from about 2 wt. % to about 8 wt. %, or from about 3 wt. % to about 6 wt. %, or from about 4 wt. % to about 5 wt. %, of $K_2O$.

The perlitic material (e.g. the unexpanded natural perlite ore) may comprise no less than about 1 wt. %, for example, no less than about 2 wt. %, or no less than about 3 wt. %, of $Na_2O$. The perlitic material (e.g. the unexpanded natural perlite ore) may comprise no greater than about 10 wt. %, for example, no greater than about 8 wt. %, or no greater than about 6 wt. %, or no greater than about 4 wt. %, of $Na_2O$. The perlitic material (e.g. the unexpanded natural perlite ore) may comprise from about 1 wt. % to about 10 wt. %, for example, from about 2 wt. % to about 8 wt. %, or from about 3 wt. % to about 6 wt. %, or from about 3 wt. % to about 4 wt. %, of $Na_2O$.

The perlitic material (e.g. the unexpanded natural perlite ore) may comprise substantially no $B_2O_3$. For example, the perlitic material (e.g. the unexpanded natural perlite ore) may comprise less than 1 wt. %, for example, less than 0.1 wt. %, or less than 0.01 wt. %, of $B_2O_3$.

The perlitic material (e.g. the unexpanded natural perlite ore) may comprise no less than about 1 wt. %, for example, no less than about 2 wt. %, or no less than about 2.5 wt. %, or no less than about 3 wt. %, or no less than about 4 wt. %, or no less than about 5 wt. %, of chemically bound water and/or volatile substances (i.e. substances which contribute to "loss on ignition" (LOI)). The perlitic material (e.g. the unexpanded natural perlite ore) may comprise no greater than about 10 wt. %, for example, no greater than about 8 wt. %, or no greater than about 6 wt. %, or no greater than about 4 wt. %, or no greater than about 3 wt. %, of chemically bound water and/or volatile substances (i.e. substances which contribute to "loss on ignition" (LOI)). The perlitic material (e.g. the unexpanded natural perlite ore) may comprise from about 1 wt. % to about 10 wt. %, for example, from about 2 wt. % to about 8 wt. %, or from about 2 wt. % to about 6 wt. %, or from about 2 wt. % to about 3 wt. %, or from about 5 wt. % to about 6 wt. %, of chemically bound water and/or volatile substances (i.e. substances which contribute to "loss on ignition" (LOI)).

The perlitic material (e.g. the unexpanded natural perlite ore) may comprise: from about 70 wt. % to about 80 wt. % of $SiO_2$; from about 5 wt. % to about 15 wt. % of $Al_2O_3$; from about 0.5 wt. % to about 1.5 wt. % of $Fe_2O_3$; from about 0.5 wt. % to about 2 wt. % of CaO; from about 0.05 wt. % to about 1 wt. % of MgO; from about 1 wt. % to about 10 wt. % of $K_2O$; from about 1 wt. % to about 8 wt. % of $Na_2O$; from about 1 wt. % to about 5 wt. % of chemically bound water and/or volatile substances (i.e. substances which contribute to "loss on ignition" (LOI)); and optionally less than about 1 wt. % of $B_2O_3$. The perlitic material (e.g. the unexpanded natural perlite ore) may comprise: from about 65 wt. % to about 75 wt. % of $SiO_2$; from about 8 wt. % to about 17 wt. % of $Al_2O_3$; from about 1 wt. % to about 5 wt. % of $Fe_2O_3$; from about 0.5 wt. % to about 2 wt. % of CaO; from about 0.5 wt. % to about 5 wt. % of MgO; from about 1 wt. % to about 10 wt. % of $K_2O$; from about 1 wt. % to about 8 wt. % of $Na_2O$; from about 3 wt. % to about 8 wt. % of chemically bound water and/or volatile substances (i.e. substances which contribute to "loss on ignition" (LOI)); and optionally less than about 1 wt. % of $B_2O_3$.

The perlitic material (e.g. the unexpanded natural perlite ore) may have a $d_{50}$ of no less than about 1 μm, for example, no less than about 3 μm, or no less than about 5 μm, or no less than about 6 μm, or no less than about 10 μm, or no less than about 20 μm, or no less than about 25 μm, or no less than about 30 μm. The perlitic material (e.g. the unexpanded natural perlite ore) may have a $d_{50}$ of no greater than about 250 μm, for example, no greater than about 200 μm, or no greater than about 150 μm, or no greater than about 100 μm, or no greater than about 80 μm, or no greater than about 60 μm, or no greater than about 50 μm, or no greater than about 40 μm, or no greater than about 35 μm, or no greater than about 30 μm, or no greater than about 15 μm, or no greater than about 10 μm, or no greater than about 8 μm, or no greater than about 7 μm. The perlitic material (e.g. the unexpanded natural perlite ore) may have a $d_{50}$ of from about 1 μm to about 250 μm, for example, from about 1 μm to about 200 μm, or from about 1 μm to about 150 μm, or from about 1 μm to about 100 μm, or from about 1 μm to about 80 μm, or from about 1 μm to about 60 μm, or from about 1 μm to about 50 μm, from about 3 μm to about 40 μm, or from about 5 μm to about 35 μm, or from about 5 μm to about 10 μm, or from about 5 μm to about 8 μm, or from about 6 μm to about 7 μm, or from about 20 μm to about 40 μm, or from about 25 μm to about 35 μm.

The silicate material (e.g. the silicate mineral) may be a phyllosilicate mineral. The phyllosilicate mineral may be a clay mineral, i.e. a hydrous aluminium phyllosilicate mineral. The silicate materials (e.g. the silicate mineral) may be selected from: halloysite, kaolinite, illite, montmorillonite, nontronite, beidellite, vermiculite, talc, sepiolite, palygorskite, pyrophyllite. The silicate material (e.g. the silicate mineral) may be kaolin, for example calcined kaolin (i.e. metakaolin). The silicate material (e.g. the silicate mineral) may be bentonite or any other smectite-containing clay mineral. The silicate material (e.g. the silicate mineral) may be bentonite tailings, such as Na-bentonite tailings or Ca-bentonite tailings.

The silicate material (e.g. the silicate mineral) may be diatomaceous earth or a diatomaceous earth containing mineral, for example a mineral containing both diatomaceous earth and a clay mineral (in any relative proportions).

The silicate material (e.g. the silicate salt, the silicate glass or the silicate mineral) may comprise no less than about 30 wt. %, for example, no less than about 40 wt. %, or no less than about 50 wt. %, or no less than about 60 wt. %, of $SiO_2$. The silicate material (e.g. the silicate salt, the silicate glass or the silicate mineral) may comprise up to about 100 wt. %, for example, no greater than about 99 wt. %, or no greater than about 95 wt. %, or no greater than about 90 wt. %, or no greater than about 85 wt. %, or no greater than about 80 wt. %, or no greater than about 70 wt. %, or no greater than about 60 wt. %, of $SiO_2$. The silicate material (e.g. the silicate salt, the silicate glass or the silicate mineral) may comprise from about 30 wt. % to about 100 wt. %, for example, from about 40 wt. % to about 99 wt. %, or from about 50 wt. % to about 95 wt. %, or from about 60 wt. % to about 90 wt. %, or from about 60 wt. % to about 85 wt. %, of $SiO_2$.

The silicate material (e.g. the silicate salt, the silicate glass or the silicate mineral) may comprise no less than about 0.1 wt. %, for example, no less than about 0.5 wt. %, or no less than about 1 wt. %, or no less than about 2 wt. %, of $Na_2O$. The silicate material (e.g. the silicate salt, the silicate glass or the silicate mineral) may comprise no greater than about 40 wt. %, for example, no greater than about 30 wt. %, or no greater than about 20 wt. %, or no greater than about 15 wt. %, of $Na_2O$. The silicate material (e.g. the silicate salt, the silicate glass or the silicate mineral) may comprise from about 0.1 wt. % to about 40 wt. %, for example, from about 0.5 wt. % to about 30 wt. %, or from about 1 wt. % to about 30 wt. %, or from about 2 wt. % to about 15 wt. %, of $Na_2O$.

The silicate material (e.g. the silicate salt, the silicate glass or the silicate mineral) may comprise substantially 0 wt. % of $K_2O$. The silicate material (e.g. the silicate salt, the silicate glass or the silicate mineral) may comprise no less than about 0.01 wt. % of $K_2O$.

The silicate material (e.g. the silicate salt, the silicate glass or the silicate mineral) may comprise no greater than about 20 wt. %, for example, no greater than about 15 wt. %, or no greater than about 10 wt. %, or no greater than about 6 wt. %, of $K_2O$. The silicate material (e.g. the silicate salt, the silicate glass or the silicate mineral) may comprise from about 0 wt. % to about 20 wt. %, for example, from about 0 wt. % to about 15 wt. %, or from about 0.01 wt. % to about 10 wt. %, or from about 0.01 wt. % to about 6 wt. %, of $K_2O$.

The silicate material (e.g. the silicate salt, the silicate glass or the silicate mineral) may comprise substantially 0 wt. % of CaO. The silicate material (e.g. the silicate salt, the silicate glass or the silicate mineral) may comprise no less than about 0.05 wt. % of CaO. The silicate material (e.g. the silicate salt, the silicate glass or the silicate mineral) may comprise no greater than about 20 wt. %, for example, no greater than about 15 wt. %, of CaO. The silicate material (e.g. the silicate salt, the silicate glass or the silicate mineral) may comprise from about 0 wt. % to about 20 wt. %, for example, from about 0.05 wt. % to about 15 wt. %, of CaO.

The silicate material (e.g. the silicate salt, the silicate glass or the silicate mineral) may comprise substantially 0 wt. % of $Al_2O_3$. The silicate material (e.g. the silicate salt, the silicate glass or the silicate mineral) may comprise no less than about 0.1 wt. % of $Al_2O_3$. The silicate material (e.g. the silicate salt, the silicate glass or the silicate mineral) may comprise no greater than about 20 wt. %, for example, no greater than about 15 wt. %, of $Al_2O_3$. The silicate material (e.g. the silicate salt, the silicate glass or the silicate mineral) may comprise from about 0 wt. % to about 20 wt. %, for example, from about 0.1 wt. % to about 15 wt. %, of $Al_2O_3$.

The silicate material (e.g. the silicate salt, the silicate glass or the silicate mineral) may comprise substantially 0 wt. % of $B_2O_3$. The silicate material (e.g. the silicate salt, the silicate glass or the silicate mineral) may comprise no less than about 0.01 wt. %, for example, no less than about 0.05 wt. %, or no less than about 0.1 wt. %, of $B_2O_3$. The silicate material (e.g. the silicate salt, the silicate glass or the silicate mineral) may comprise no greater than about 20 wt. %, for example, no greater than about 15 wt. %, or no greater than about 10 wt. %, of $B_2O_3$. The silicate material (e.g. the silicate salt, the silicate glass or the silicate mineral) may comprise from about 0 wt. % to about 20 wt. %, for example, from about 0 wt. % to about 15 wt. %, or from about 0.01 wt. % to about 10 wt. %, or from about 0.1 wt. % to about 10 wt. %, of $B_2O_3$.

The silicate material (e.g. the silicate salt, the silicate glass or the silicate mineral) may comprise substantially 0 wt. % of PbO. The silicate material (e.g. the silicate salt, the silicate glass or the silicate mineral) may comprise no less than about 0.01 wt. %, for example, no less than about 0.05 wt. %, or no less than about 0.1 wt. %, of PbO. The silicate material (e.g. the silicate salt, the silicate glass or the silicate mineral) may comprise no greater than about 20 wt. %, for example, no greater than about 15 wt. %, or no greater than about 10 wt. %, of PbO. The silicate material (e.g. the silicate salt, the silicate glass or the silicate mineral) may comprise from about 0 wt. % to about 20 wt. %, for example, from about 0 wt. % to about 15 wt. %, or from about 0.01 wt. % to about 10 wt. %, or from about 0.1 wt. % to about 10 wt. %, of PbO.

The silicate material (e.g. the silicate salt, the silicate glass or the silicate mineral) may comprise substantially 0 wt. % of MgO. The silicate material (e.g. the silicate salt, the silicate glass or the silicate mineral) may comprise no less than about 0.01 wt. %, for example, no less than about 0.05 wt. %, or no less than about 0.1 wt. %, of MgO. The silicate material (e.g. the silicate salt, the silicate glass or the silicate mineral) may comprise no greater than about 10 wt. %, for example, no greater than about 5 wt. %, or no greater than about 2 wt. %, of MgO. The silicate material (e.g. the silicate salt, the silicate glass or the silicate mineral) may comprise from about 0 wt. % to about 10 wt. %, for example, from about 0 wt. % to about 5 wt. %, or from about 0.01 wt. % to about 2 wt. %, or from about 0.1 wt. % to about 2 wt. %, of MgO.

The silicate material (e.g. the silicate salt, the silicate glass or the silicate mineral) may comprise substantially 0 wt. % of BaO. The silicate material (e.g. the silicate salt, the silicate glass or the silicate mineral) may comprise no less than about 0.01 wt. %, for example, no less than about 0.05 wt. %, or no less than about 0.1 wt. %, of BaO. The silicate material (e.g. the silicate salt, the silicate glass or the silicate mineral) may comprise no greater than about 10 wt. %, for example, no greater than about 5 wt. %, or no greater than about 2 wt. %, of BaO. The silicate material (e.g. the silicate salt, the silicate glass or the silicate mineral) may comprise from about 0 wt. % to about 10 wt. %, for example, from about 0 wt. % to about 5 wt. %, or from about 0.01 wt. % to about 2 wt. %, or from about 0.1 wt. % to about 2 wt. %, of BaO.

The silicate material (e.g. the silicate salt, the silicate glass or the silicate mineral) may comprise: from about 50 wt. % to about 95 wt. %, for example, from about 60 wt. % to about 85 wt. %, of $SiO_2$; from about 1 wt. % to about 30 wt. %, for example, from about 2 wt. % to about 15 wt. %, of $Na_2O$; from about 0 wt. % to about 15 wt. %, for example, from about 0.01 wt. % to about 6 wt. %, of $K_2O$; from about 0 wt. % to about 20 wt. %, for example, from about 0.05 wt. % to about 15 wt. %, of CaO; from about 0 wt. % to about 20 wt. %, for example, from about 0.1 wt. % to about 15 wt. %, of $Al_2O_3$; no greater than about 20 wt. %, for example, less than about 15 wt. %, of $B_2O_3$; no greater than about 20 wt. %, for example, less than about 15 wt. %, of PbO; no greater than about 10 wt. %, for example, less than about 5 wt. %, of MgO; and no greater than about 10 wt. %, for example, less than about 5 wt. %, of BaO.

The silicate material may be crystalline. Alternatively, the silicate material may be amorphous. The silicate material may comprise no less than 25 wt. %, for example, no less than about 50 wt. %, or no less than about 75 wt. %, or no less than about 90 wt. %, amorphous material. For example, the silicate material may comprise from about 25 wt. % to about 100 wt. %, for example, from about 50 wt. % to about 100 wt. %, or from about 75 wt. % to about 100 wt. %, or from about 90 wt. % to about 100 wt. %, amorphous material.

An alkali compound is a compound of an alkali metal or an alkaline earth metal. Accordingly, the alkali compound may be an alkali metal compound or an alkaline earth metal compound.

The alkali compound may be an alkali salt. An alkali salt is a basic salt of an alkali metal or an alkaline earth metal. Accordingly, the alkali salt may be an alkali metal salt or an alkaline earth metal salt. The alkali salt may be a hydroxide, carbonate or silicate salt of an alkali metal or an alkaline earth metal, i.e. the alkali salt may be an alkali hydroxide, an alkali carbonate or an alkali silicate. The alkali salt may be an alkali metal hydroxide, an alkali metal carbonate or an alkali metal silicate. The alkali salt may be selected from: sodium hydroxide (NaOH), lithium hydroxide (LiOH), potassium hydroxide (KOH), sodium carbonate ($Na_2CO_3$), lithium carbonate ($Li_2CO_3$), potassium carbonate ($Na_2CO_3$), sodium silicate ($Na_2SiO_3$, $Na_4SiO_4$ or $Na_6Si_2O_7$), lithium silicate ($Li_2SiO_3$, $Lia_4SiO_4$ or $Lia_6Si_2O_7$), potassium silicate ($K_2SiO_3$, $K_4SiO_4$ or $K_6Si_2O_7$).

In certain embodiments, the alkali salt is a sodium salt, such as sodium hydroxide.

In certain embodiments, the alkali salt is a lithium salt, such as lithium hydroxide.

In certain embodiments, the alkali salt is a mixture of sodium salt and lithium salt, for example, a mixture of sodium hydroxide and lithium hydroxide. It may be that the ratio of wt. % sodium salt to wt. % lithium salt in the mixture is no less than about 1, for example, no less than about 1.5. It may be that the ratio of wt. % of sodium salt to wt. % of lithium salt in the mixture is no greater than about 20, for example, no greater than about 15, or no greater than about 10. It may be that the ratio of wt. % of sodium salt to wt. % of lithium salt in the mixture is from about 1 to about 20, for example, from about 1.5 to about 15, or from about 1.5 to about 10. For example, it may be that the ratio of wt. % sodium hydroxide to wt. % lithium hydroxide in the mixture is no less than about 1, for example, no less than about 1.5. It may be that the ratio of wt. % of sodium hydroxide to wt.

% of lithium hydroxide in the mixture is no greater than about 20, for example, no greater than about 15, or no greater than about 10. It may be that the ratio of wt. % of sodium hydroxide to wt. % of lithium hydroxide in the mixture is from about 1 to about 20, for example, from about 1.5 to about 15, or from about 1.5 to about 10. Accordingly, the alkali salt may be described as a mixed alkali salt, for example a sodium/lithium salt or a sodium/potassium salt such as sodium/lithium silicate or sodium/potassium silicate.

The silicate mixture may comprise reactive silica in addition to the silicate material. The reactive silica, where present, has a different chemical composition and/or physical structure (e.g. crystalline, microcrystalline, nanocrystalline or amorphous phase, microstructure, particle morphology or shape) from the silicate material.

The reactive silica may be a high-surface-area (i.e. particulate) form of silica. For example, the reactive silica may have (e.g. comprise particles of silica having) a specific surface area (for example, a BET specific surface area) of no less than about 50 $m^2/g$, or no less than about 100 $m^2/g$, or no less than about 200 $m^2/g$, or no less than about 300 $m^2/g$. The reactive silica may have (e.g. comprise particles of silica having) a specific surface area (for example, a BET specific surface area) of no greater than about 1000 $m^2/g$, for example, no greater than about 800 $m^2/g$, or no greater than about 600 $m^2/g$. The reactive silica may have (e.g. comprise particles of silica having) a specific surface area (for example, a BET specific surface area) of from about 50 $m^2/g$ to about 1000 $m^2/g$, for example, from about 100 $m^2/g$ to about 1000 $m^2/g$, or from about 200 $m^2/g$ to about 1000 $m^2/g$, or from about 300 $m^2/g$ to about 1000 $m^2/g$, or from about 50 $m^2/g$ to about 800 $m^2/g$, or from about 200 $m^2/g$ to about 800 $m^2/g$, or from about 100 $m^2/g$ to about 800 $m^2/g$, or from about 300 $m^2/g$ to about 800 $m^2/g$, or from about 50 $m^2/g$ to about 600 $m^2/g$, or from about 600 $m^2/g$ to about 600 $m^2/g$, or from about 100 $m^2/g$ to about 600 $m^2/g$, or from about 300 $m^2/g$ to about 600 $m^2/g$.

The reactive silica may be a mid-surface-area (i.e. particulate) form of silica. For example, the reactive silica may have (e.g. comprise particles of silica having) a specific surface area (for example, a BET specific surface area) of no less than about 5 $m^2/g$, or no less than about 8 $m^2/g$, or no less than about 10 $m^2/g$, or no less than about 12 $m^2/g$, or no less than about 15 $m^2/g$. The reactive silica may have (e.g. comprise particles of silica having) a specific surface area (for example, a BET specific surface area) of no greater than about 100 $m^2/g$, for example, no greater than about 75 $m^2/g$, or no greater than about 50 $m^2/g$, or no greater than about 30 $m^2/g$. The reactive silica may have (e.g. comprise particles of silica having) a specific surface area (for example, a BET specific surface area) of from about 5 $m^2/g$ to about 100 $m^2/g$, for example, from about 8 $m^2/g$ to about 100 $m^2/g$, or from about 10 $m^2/g$ to about 100 $m^2/g$, or from about 12 $m^2/g$ to about 100 $m^2/g$, or from about 15 $m^2/g$ to about 100 $m^2/g$, or from about 5 $m^2/g$ to about 75 $m^2/g$, or from about 8 $m^2/g$ to about 75 $m^2/g$, or from about 10 $m^2/g$ to about 75 $m^2/g$, or from about 12 $m^2/g$ to about 75 $m^2/g$, or from about 15 $m^2/g$ to about 75 $m^2/g$, or from about 5 $m^2/g$ to about 50 $m^2/g$, or from about 8 $m^2/g$ to about 50 $m^2/g$, or from about 10 $m^2/g$ to about 50 $m^2/g$, or from about 12 $m^2/g$ to about 50 $m^2/g$, or from about 15 $m^2/g$ to about 50 $m^2/g$, or from about 5 $m^2/g$ to about 30 $m^2/g$, or from about 8 $m^2/g$ to about 30 $m^2/g$, or from about 10 $m^2/g$ to about 30 $m^2/g$, or from about 12 $m^2/g$ to about 30 $m^2/g$, or from about 15 $m^2/g$ to about 30 $m^2/g$.

The reactive silica may be a low-surface-area (i.e. particulate) form of silica. For example, the reactive silica may have (e.g. comprise particles of silica having) a specific surface area (for example, a BET specific surface area) of no less than about 1 $m^2/g$, or no less than about 2 $m^2/g$. The reactive silica may have (e.g. comprise particles of silica having) a specific surface area (for example, a BET specific surface area) of no greater than about 10 $m^2/g$, for example, no greater than about 5 $m^2/g$, or no greater than about 3 $m^2/g$. The reactive silica may have (e.g. comprise particles of silica having) a specific surface area (for example, a BET specific surface area) of from about 1 $m^2/g$ to about 10 $m^2/g$, for example, from about 1 $m^2/g$ to about 5 $m^2/g$, or from about 1 $m^2/g$ to about 3 $m^2/g$, or from about 2 $m^2/g$ to about 10 $m^2/g$, or from about 2 $m^2/g$ to about 5 $m^2/g$, or from about 2 $m^2/g$ to about 3 $m^2/g$.

The reactive silica may be predominantly (e.g. entirely) amorphous. The reactive silica may be (e.g. by volume) at least about 50%, for example, at least about 60%, or at least about 70%, or at least about 80%, or at least about 90%, or at least about 95%, amorphous.

The reactive silica may comprise (e.g. be) silica fume. Silica fume, also known as microsilica, is an amorphous polymorph of silicon dioxide. Silica fume may be provided in the form of a powder, for example a powder of spherical particles. The silica fume particles may have a $d_{50}$ of no less than about 10 nm, for example, no less than about 50 nm, or no less than about 100 nm, or no less than about 200 nm, or no less than about 500 nm. The silica fume particles may have a $d_{50}$ of no greater than about 5 μm, or no greater than about 1 μm, or no greater than about 900 nm, or no greater than about 800 nm, or no greater than about 600 nm, or no greater than about 500 nm, or no greater than about 400 nm, or no greater than about 300 nm, or no greater than about 200 nm. The silica fume particles may have a $d_{50}$ of from about 10 nm to about 5 μm, for example, from about 50 nm to about 1 μm, or from about 100 nm to about 500 nm, or from about 100 nm to about 200 nm.

Additionally or alternatively, the reactive silica may comprise (e.g. be) fumed silica. Fumed silica, also known as pyrogenic silica, comprises branched, chain-like agglomerations of amorphous silicon dioxide primary particles. The silicon dioxide primary particles may have a $d_{50}$ of no less than about 1 nm, or no less than about 5 nm, or no less than about 10 nm. The silicon dioxide primary particles may have a $d_{50}$ of no greater than about 1 μm, or no greater than about 500 nm, or no greater than about 100 nm, or no greater than about 50 nm. The silicon dioxide primary particles may have a $d_{50}$ of from about 1 nm to about 1 μm, for example from about 5 nm to about 500 nm, or from about 10 nm to about 100 nm, or from about 10 nm to about 50 nm.

Additionally or alternatively, the reactive silica may comprise (e.g. be) silica gel, natural volcanic glass, perlitic material or combusted organic matter, for example rice husk ash.

The silicate mixture may comprise a glass network-forming element other than silicon. The glass network-forming element other than silicon in the silicate mixture may be provided by the silicate material.

Glass network-forming elements are those elements whose oxides can spontaneously form covalently-bonded glass network structures (for example, meeting Zachariasen's rules for glass network formation). Glass network-forming elements include silicon, boron, germanium and phosphorous.

Accordingly, the glass network-forming element other than silicon present in the mixture may be boron. For example, the silicate material may be a silicate glass which is a boron-containing glass such as borosilicate glass. Additionally or alternatively, the mixture may comprise one or more other sources of boron, such as boric acid or one or more borates (for example, Borax, i.e. sodium borate).

Alternatively, the glass network-forming element other than silicon present in the mixture may be germanium. For example, the silicate material may be a silicate glass which is a germanium-containing glass such as silica-germania glass.

Alternatively, the glass network-forming element other than silicon present in the mixture may be phosphorous. For example, the silicate material may be a silicate glass which is a phosphorous-containing glass. Additionally or alternatively, the mixture may comprise one or more other sources of phosphorous, such as phosphoric acid or one or more phosphates.

The silicate mixture may comprise one or more glass network intermediate elements. The one or more glass network intermediate elements in the silicate mixture may be provided by the silicate material.

Glass network intermediate elements are those elements whose oxides do not spontaneously form glass network structures but which can act like glass network formers when combined with other glass network-forming elements. Glass network intermediates include titanium, aluminium, zirconium, beryllium, magnesium and zinc. The silicate material may be a silicate glass which contains one or more glass network intermediate elements such as titanium, aluminium, zirconium, beryllium, magnesium or zinc. For example, the silicate glass may be an aluminium-containing glass, such as an aluminosilicate glass.

The silicate mixture may comprise one or more glass network-modifying elements. The one or more glass network-modifying elements present in the silicate mixture may be provided by the silicate material and/or the alkali compound.

Glass network-modifying elements are those elements whose oxides do not form glass network structures, either alone or in combination with glass network-forming elements. Glass network-modifying elements, when present in a glass, disrupt or modify the glass network structure. Glass network-modifying elements are typically present in a glass in ionic form; the charge of the glass network-modifying ions is compensated by nearby non-bridging oxygen atoms covalently bonded to nearby glass networking-forming elements.

Glass network-modifying elements include calcium, lead, lithium, sodium and potassium. The silicate material may be a silicate glass which contains one or more glass network-modifying elements such as calcium, lead, lithium, sodium or potassium.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of the silicate material. The silicate mixture may comprise no greater than about 90 wt. %, for example, no greater than about 80 wt. %, or no greater than about 70 wt. %, or no greater than about 60 wt. %, of the silicate material. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of the silicate material.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of amorphous silicate material. The silicate mixture may comprise no greater than about 90 wt. %, for example, no greater than about 80 wt. %, or no greater than about 70 wt. %, or no greater than about 60 wt. %, of amorphous silicate material. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of amorphous silicate material.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of aluminosilicate material. The silicate mixture may comprise no greater than about 90 wt. %, for example, no greater than about 80 wt. %, or no greater than about 70 wt. %, or no greater than about 60 wt. %, of aluminosilicate material. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of the aluminosilicate material.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of silicate salt. The silicate mixture may comprise no greater than about 90 wt. %, for example, no greater than about 80 wt. %, or no greater than about 70 wt. %, or no greater than about 60 wt. %, of silicate salt. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of silicate salt.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of aluminosilicate salt. The silicate mixture may comprise no greater than about 90 wt. %, for example, no greater than about 80 wt. %, or no greater than about 70 wt. %, or no greater than about 60 wt. %, of aluminosilicate salt. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of aluminosilicate salt.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of silicate glass. The silicate mixture may comprise no greater than about 90 wt. %, for example, no greater than about 80 wt. %, or no greater than about 70 wt. %, or no greater than about 60 wt. %, of silicate glass. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of silicate glass.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of aluminosilicate glass. The silicate mixture may comprise no greater than about 90 wt. %, for example, no greater than about 80 wt. %, or no greater than about 70 wt. %, or no greater than about 60 wt. %, of aluminosilicate glass. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of aluminosilicate glass.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of borosilicate glass. The silicate mixture may comprise no greater than about 90 wt. %, for example, no greater than about 80 wt. %, or no greater than about 70 wt. %, or no greater than about 60 wt. %, of borosilicate glass. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of borosilicate glass.

For example, the silicate mixture comprise may comprise no less than about 5 wt. %, for example, no less than about 8 wt. %, or no less than about 10 wt. %, or no less than about 12 wt. %, or no less than about 13 wt. %, or no less than about 14 wt. %, of borosilicate glass. The silicate mixture may comprise no greater than about 50 wt. %, for example, no greater than about 30 wt. %, or no greater than about 25 wt. %, or no greater than about 20 wt. %, or no greater than about 17 wt. %, or no greater than about 16 wt. %, or no greater than about 15 wt. %, or no greater than about 14 wt. %, of borosilicate glass. The silicate mixture may comprise from about 5 wt. % to about 50 wt. %, for example, from about 5 wt. % to about 30 wt. %, or from about 5 wt. % to about 25 wt. %, or from about 10 wt. % to about 20 wt. %, or from about 12 wt. % to about 16 wt. %, or from about 12 wt. % to about 14 wt. %, or from about 13 wt. % to about 14 wt. %, or from about 14 wt. % to about 16 wt. %, or from about 14 wt. % to about 15 wt. %, of borosilicate glass.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of silicate mineral. The silicate mixture may comprise no greater than about 90 wt. %, for example, no greater than about 80 wt. %, or no greater than about 70 wt. %, or no greater than about 60 wt. %, of silicate mineral. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of silicate mineral.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of aluminosilicate mineral. The silicate mixture may comprise no greater than about 90 wt. %, for example, no greater than about 80 wt. %, or no greater than about 70 wt. %, or no greater than about 60 wt. %, of aluminosilicate mineral. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of aluminosilicate mineral.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of volcanic glass. The silicate mixture may comprise no greater than about 90 wt. %, for example, no greater than about 80 wt. %, or no greater than about 70 wt. %, or no greater than about 60 wt. %, of volcanic glass. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of volcanic glass.

For example, the silicate mixture may comprise no less than about 20 wt. %, for example, no less than about 25 wt. %, or no less than about 28 wt. %, or no less than about 30 wt. %, or no less than about 34 wt. %, of volcanic glass. The silicate mixture may comprise no more than about 50 wt. %, for example, no more than about 45 wt. %, or no more than about 40 wt. %, or no more than about 35 wt. %, or no more than about 30 wt. %, of volcanic glass. The silicate mixture may comprise from about 20 wt. % to about 50 wt. %, for example, from about 25 wt. % to about 45 wt. %, or from about 25 wt. % to about 35 wt. %, or from about 25 wt. % to about 30 wt. %, or from about 28 wt. % to about 30 wt. %, or from about 30 wt. % to about 40 wt. %, or from about 34 wt. % to about 35 wt. %, of volcanic glass.

The silicate mixture may comprise no less than about 5 wt. %, for example, no less than about 10 wt. %, or no less than about 20 wt. %, or no less than about 30 wt. %, or no less than about 40 wt. %, or no less than about 50 wt. %, of perlitic material. The silicate mixture may comprise no greater than about 90 wt. %, for example, no greater than about 80 wt. %, or no greater than about 70 wt. %, or no greater than about 60 wt. %, of perlitic material. The silicate mixture may comprise from about 5 wt. % to about 90 wt. %, for example, from about 10 wt. % to about 90 wt. %, or from about 20 wt. % to about 90 wt. %, or from about 30 wt. % to about 90 wt. %, or from about 40 wt. % to about 90 wt. %, or from about 50 wt. % to about 90 wt. %, or from about 5 wt. % to about 80 wt. %, or from about 10 wt. % to about 80 wt. %, or from about 20 wt. % to about 80 wt. %, or from about 30 wt. % to about 80 wt. %, or from about 40 wt. % to about 80 wt. %, or from about 50 wt. % to about 80 wt. %, or from about 5 wt. % to about 70 wt. %, or from about 10 wt. % to about 70 wt. %, or from about 20 wt. % to about 70 wt. %, or from about 30 wt. % to about 70 wt. %, or from about 40 wt. % to about 70 wt. %, or from about 50 wt. % to about 70 wt. %, or from about 5 wt. % to about 60 wt. %, or from about 10 wt. % to about 60 wt. %, or from about 20 wt. % to about 60 wt. %, or from about 30 wt. % to about 60 wt. %, or from about 40 wt. % to about 60 wt. %, or from about 50 wt. % to about 60 wt. %, of perlitic material.

For example, the silicate mixture may comprise no less than about 20 wt. %, for example, no less than about 25 wt. %, or no less than about 28 wt. %, or no less than about 30 wt. %, or no less than about 34 wt. %, of perlitic material. The silicate mixture may comprise no more than about 50 wt. %, for example, no more than about 45 wt. %, or no more than about 40 wt. %, or no more than about 35 wt. %, or no more than about 30 wt. %, of perlitic material. The silicate mixture may comprise from about 20 wt. % to about 50 wt. %, for example, from about 25 wt. % to about 45 wt. %, or from about 25 wt. % to about 35 wt. %, or from about 25 wt. % to about 30 wt. %, or from about 28 wt. % to about 30 wt. %, or from about 30 wt. % to about 40 wt. %, or from about 34 wt. % to about 35 wt. %, of perlitic material.

The silicate mixture may comprise no less than about 20 wt. %, for example, no less than about 25 wt. %, or no less than about 28 wt. %, or no less than about 30 wt. %, or no less than about 34 wt. %, of unexpanded natural perlite ore. The silicate mixture may comprise no more than about 50 wt. %, for example, no more than about 45 wt. %, or no more than about 40 wt. %, or no more than about 35 wt. %, or no more than about 30 wt. %, of unexpanded natural perlite ore. The silicate mixture may comprise from about 20 wt. % to about 50 wt. %, for example, from about 25 wt. % to about 45 wt. %, or from about 25 wt. % to about 35 wt. %, or from about 25 wt. % to about 30 wt. %, or from about 28 wt. % to about 30 wt. %, or from about 30 wt. % to about 40 wt. %, or from about 34 wt. % to about 35 wt. %, of unexpanded natural perlite ore.

The silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of alkali compound. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of alkali compound. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of alkali compound.

The silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of alkali hydroxide. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of alkali hydroxide. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of alkali hydroxide.

The silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of alkali carbonate. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of alkali carbonate. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of alkali carbonate.

The silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of alkali silicate. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of alkali silicate. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of alkali silicate.

For example, the silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of sodium hydroxide, lithium hydroxide, and/or potassium hydroxide. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of sodium hydroxide, lithium hydroxide, and/or potassium hydroxide. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of sodium hydroxide, lithium hydroxide, and/or potassium hydroxide.

The silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of sodium carbonate, lithium carbonate, and/or potassium carbonate. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of sodium carbonate, lithium carbonate, and/or potassium carbonate. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of sodium carbonate, lithium carbonate, and/or potassium carbonate.

The silicate mixture may comprise no less than about 5 wt. %, for example, no less than about 8 wt. %, or no less than about 10 wt. %, or no less than about 12 wt. %, or no less than about 15 wt. %, or no less than about 17 wt. %, of sodium silicate, lithium silicate, and/or potassium silicate. The silicate mixture may comprise no more than about 30 wt. %, for example, no more than about 25 wt. %, or no more than about 20 wt. %, or no more than about 18 wt. %, or no more than about 17 wt. %, or no more than about 15 wt. % or no more than about 14 wt. %, of sodium silicate, lithium silicate, and/or potassium silicate. The silicate mixture may comprise from about 5 wt. % to about 30 wt. %, for example, from about 5 wt. % to about 25 wt. %, or from about 5 wt. % to about 20 wt. %, or from about 8 wt. % to about 20 wt. %, or from about 8 wt. % to about 18 wt. %, or from about 10 wt. % to about 15 wt. %, or from about 12 wt. % to about 15 wt. %, or from about 12 wt. % to about 14 wt. %, or from about 10 wt. % to about 14 wt. %, or from about 14 wt. % to about 18 wt. %, or from about 15 wt. % to about 17 wt. %, or from about 16 wt. % to about 20 wt. %, of sodium silicate, lithium silicate, and/or potassium silicate.

The silicate mixture may comprise no less than about 15 wt. %, for example, no less than about 20 wt. %, or no less than about 22 wt. %, or less than about 25 wt. %, of water. The silicate mixture may comprise no more than about 45 wt. %, for example, no more than about 40 wt. %, or no more than about 35 wt. %, or no more than about 30 wt. %, of water. The silicate mixture may comprise from about 15 wt. % to about 45 wt. %, for example, from about 20 wt. % to about 40 wt. %, or from about 20 wt. % to about 30 wt. %, or from about 25 wt. % to about 30 wt. %, of water.

The silicate mixture may comprise two different silicate materials.

For example, the silicate mixture may comprise a silicate glass (e.g. an aluminosilicate glass) and a silicate mineral (e.g. an aluminosilicate mineral). The silicate mixture may comprise no less than about 5 wt. %, for example, no less than about 8 wt. %, or no less than about 10 wt. %, or no less than about 12 wt. %, or no less than about 15 wt. %, or no less than about 20 wt. %, of the silicate glass (e.g. the aluminosilicate glass). The silicate mixture may comprise no greater than about 50 wt. %, for example, no greater than about 40 wt. %, or no greater than about 30 wt. %, or no greater than about 25 wt. %, or no greater than about 20 wt. %, or no greater than about 16 wt. %, of the silicate glass (e.g. the aluminosilicate glass). The silicate mixture may comprise from about 5 wt. % to about 50 wt. %, for example, from about 8 wt. % to about 40 wt. %, or from about 10 wt. % to about 30 wt. %, or from about 10 wt. % to about 20 wt. %, or from about 12 wt. % to about 16 wt. %, of the silicate glass (e.g. the aluminosilicate glass). Additionally, the silicate mixture may comprise no less than about 10 wt. %, for example, no less than about 15 wt. %, or no less than about 20 wt. %, or no less than about 25 wt. %, of the silicate mineral (e.g. the aluminosilicate mineral). The silicate mixture may comprise no greater than about 60 wt. %, for example, no greater than about 50 wt. %, or no greater than about 45 wt. %, or no greater than about 40 wt. %, or no greater than about 35 wt. %, of the silicate mineral (e.g. the aluminosilicate mineral). The silicate mixture may comprise from about 10 wt. % to about 60 wt. %, for example, from about 15 wt. % to about 50 wt. %, or from about 20 wt. % to about 45 wt. %, or from about 25 wt. % to about 45 wt. %, or from about 25 wt. % to about 30 wt. %, of the silicate mineral (e.g. the aluminosilicate mineral).

Alternatively, the silicate mixture may comprise a first silicate glass (e.g. a first aluminosilicate glass) and a second silicate glass (e.g. a second aluminosilicate glass). The silicate mixture may comprise no less than about 5 wt. %, for example, no less than about 8 wt. %, or no less than about 10 wt. %, or no less than about 12 wt. %, or no less than about 15 wt. %, or no less than about 20 wt. %, of the first silicate glass (e.g. the first aluminosilicate glass). The silicate mixture may comprise no greater than about 50 wt. %, for example, no greater than about 40 wt. %, or no greater than about 30 wt. %, or no greater than about 25 wt. %, or no greater than about 20 wt. %, or no greater than about 16 wt. %, of the first silicate glass (e.g. the first aluminosilicate glass). The silicate mixture may comprise from about 5 wt. % to about 50 wt. %, for example, from about 8 wt. % to about 40 wt. %, or from about 10 wt. % to about 30 wt. %, or from about 10 wt. % to about 20 wt. %, or from about 12 wt. % to about 16 wt. %, of the first silicate glass (e.g. the first aluminosilicate glass). Additionally, the silicate mixture may comprise no less than about 5 wt. %, for example, no less than about 8 wt. %, or no less than about 10 wt. %, or no less than about 12 wt. %, or no less than about 15 wt. %, or no less than about 20 wt. %, of the second silicate glass (e.g. the second aluminosilicate glass). The silicate mixture may comprise no greater than about 50 wt. %, for example, no greater than about 40 wt. %, or no greater than about 30 wt. %, or no greater than about 25 wt. %, or no greater than about 20 wt. %, or no greater than about 16 wt. %, of the second silicate glass (e.g. the second aluminosilicate glass). The silicate mixture may comprise from about 5 wt. % to about 50 wt. %, for example, from about 8 wt. % to about 40 wt. %, or from about 10 wt. % to about 30 wt. %, or from about 10 wt. % to about 20 wt. %, or from about 12 wt. % to about 16 wt. %, of the second silicate glass (e.g. the second aluminosilicate glass).

It may be that one of the two different silicate materials is selected from: a perlitic material, for example unexpanded natural perlite ore having a water content of greater than about 2 wt. %; a phyllosilicate mineral, for example bentonite, kaolin or calcined kaolin; diatomaceous earth. Additionally or alternatively, it may be that one of the two different silicate materials is selected from: fused silica glass, soda-lime glass, borosilicate glass, lead-oxide glass, aluminosilicate glass, silica-germania glass.

For example, it may be that the silicate mixture comprises:

- a first silicate material selected from:
  - a volcanic glass such as a perlitic material, for example unexpanded natural perlite ore having a water content of greater than about 2 wt. %;
  - a phyllosilicate mineral, for example bentonite, kaolin or calcined kaolin; and diatomaceous earth; or a combination thereof; and a second silicate material selected from:

fused silica glass, soda-lime glass, borosilicate glass, lead-oxide glass, aluminosilicate glass, silica-germania glass.

It may be that the silicate mixture comprises a first silicate material, which is a perlitic material, and a second silicate material selected from: fused silica glass, soda-lime glass, borosilicate glass, lead-oxide glass, aluminosilicate glass, silica-germania glass.

It may be that the silicate mixture comprises a perlitic material, for example unexpanded natural perlite ore having a water content of greater than about 2 wt. %, and a silicate glass other than a perlitic material. For example, it may be that the silicate mixture comprises a perlitic material, for example unexpanded natural perlite ore having a water content of greater than about 2 wt. %, and borosilicate glass.

It may be that both the first silicate material and the second silicate material are silicate glasses. For example, it may be that the silicate mixture comprises two different silicate glasses selected from: fused silica glass, soda-lime glass, borosilicate glass, lead-oxide glass, aluminosilicate glass, silica-germania glass. It may be that the silicate mixture comprises borosilicate glass and soda-lime glass.

It may be that the silicate mixture comprises three or more different silicate materials. For example, it may be that the silicate mixture comprises a first silicate glass, a second silicate glass different from the first silicate glass and a silicate mineral different from the first and second silicate glasses. For example, it may be that the silicate mixture comprises: first and second silicate glasses selected from: used silica glass, soda-lime glass, borosilicate glass, lead-oxide glass, aluminosilicate glass, silica-germania glass; and a silicate mineral selected from: a volcanic glass such as a perlitic material, for example unexpanded natural perlite ore having a water content of greater than about 2 wt. %; a phyllosilicate mineral, for example bentonite, kaolin or calcined kaolin; diatomaceous earth; or a combination thereof (for example, a moler (i.e. a clayey diatomite containing both clay minerals and diatomaceous earth)). It may be that the silicate mixture comprises borosilicate glass, soda-lime glass and a perlitic material (e.g. unexpanded natural perlite ore having a water content of greater than about 2 wt. %).

It will be appreciated that whenever a silicate mixture is described as comprising both a silicate material (e.g. a silicate glass or a silicate mineral) and a perlitic material, the silicate material (e.g. the silicate glass or the silicate mineral) is not a perlitic material.

Similarly, whenever a silicate mixture is described as comprising both a silicate glass and a silicate mineral, the silicate glass and the silicate mineral are not the same material, i.e. the silicate glass and the silicate mineral differ in chemical composition and/or physical structure, e.g. crystalline or amorphous phase and/or microstructure.

The silicate mixture may comprise no less than about 1 wt. %, for example, no less than about 5 wt. %, or no less than about 8 wt. %, or no less than about 10 wt. %, or no less than about 12 wt. %, or no less than about 14 wt. %, or no less than about 20 wt. %, or no less than about 30 wt. %, or no less than about 35 wt. %, or no less than about 40 wt. %, of reactive silica. The silicate mixture may comprise no more than about 60 wt. %, for example, no more than about 50 wt. %, or no more than about 45 wt. %, or no more than about 40 wt. %, or no more than about 30 wt. %, or no more than about 20 wt. %, or no more than about 18 wt. %, or no more than about 15 wt. %, of reactive silica. The silicate mixture may comprise from about 1 wt. % to about 60 wt. %, for example, from about 5 wt. % to about 50 wt. %, or from about 5 wt. % to about 45 wt. %, or from about 5 wt. % to about 25 wt. %, or from about 5 wt. % to about 20 wt. %, or from about 8 wt. % to about 20 wt. %, or from about 8 wt. % to about 18 wt. %, or from about 8 wt. % to about 12 wt. %, or from about 10 wt. % to about 18 wt. %, or from about 12 wt. % to about 18 wt. %, or from about 14 wt. % to about 15 wt. %, or from about 20 wt. % to about 60 wt. %, or from about 30 wt. % to about 50 wt. %, or from about 35 wt. % to about 45 wt. %, of reactive silica.

For example, the silicate mixture may comprise no less than about 1 wt. %, for example, no less than about 5 wt. %, or no less than about 8 wt. %, or no less than about 10 wt. %, or no less than about 12 wt. %, or no less than about 14 wt. %, or no less than about 20 wt. %, or no less than about 30 wt. %, or no less than about 35 wt. %, or no less than about 40 wt. %, of silica fume. The silicate mixture may comprise no more than about 60 wt. %, for example, no more than about 50 wt. %, or no more than about 45 wt. %, or no more than about 40 wt. %, or no more than about 30 wt. %, or no more than about 20 wt. %, or no more than about 18 wt. %, or no more than about 15 wt. %, of silica fume. The silicate mixture may comprise from about 1 wt. % to about 60 wt. %, for example, from about 5 wt. % to about 50 wt. %, or from about 5 wt. % to about 45 wt. %, or from about 5 wt. % to about 25 wt. %, or from about 5 wt. % to about 20 wt. %, or from about 8 wt. % to about 20 wt. %, or from about 8 wt. % to about 18 wt. %, or from about 8 wt. % to about 12 wt. %, or from about 10 wt. % to about 18 wt. %, or from about 12 wt. % to about 18 wt. %, or from about 14 wt. % to about 15 wt. %, or from about 20 wt. % to about 60 wt. %, or from about 30 wt. % to about 50 wt. %, or from about 35 wt. % to about 45 wt. %, of silica fume.

Alternatively, the silicate mixture may comprise no less than about 1 wt. %, for example, no less than about 5 wt. %, or no less than about 8 wt. %, or no less than about 10 wt. %, or no less than about 12 wt. %, or no less than about 14 wt. %, or no less than about 20 wt. %, or no less than about 30 wt. %, or no less than about 35 wt. %, or no less than about 40 wt. %, of fumed silica. The silicate mixture may comprise no more than about 60 wt. %, for example, no more than about 50 wt. %, or no more than about 45 wt. %, or no more than about 40 wt. %, or no more than about 30 wt. %, or no more than about 20 wt. %, or no more than about 18 wt. %, or no more than about 15 wt. %, of fumed silica. The silicate mixture may comprise from about 1 wt. % to about 60 wt. %, for example, from about 5 wt. % to about 50 wt. %, or from about 5 wt. % to about 45 wt. %, or from about 5 wt. % to about 25 wt. %, or from about 5 wt. % to about 20 wt. %, or from about 8 wt. % to about 20 wt. %, or from about 8 wt. % to about 18 wt. %, or from about 8 wt. % to about 12 wt. %, or from about 10 wt. % to about 18 wt. %, or from about 12 wt. % to about 18 wt. %, or from about 14 wt. % to about 15 wt. %, or from about 20 wt. % to about 60 wt. %, or from about 30 wt. % to about 50 wt. %, or from about 35 wt. % to about 45 wt. %, of fumed silica.

The silicate mixture may comprise: from about 5 wt. % to about 80 wt. %, for example, from about 10 wt. % to about 70 wt. %, or from about 10 wt. % to about 20 wt. %, or from about 20 wt. % to about 70 wt. %, or from about 30 wt. % to about 70 wt. %, or from about 40 wt. % to about 70 wt. %, or from about 50 wt. % to about 70 wt. %, of silicate material; from about 5 wt. % to about 30 wt. %, for example, from about 5 wt. % to about 20 wt. %, of alkali compound;

and from about 20 wt. % to about 40 wt. %, for example, from about 20 wt. % to about 30 wt. %, of water.

For example, the silicate mixture may consist of: from about 40 wt. % to about 80 wt. %, for example, from about 50 wt. % to about 70 wt. %, of silicate material; from about 5 wt. % to about 30 wt. %, for example, from about 5 wt. % to about 20 wt. %, of alkali compound; and from about 20 wt. % to about 50 wt. %, for example, from about 20 wt. % to about 40 wt. %, of water. The silicate mixture may consist of: from about 40 wt. % to about 80 wt. %, for example, from about 50 wt. % to about 70 wt. %, of silicate glass (e.g. borosilicate glass); from about 5 wt. % to about 30 wt. %, for example, from about 5 wt. % to about 20 wt. %, of alkali compound; and from about 20 wt. % to about 50 wt. %, for example, from about 20 wt. % to about 40 wt. %, of water.

The silicate mixture may comprise: from about 5 wt. % to about 80 wt. %, for example, from about 10 wt. % to about 70 wt. %, or from about 10 wt. % to about 50 wt. %, or from about 10 wt. % to about 30 wt. %, of silicate material; from about 10 wt. % to about 60 wt. %, for example, from about 15 wt. % to about 50 wt. %, of reactive silica other than the silicate material; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

For example, the silicate mixture may consist of: from about 5 wt. % to about 80 wt. %, for example, from about 10 wt. % to about 70 wt. %, or from about 10 wt. % to about 50 wt. %, or from about 10 wt. % to about 30 wt. %, of silicate glass (e.g. borosilicate glass and/or soda-lime glass); from about 10 wt. % to about 60 wt. %, for example, from about 15 wt. % to about 50 wt. %, of reactive silica; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of a first silicate material; from about 5 wt. % to about 50 wt. %, for example, from about 5 wt. % to about 40 wt. %, of a second silicate material; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of a first silicate glass (e.g. borosilicate glass); from about 5 wt. % to about 50 wt. %, for example, from about 5 wt. % to about 40 wt. %, of a second silicate glass (e.g. soda-lime glass); from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of silicate glass (e.g. borosilicate and/or soda-lime glass); from about 5 wt. % to about 50 wt. %, for example, from about 5 wt. % to about 40 wt. %, of silicate mineral other than the silicate glass; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of perlitic material (e.g. unexpanded natural perlite ore having a water content of greater than about 2 wt. %); from about 5 wt. % to about 50 wt. %, for example, from about 5 wt. % to about 40 wt. %, of silicate glass other than the perlitic material (e.g. borosilicate and/or soda-lime glass); from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of a first silicate material; from about 5 wt. % to about 50 wt. %, for example, from about 5 wt. % to about 40 wt. %, of a second silicate material; from about 5 wt. % to about 50 wt. %, for example from about 5 wt. % to about 40 wt. %, of reactive silica other than the first and second silicate materials; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of a first silicate glass; from about 5 wt. % to about 50 wt. %, for example, from about 5 wt. % to about 40 wt. %, of a second silicate glass; from about 5 wt. % to about 50 wt. %, for example from about 5 wt. % to about 40 wt. %, of reactive silica; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of silicate glass; from about 5 wt. % to about 50 wt. %, for example, from about 5 wt. % to about 40 wt. %, of a silicate mineral; from about 5 wt. % to about 50 wt. %, for example from about 5 wt. % to about 40 wt. %, of reactive silica; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 50 wt. %, for example, from about 5 wt. % to about 40 wt. %, of a perlitic material (e.g. unexpanded natural perlite ore having a water content of greater than about 2 wt. %); from about 5 wt. % to about 50 wt. %, for example, from about 5 wt. % to about 40 wt. %, of silicate glass (e.g. borosilicate and/or soda-lime glass) other than the perlitic material; from about 5 wt. % to about 50 wt. %, for example from about 5 wt. % to about 40 wt. %, of reactive silica other than the first and second silicate materials; from about 5 wt. % to about 30 wt. %, for example, from about 5 wt. % to about 25 wt. %, of alkali compound; and from about 20 wt. % to about 40 wt. %, for example, from about 20 wt. % to about 35 wt. %, of water.

The silicate mixture may comprise: from about 5 wt. % to about 25 wt. %, for example from about 10 wt. % to about 20 wt. %, of silicate glass; from about 1 wt. % to about 50 wt. %, for example from about 5 wt. % to about 45 wt. %, of reactive silica; from about 5 wt. % to about 30 wt. %, for example from about 10 wt. % to about 20 wt. %, of alkali compound; from about 20 wt. % to about 40 wt. %, for example from about 20 wt. % to about 30 wt. %, of water; and optionally from about 20 wt. % to about 55 wt. %, for example from about 25 wt. % to about 50 wt. %, of perlitic material. For example, the silicate mixture may comprise: from about 5 wt. % to about 25 wt. %, for example from about 10 wt. % to about 20 wt. %, of borosilicate glass; from about 5 wt. % to about 20 wt. %, for example from about 10 wt. % to about 45 wt. %, of silica fume; from about 5 wt. % to about 20 wt. %, for example from about 10 wt. % to about 20 wt. %, of sodium hydroxide and/or lithium hydroxide; from about 20 wt. % to about 40 wt. %, for example from about 20 wt. % to about 30 wt. %, of water; and optionally from about 20 wt. % to about 55 wt. %, for example from about 25 wt. % to about 50 wt. %, of unexpanded natural perlite ore.

The silicate mixture may comprise: from about 5 wt. % to about 25 wt. %, for example from about 10 wt. % to about 20 wt. %, of silicate glass; from about 20 wt. % to about 50 wt. %, for example from about 25 wt. % to about 45 wt. %, of perlitic material; from about 5 wt. % to about 20 wt. %, for example from about 10 wt. % to about 15 wt. %, of reactive silica; from about 5 wt. % to about 20 wt. %, from about 10 wt. % to about 17 wt. %, of alkali compound; and from about 20 wt. % to about 40 wt. %, for example from about 20 wt. % to about 30 wt. %, of water. For example, the silicate mixture may comprise: from about 5 wt. % to about 25 wt. %, for example from about 10 wt. % to about 20 wt. %, of borosilicate glass; from about 20 wt. % to about 50 wt. %, for example from about 25 wt. % to about 45 wt. %, of unexpanded natural perlite ore; from about 5 wt. % to about 20 wt. %, for example from about 10 wt. % to about 15 wt. %, of silica fume; from about 5 wt. % to about 20 wt. %, from about 10 wt. % to about 17 wt. %, of sodium hydroxide and/or lithium hydroxide; and from about 20 wt. % to about 40 wt. %, for example from about 20 wt. % to about 30 wt. %, of water.

The silicate mixture may comprise (e.g. consist essentially, or consist, of): from about 10 wt. % to about 15 wt. % of silicate glass; from about 35 wt. % to about 45 wt. % of reactive silica; from about 15 wt. % to about 20 wt. % of alkali compound; and from about 25 wt. % to about 35 wt. % of water. For example, the silicate mixture may comprise (e.g. consist essentially, or consist, of): from about 10 wt. % to about 15 wt. % of borosilicate glass; from about 35 wt. % to about 45 wt. % of silica fume; from about 15 wt. % to about 20 wt. % of sodium hydroxide and/or lithium hydroxide; and from about 25 wt. % to about 35 wt. % of water.

The silicate mixture may comprise (e.g. consist essentially, or consist, of): from about 30 wt. % to about 40 wt. % of perlitic material; from about 10 wt. % to about 20 wt. % of silicate glass; from about 5 wt. % to about 15 wt. % of reactive silica; from about 10 wt. % to about 15 wt. % of alkali compound; and from about 20 wt. % to about 30 wt. % of water. For example, the silicate mixture may comprise (e.g. consist essentially, or consist, of): from about 30 wt. % to about 40 wt. % of unexpanded natural perlite ore; from about 10 wt. % to about 20 wt. % of borosilicate glass; from about 5 wt. % to about 15 wt. % of silica fume; from about 10 wt. % to about 15 wt. % of sodium hydroxide and/or lithium hydroxide; and from about 20 wt. % to about 30 wt. % of water.

The silicate mixture may comprise (e.g. consist essentially, or consist, of): from about 25 wt. % to about 35 wt. % of perlitic material; from about 10 wt. % to about 20 wt. % of silicate glass; from about 10 wt. % to about 20 wt. % of reactive silica; from about 10 wt. % to about 20 wt. % of alkali compound; and from about 20 wt. % to about 30 wt. % of water. For example, the silicate mixture may comprise (e.g. consist essentially, or consist, of): from about 25 wt. % to about 35 wt. % of unexpanded natural perlite ore; from about 10 wt. % to about 20 wt. % of borosilicate glass; from about 10 wt. % to about 20 wt. % of silica fume; from about 10 wt. % to about 20 wt. % of sodium hydroxide and/or lithium hydroxide; and from about 20 wt. % to about 30 wt. % of water.

The silicate mixture may comprise (e.g. consist essentially, or consist, of): from about 20 wt. % to about 50 wt. % of silicate mineral; from about 10 wt. % to about 20 wt. % of silicate glass; from about 5 wt. % to about 45 wt. % of reactive silica; from about 5 wt. % to about 30 wt. % of alkali compound; and from about 15 wt. % to about 40 wt. % of water. For example, the silicate mixture may comprise (e.g. consist essentially, or consist, of): from about 20 wt. % to about 50 wt. % of perlitic material; from about 10 wt. % to about 20 wt. % of borosilicate and/or soda-lime glass; from about 5 wt. % to about 45 wt. % of silica fume; from about 5 wt. % to about 30 wt. % of sodium hydroxide and/or lithium hydroxide; and from about 15 wt. % to about 40 wt. % of water. The silicate mixture may comprise (e.g. consist essentially, or consist, of): from about 20 wt. % to about 50 wt. % of perlitic material; from about 10 wt. % to about 20 wt. % of borosilicate and/or soda-lime glass; from about 5 wt. % to about 45 wt. % of silica fume; from about 5 wt. % to about 20 wt. % of sodium hydroxide; from about 0 wt. % to about 10 wt. % of lithium hydroxide; and from about 15 wt. % to about 40 wt. % of water.

The silicate mixture may comprise no less than about 0.01 wt. %, for example, no less than about 0.1 wt. %, or no less than about 1 wt. %, of a glass network-forming element other than silicon. The silicate mixture may comprise no greater than about 20 wt. %, for example, no greater than about 15 wt. %, or no greater than about 10 wt. %, or no greater than about 5 wt. %, or no greater than about 3 wt. %, or no greater than about 1 wt. %, of a glass network-forming element other than silicon. The silicate mixture may comprise from about 0.01 wt. % to about 10 wt. %, for example, from about 0.01 wt. % to about 5 wt. %, or from about 0.01 wt. % to about 3 wt. %, or from about 0.01 wt. % to about 1 wt. %, of a glass network-forming element other than silicon.

For example, the silicate mixture may comprise no less than about 0.01 wt. %, for example, no less than about 0.1 wt. %, or no less than about 1 wt. %, of boron. The silicate mixture may comprise no greater than about 20 wt. %, for example, no greater than about 15 wt. %, or no greater than about 10 wt. %, or no greater than about 5 wt. %, or no greater than about 3 wt. %, or no greater than about 1 wt. %, of boron. The silicate mixture may comprise from about 0.01 wt. % to about 10 wt. %, for example, from about 0.01 wt. % to about 5 wt. %, or from about 0.01 wt. % to about 3 wt. %, or from about 0.01 wt. % to about 1 wt. %, of boron.

The silicate mixture may comprise boron in an amount such that the cured silicate mixture (i.e. the solid precursor or the expandable material) and/or the expanded material comprises less than about 5.0 wt. %, for example, less than about 3.5 wt. %, of $B_2O_3$.

The silicate mixture may comprise no less than about 0.01 wt. %, for example, no less than about 0.1 wt. %, or no less than about 1 wt. %, of a glass network intermediate element. The silicate mixture may comprise no greater than about 20 wt. %, for example, no greater than about 15 wt. %, or no greater than about 10 wt. %, or no greater than about 5 wt. %, or no greater than about 3 wt. %, or no greater than about 1 wt. %, of a glass network intermediate element. The silicate mixture may comprise from about 0.01 wt. % to about 10 wt. %, for example, from about 0.01 wt. % to about 5 wt. %, or from about 0.01 wt. % to about 3 wt. %, or from about 0.01 wt. % to about 1 wt. %, of a glass network intermediate element.

The silicate mixture may comprise no less than about 0.01 wt. %, for example, no less than about 0.1 wt. %, or no less than about 1 wt. %, of a glass network-modifying element. The silicate mixture may comprise no greater than about 20 wt. %, for example, no greater than about 15 wt. %, or no greater than about 10 wt. %, or no greater than about 5 wt. %, or no greater than about 3 wt. %, or no greater than about 1 wt. %, of a glass network-modifying element. The silicate mixture may comprise from about 0.01 wt. % to about 10 wt. %, for example, from about 0.01 wt. % to about 5 wt. %, or from about 0.01 wt. % to about 3 wt. %, or from about 0.01 wt. % to about 1 wt. %, of a glass network-modifying element.

It may be that the ratio of the total wt. % of reactive silica in the silicate mixture to the total wt. % of silicate glass in the silicate mixture, i.e.:

$$\frac{\text{wt. \% reactive silica}}{\text{wt. \% silica glass}}$$

is no less than about 1, or no less than about 1.5, or no less than about 2, or no less than about 2.5, or no less than about 3. It may be that the ratio of the total wt. % of reactive silica in the silicate mixture to the total wt. % of silicate glass in the silicate mixture is no greater than about 4, or no greater than about 3.5, or no greater than about 3. It may be that the ratio of the total wt. % of reactive silica in the silicate mixture to the total wt. % of silicate glass in the silicate mixture is from about 1 to about 4, or from about 1.5 to about 3.5, or from about 2 to about 3. It may be that the ratio of the total wt. % of reactive silica in the silicate mixture to the total wt. % of silicate glass in the silicate mixture is about 2. It may be that the ratio of the total wt. % of reactive silica in the silicate mixture to the total wt. % of silicate glass in the silicate mixture is about 3.

It may be that the ratio of the total wt. % of silica fume in the silicate mixture to the total wt. % of borosilicate glass in the silicate mixture, i.e.:

$$\frac{\text{wt. \% silica fume}}{\text{wt. \% borosilicate glass}}$$

is no less than about 1, or no less than about 1.5, or no less than about 2, or no less than about 2.5, or no less than about 3. It may be that the ratio of the total wt. % of silica fume in the silicate mixture to the total wt. % of borosilicate glass in the silicate mixture is no greater than about 4, or no greater than about 3.5, or no greater than about 3. It may be that the ratio of the total wt. % of silica fume in the silicate mixture to the total wt. % of borosilicate glass in the silicate mixture is from about 1 to about 4, or from about 1.5 to about 3.5, or from about 2 to about 3. It may be that the ratio of the total wt. % of silica fume in the silicate mixture to the total wt. % of borosilicate glass in the silicate mixture is about 2. It may be that the ratio of the total wt. % of silica fume in the silicate mixture to the total wt. % of borosilicate glass in the silicate mixture is about 3.

It may be that the ratio of the combined total wt. % of reactive silica and silicate mineral in the silicate mixture to the total wt. % of silicate glass in the silicate mixture, i.e.:

$$\frac{\text{wt. \% reactive silica} + \text{wt. \% silicate mineral}}{\text{wt. \% silicate glass}}$$

is no less than about 2, for example, no less than about 2.5, or no less than about 3. It may be that the ratio of the combined total wt. % of reactive silica and silicate mineral in the silicate mixture to the total wt. % of silicate glass in the silicate mixture is no greater than about 4, or no greater than about 3.5, or no greater than about 3. It may be that the ratio of the combined total wt. % of reactive silica and silicate mineral in the silicate mixture to the total wt. % of silicate glass in the silicate mixture is from about 2 to about 4, or from about 2.5 to about 3.5. It may be that the ratio of the combined total wt. % of reactive silica and silicate mineral in the silicate mixture to the total wt. % of silicate glass in the silicate mixture is about 3.

It may be that the ratio of the combined total wt. % of silica fume and perlitic material in the silicate mixture to the total wt. % of borosilicate glass in the silicate mixture, i.e.:

$$\frac{\text{wt. \% silica fume} + \text{wt. \% perlitic material}}{\text{wt. \% borosilicate glass}}$$

is no less than about 2, for example, no less than about 2.5, or no less than about 3. It may be that the ratio of the combined total wt. % of silica fume and perlitic material in the silicate mixture to the total wt. % of borosilicate glass in the silicate mixture is no greater than about 4, or no greater than about 3.5, or no greater than about 3. It may be that the ratio of the combined total wt. % of silica fume and perlitic material in the silicate mixture to the total wt. % of borosilicate glass in the silicate mixture is from about 2 to about 4, or from about 2.5 to about 3.5. It may be that the ratio of the combined total wt. % of silica fume and perlitic material in the silicate mixture to the total wt. % of borosilicate glass in the silicate mixture is about 3.

It may be that the ratio of the total wt. % of reactive silica in the silicate mixture to the total wt. % of silicate mineral in the silicate mixture is no less than about 0.1, or no less than about 0.2, or no less than about 0.3.

It may be that the ratio of the total wt. % of silicon in the silicate mixture to the total wt. % of sodium in the silicate mixture (i.e. the Si/Na ratio) is no less than about 1, or no less than about 1.2, or no less than about 1.4, or no less than about 1.5. It may be that the Si/Na ratio is no greater than about 4, or no greater than about 3.5, or no greater than about 3, or no greater than about 2.9. It may be that the Si/Na ratio is from about 1 to about 4, for example, from about 1.2 to about 3.5, or from about 1.4 to about 3, or from about 1.5 to about 2.9.

The method may comprise dissolving the alkali compound in the water to form an alkaline aqueous solution. Dissolution of the alkali compound in the water may be an exothermic process. The method may comprise adding the silicate material to the alkaline aqueous solution and stirring. Adding the silicate material to the alkaline aqueous solution may comprise adding any other input materials to the alkaline aqueous solution, including any silicate glasses, silicate minerals and/or reactive silica. The method may comprise stirring the silicate mixture, typically for 1 to 10 minutes, to form a paste. The heat produced on dissolution of the alkali compound may assist in dissolution of the other input materials.

The method may comprise moulding the silicate mixture prior to curing.

The silicate mixture may be cured in an oven. The silicate mixture may be cured at a temperature no greater than about 250° C., for example, from about 20° C. to about 200° C., or from about 20° C. to about 150° C., or from about 20° C. to about 120° C., or from about 50° C. to about 120° C., or from about 50° C. to about 110° C., or from about 70° C. to about 100° C. The silicate mixture may be cured for no less than about an hour, for example, no less than about two hours, or no less than about four hours, or no less than about six hours, or no less than about eight hours, or no less than about ten hours, or no less than about twelve hours, or no less than about twenty-four hours. The silicate mixture may be cured for no greater than about seventy-two hours, for example, no greater than about forty-eight hours, or no greater than about twenty-four hours. The silicate mixture may be cured for from about an hour to about seventy-two hours, for example, from about two hours to about forty-eight hours, or from about four hours to about twenty-four hours, or from about four hours to about twelve hours, or from about twelve hours to about seventy-two hours, or from about twenty-four hours to about seventy-two hours.

During curing, the silicate mixture may undergo polymerisation to form an inorganic polymer network. The polymerisation of the silicate mixture may be similar to a geopolymerisation process. In geopolymerisation, aluminosilicate materials, upon alkali activation, polymerise to form a rigid three-dimensional framework of $SiO_4$ and $AlO_4$ tetrahedra linked by shared oxygens. The form of the framework created (i.e. poly(sialate), poly(sialate-siloxo) or poly(sialate-disiloxo) depends on the ratio of $SiO_2$ to $Al_2O_3$ in the initial silicate mixture. However, the inorganic polymer network formed during curing of the silicate mixture in the present invention is typically less rigid and more linear than a geopolymer and incorporates large amounts of water.

The solid precursor may be crushed following curing to form a granular material (i.e. a granular expandable material). The method may comprise sieving the solid precursor (i.e. the granular material) following crushing. The method may comprise crushing (and optionally sieving) the solid precursor to obtain a granular material (i.e. a granular expandable material) having a particle size (e.g. a doo) no less than about 10 μm, for example, no less than about 50 μm, or no less than about 100 μm, or no less than about 250 μm, or no less than about 500 μm, or no less than about 750 μm, or no less than about 1 mm. The method may comprise crushing (and optionally sieving) the solid precursor to obtain a granular material (i.e. a granular expandable material) having a mean particle size (e.g. a doo) no greater than about 10 mm, for example, no greater than about 8 mm, or no greater than about 6 mm, or no greater than about 4 mm, 2 mm, or no greater than about 1.5 mm, or no greater than about 1 mm. The method may comprise crushing (and optionally sieving) the solid precursor to obtain a granular material (i.e. a granular expandable material) having a mean particle size (e.g. a $d_{50}$) from about 10 μm to about 10 mm, or from about 10 μm to about 8 mm, or from about 10 μm to about 6 mm, or from about 10 μm to about 4 mm, or from about 10 μm to about 2 mm, or from about 100 μm to about 2 mm, or from about 500 μm to about 1 mm, or from about 250 μm to about 750 μm, or from about 500 μm to about 1.5 mm, or from about 750 μm to about 1.5 mm.

The method may comprise more than one crushing and/or sieving step. For example, the method may comprise: crushing the solid precursor in a first crushing step to form a granular material having a first particle size; determining the first particle size; and then crushing the granular material in a second crushing step to form a granular material having a second particle size, the second particle size being lower than the first particle size.

The method may comprise heating the granular material (i.e. the granular expandable material) to form an expanded granular material. The method may comprise heating the granular material (i.e. the granular expandable material) to a temperature no greater than about 1100° C., for example, no greater than about 1000° C., or no greater than about 900° C., or no greater than about 700° C., or no greater than about 600° C. The method may comprise heating the granular material (i.e. the granular expandable material) to a temperature no less than about 200° C., for example, no less than about 300° C., or no less than about 400° C. The method may comprise heating the granular material (i.e. the granular expandable material) to a temperature from about 200° C. to about 1100° C., for example, from about 200° C. to about 1000° C., or from about 200° C. to about 900° C., or from about 300° C. to about 700° C., or from about 300° C. to about 700° C., or from about 400° C. to about 600° C.

The method may comprise heating the granular material (i.e. the granular expandable material) in a furnace, for example in a furnace selected from: an infra-red (IR) furnace, an electrically heated furnace, a natural gas or LPG expansion furnace. The furnace may a horizontal furnace, a vertical furnace or an inclined furnace. The method may comprise heating the granular material (i.e. the granular expandable material) in a fluidized bed reactor.

The method may comprise crushing (and optionally sieving) the solid precursor to obtain a granular material (i.e. a granular expandable material) having a particle size (e.g. a $d_{50}$) no less than about 500 μm, for example no less than about 1 mm, or no less than about 2 mm, and heating the granular material (i.e. the granular expandable material) in an infra-red (IR) furnace to form an expanded granular material. An example infra-red (IR) furnace contains Elstein HTS (125×125 mm) ceramic infra-red panel radiators which operate at 64 kW/m with a maximum operating temperature of 860° C. The infra-red (IR) furnace may contain a steel vibrating plate for vibrating the granular material during heating. Example mechanical vibrating elements are available from Italvibras G. Silingardi S.p.A, for example model M3/45-S02, Series: AA, C.F.KN 0.44/0.64, RPM 3000/3800.

The method may comprise crushing (and optionally sieving) the solid precursor to obtain a granular material (i.e. a granular expandable material) having a particle size (e.g. a $d_{50}$) no greater than about 500 μm and heating the granular material (i.e. the granular expandable material) in an electrical furnace (for example, a vertical electrical furnace) to form an expanded granular material.

For the avoidance of doubt, the expanded silicate material may:

(a) have:

a loose bulk density, measured according to PI 200-77, of from about 15 $kg/m^3$ to about 450 $kg/m^3$, for example from about 20 $kg/m^3$ to about 100 $kg/m^3$, or from about 20 $kg/m^3$ to about 30 $kg/m^3$, or from about 20 $kg/m^3$ to about 40 $kg/m^3$, or from about 55 $kg/m^3$ to about 100 $kg/m^3$, or from about 70 $kg/m^3$ to about 100 $kg/m^3$;

a compaction resistance, measured according to PI 306-80, of from about 3 PSI to about 350 PSI at 2", for example from about 3 PSI to about 200 PSI at 2", or from about 3 PSI to about 100 PSI at 2", or from about 3 PSI to about 10 PSI at 2", or from about 30 PSI to about 80 PSI at 2", or from about 40 PSI to about 75 PSI at 2", or from about 5 PSI to about 20 PSI at 2"; and/or a thermal conductivity, measured according to EN 12667, of from about 0.0300 W/mK to about 0.0700 W/mk, for example from about 0.0320 W/mK to about 0.0420 W/mK, from about 0.0350 W/mK to about 0.0400 W/mK, or from about 0.0360 W/mK to about 0.0410 W/mK, or from about 0.0320 W/mK to about 0.0340 W/mK, or from about 0.042 W/mK to about 0.055 W/mK, or from about 0.055 W/mK to about 0.070 W/mK;

(b) comprise:

from about 8 wt. % to about 30 wt. %, for example from about 13 wt. % to about 22 wt. %, of $X_2O$, X being an alkali metal such as Na or Li;

from about 0 wt. % to about 15 wt. %, for example from about 5 wt. % to about 9 wt. %, of $Al_2O_3$; and from about 50 wt. % to about 80 wt. %, for example from about 60 wt. % to about 75 wt. %, of $SiO_2$; and optionally from about 0 wt. % to about 10 wt. %, for example from about 0.5 wt. % to about 5 wt. % of $H_2O$;

and optionally wherein the expanded silicate material comprises less than about 5 wt. %, for example less than about 3.5 wt. %, of $B_2O_3$; and/or (c) be manufactured by:

forming a silicate mixture comprising:

a silicate material;

an alkali compound; and water;

curing the silicate mixture to form a solid precursor;

crushing and/or milling the solid precursor to form a granular expandable silicate material; and heating the granular expandable silicate material to form an expanded silicate material.

It may be that the expanded silicate material has:

(a) a loose bulk density, measured according to PI 200-77, of from about 18 kg/m$^3$ to about 30 kg/m$^3$;

(b) a compaction resistance, measured according to PI 306-80, of from about 4 PSI to about 8 PSI at 2"; and/or (c) a thermal conductivity, measured according to EN 12667, of from about 0.0300 W/mK to about 0.0400 W/mk.

It may be that the expanded silicate material has:

(a) a loose bulk density, measured according to PI 200-77, of from about 50 kg/m$^3$ to about 100 kg/m$^3$;

(b) a compaction resistance, measured according to PI 306-80, of from about 30 PSI to about 80 PSI at 2"; and/or (c) a thermal conductivity, measured according to EN 12667, of from about 0.0350 W/mK to about 0.0450 W/mk.

It may be that the expanded silicate material has:

(a) a loose bulk density, measured according to PI 200-77, of from about 70 kg/m$^3$ to about 105 kg/m$^3$;

(b) a compaction resistance, measured according to PI 306-80, of from about 40 PSI to about 75 PSI at 2"; and/or (c) a thermal conductivity, measured according to EN 12667, of from about 0.0350 W/mK to about 0.0450 W/mk.

It may be that the expanded silicate material has:

(a) a loose bulk density, measured according to PI 200-77, of from about 20 kg/m$^3$ to about 40 kg/m$^3$;

(b) a compaction resistance, measured according to PI 306-80, of from about 5 PSI to about 15 PSI at 2"; and/or (c) a thermal conductivity, measured according to EN 12667, of from about 0.0310 W/mK to about 0.0350 W/mk.

It may be that the expanded silicate material is formed from a silicate mixture comprising:

one or more silicate materials and/or reactive silica comprising: from about 44 wt. % to about 54 wt. % of $SiO_2$; from about 0.1 wt. % to about 1 wt. % $Na_2O$; from about 0.1 wt. % to about 1 wt. % $Al_2O_3$; less than about 0.2 wt. % $Fe_2O_3$; from about 0.05 wt. % to about 0.5 wt. % CaO; less than about 0.1 wt. % MgO; from about 0.05 wt. % to about 0.5 wt. % $K_2O$; from about 1 wt. % to about 3 wt. % $B_2O_3$; and from about 0.1 to about 1 wt. % of water and/or volatile substances (i.e. substances which contribute to "loss on ignition" (LOI));

an alkali compound; and water;

and the expanded silicate material has:

(a) a loose bulk density, measured according to PI 200-77, of from about 18 kg/m$^3$ to about 30 kg/m$^3$;

(b) a compaction resistance, measured according to PI 306-80, of from about 4 PSI to about 8 PSI at 2"; and/or (c) a thermal conductivity, measured according to EN 12667, of from about 0.0300 W/mK to about 0.0400 W/mk.

It may be that the expanded silicate material is formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

and the expanded silicate material has:

(a) a loose bulk density, measured according to PI 200-77, of from about 50 kg/m$^3$ to about 100 kg/m$^3$;

(b) a compaction resistance, measured according to PI 306-80, of from about 30 PSI to about 80 PSI at 2"; and/or (c) a thermal conductivity, measured according to EN 12667, of from about 0.0350 W/mK to about 0.0450 W/mk.

It may be that the expanded silicate material is formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

and the expanded silicate material has:

(a) a loose bulk density, measured according to PI 200-77, of from about 70 kg/m$^3$ to about 105 kg/m$^3$;

(b) a compaction resistance, measured according to PI 306-80, of from about 40 PSI to about 75 PSI at 2"; and/or (c) a thermal conductivity, measured according to EN 12667, of from about 0.0350 W/mK to about 0.0450 W/mk.

It may be that the expanded silicate material is formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 2.5 wt. % to about 4.5 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

and the expanded silicate material has:

(a) a loose bulk density, measured according to PI 200-77, of from about 20 kg/m$^3$ to about 40 kg/m$^3$;

(b) a compaction resistance, measured according to PI 306-80, of from about 5 PSI to about 15 PSI at 2"; and/or (c) a thermal conductivity, measured according to EN 12667, of from about 0.0310 W/mK to about 0.0350 W/mk.

It may be that the expanded silicate material is formed from a silicate mixture comprising: from about 10 wt. % to about 15 wt. % of borosilicate glass; from about 35 wt. % to about 45 wt. % of silica fume; from about 15 wt. % to about 20 wt. % of sodium hydroxide; and from about 25 wt. % to about 32 wt. % of water; and the expanded silicate material has:

(a) a loose bulk density, measured according to PI 200-77, of from about 18 kg/m$^3$ to about 30 kg/m$^3$;

(b) a compaction resistance, measured according to PI 306-80, of from about 4 PSI to about 8 PSI at 2"; and/or (c) a thermal conductivity, measured according to EN 12667, of from about 0.0300 W/mK to about 0.0400 W/mk.

It may be that the expanded silicate material is formed from a silicate mixture comprising: from about 12 wt. % to about 18 wt. % of borosilicate glass; from about 5 wt. % to about 15 wt. % of silica fume; from about 10 wt. % to about 15 wt. % of sodium hydroxide; and from about 20 wt. % to about 30 wt. % of water; and the expanded silicate material has:

(a) a loose bulk density, measured according to PI 200-77, of from about 50 kg/m$^3$ to about 100 kg/m$^3$;

(b) a compaction resistance, measured according to PI 306-80, of from about 30 PSI to about 80 PSI at 2"; and/or (c) a thermal conductivity, measured according to EN 12667, of from about 0.0350 W/mK to about 0.0450 W/mk.

It may be that the expanded silicate material is formed from a silicate mixture comprising: from about 12 wt. % to about 18 wt. % of borosilicate glass; from about 5 wt. % to about 10 wt. % of silica fume; from about 8 wt. % to about 16 wt. % of sodium hydroxide; and from about 20 wt. % to about 32 wt. % of water; and the expanded silicate material has:

(a) a loose bulk density, measured according to PI 200-77, of from about 70 kg/m$^3$ to about 105 kg/m$^3$;

(b) a compaction resistance, measured according to PI 306-80, of from about 40 PSI to about 75 PSI at 2"; and/or (c) a thermal conductivity, measured according to EN 12667, of from about 0.0350 W/mK to about 0.0450 W/mk.

It may be that the expanded silicate material is formed from a silicate mixture comprising: from about 10 wt. % to about 20 wt. % of borosilicate glass; from about 10 wt. % to about 20 wt. % of silica fume; from about 10 wt. % to about 20 wt. % of sodium hydroxide; and from about 20 wt. % to about 30 wt. % of water; and the expanded silicate material has:

(a) a loose bulk density, measured according to PI 200-77, of from about 20 kg/m$^3$ to about 40 kg/m$^3$;

(b) a compaction resistance, measured according to PI 306-80, of from about 5 PSI to about 15 PSI at 2"; and/or (c) a thermal conductivity, measured according to EN 12667, of from about 0.0310 W/mK to about 0.0350 W/mk.

It may be that the expanded silicate material is formed by heating an expandable granular material having a particle size (determined by granulometry by sieving) from about 0.125 mm to about 1 mm, the expandable granular material having been formed from a silicate mixture comprising:

one or more silicate materials and/or reactive silica comprising: from about 44 wt. % to about 54 wt. % of $SiO_2$; from about 0.1 wt. % to about 1 wt. % $Na_2O$; from about 0.1 wt. % to about 1 wt. % $Al_2O_3$; less than about 0.2 wt. % $Fe_2O_3$; from about 0.05 wt. % to about 0.5 wt. % CaO; less than about 0.1 wt. % MgO; from about 0.05 wt. % to about 0.5 wt. % $K_2O$; from about 1 wt. % to about 3 wt. % $B_2O_3$; and from about 0.1 to about 1 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 18 kg/m$^3$ to about 30 kg/m$^3$;

(b) a compaction resistance, measured according to PI 306-80, of from about 4 PSI to about 8 PSI at 2"; and/or (c) a thermal conductivity, measured according to EN 12667, of from about 0.0300 W/mK to about 0.0400 W/mk.

It may be that the expanded silicate material is formed by heating an expandable granular material having a particle size (determined by granulometry by sieving) less than or equal to about 2 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 50 kg/m$^3$ to about 100 kg/m$^3$;

(b) a compaction resistance, measured according to PI 306-80, of from about 30 PSI to about 80 PSI at 2"; and/or (c) a thermal conductivity, measured according to EN 12667, of from about 0.0350 W/mK to about 0.0450 W/mk.

It may be that the expanded silicate material is formed by heating an expandable granular material having a particle size (determined by granulometry by sieving) from about 0.1 mm to about 1 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 70 kg/m$^3$ to about 105 kg/m$^3$;

(b) a compaction resistance, measured according to PI 306-80, of from about 40 PSI to about 75 PSI at 2"; and/or (c) a thermal conductivity, measured according to EN 12667, of from about 0.0350 W/mK to about 0.0450 W/mk.

It may be that the expanded silicate material is formed by heating an expandable granular material having a particle size (determined by granulometry by sieving) less than about 1 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 2.5 wt. % to about 4.5 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali salt; and water;

wherein the expanded silicate material has:

(a) a loose bulk density, measured according to PI 200-77, of from about 20 kg/m$^3$ to about 40 kg/m$^3$;

(b) a compaction resistance, measured according to PI 306-80, of from about 5 PSI to about 15 PSI at 2"; and/or (c) a thermal conductivity, measured according to EN 12667, of from about 0.0310 W/mK to about 0.0350 W/mk.

It may be that the expanded silicate material is formed by heating an expandable granular material having a particle size (determined by granulometry by sieving) from about 0.5 mm to about 1 mm, the expandable granular material having been formed from a silicate mixture comprising:

one or more silicate materials and/or reactive silica comprising: from about 44 wt. % to about 54 wt. % of $SiO_2$; from about 0.1 wt. % to about 1 wt. % $Na_2O$; from about 0.1 wt. % to about 1 wt. % $Al_2O_3$; less than about 0.2 wt. % $Fe_2O_3$; from about 0.05 wt. % to about 0.5 wt. % CaO; less than about 0.1 wt. % MgO; from about 0.05 wt. % to about 0.5 wt. % $K_2O$; from about 1 wt. % to about 3 wt. % $B_2O_3$; and from about 0.1 to about 1 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 18 kg/m$^3$ to about 25 kg/m$^3$;

(b) a compaction resistance, measured according to PI 306-80, of from about 4 PSI to about 8 PSI at 2"; and/or (c) a thermal conductivity, measured according to EN 12667, of from about 0.0320 W/mK to about 0.0360 W/mk.

It may be that the expanded silicate material is formed by heating an expandable granular material having a particle size (determined by granulometry by sieving) from about 0.125 mm to about 0.5 mm, the expandable granular material having been formed from a silicate mixture comprising:

one or more silicate materials and/or reactive silica comprising: from about 44 wt. % to about 54 wt. % of $SiO_2$; from about 0.1 wt. % to about 1 wt. % $Na_2O$; from about 0.1 wt. % to about 1 wt. % $Al_2O_3$; less than about 0.2 wt. % $Fe_2O_3$; from about 0.05 wt. % to about 0.5 wt. % CaO; less than about 0.1 wt. % MgO; from about 0.05 wt. % to about 0.5 wt. % $K_2O$; from about 1 wt. % to about 3 wt. % $B_2O_3$; and from about 0.1 to about 1 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 25 kg/m$^3$ to about 30 kg/m$^3$;

(b) a compaction resistance, measured according to PI 306-80, of from about 4 PSI to about 8 PSI at 2"; and/or (c) a thermal conductivity, measured according to EN 12667, of from about 0.0310 W/mK to about 0.0350 W/mk.

It may be that the expanded silicate material is formed by heating an expandable granular material having a particle size (determined by granulometry by sieving) from about 0.3 mm to about 2 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 55 kg/m$^3$ to about 65 kg/m$^3$;

(b) a compaction resistance, measured according to PI 306-80, of from about 35 PSI to about 40 PSI at 2"; and/or (c) a thermal conductivity, measured according to EN 12667, of from about 0.0360 W/mK to about 0.0400 W/mk.

It may be that the expanded silicate material is formed by heating an expandable granular material having a particle size (determined by granulometry by sieving) less than about 0.3 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 90 kg/m$^3$ to about 100 kg/m$^3$;

(b) a compaction resistance, measured according to PI 306-80, of from about 70 PSI to about 80 PSI at 2"; and/or (c) a thermal conductivity, measured according to EN 12667, of from about 0.0370 W/mK to about 0.0420 W/mk.

It may be that the expanded silicate material is formed by heating an expandable granular material having a particle size (determined by granulometry by sieving) from about 0.5 mm to about 1 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 75 kg/m$^3$ to about 85 kg/m$^3$;

(b) a compaction resistance, measured according to PI 306-80, of from about 40 PSI to about 50 PSI at 2"; and/or (c) a thermal conductivity, measured according to EN 12667, of from about 0.0370 W/mK to about 0.0410 W/mk.

It may be that the expanded silicate material is formed by heating an expandable granular material having a particle size (determined by granulometry by sieving) from about 0.125 mm to about 0.5 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 78 kg/m$^3$ to about 86 kg/m$^3$;

(b) a compaction resistance, measured according to PI 306-80, of from about 60 PSI to about 74 PSI at 2"; and/or (c) a thermal conductivity, measured according to EN 12667, of from about 0.0360 W/mK to about 0.0420 W/mk.

It may be that the expanded silicate material is formed by heating an expandable granular material having a particle size (determined by granulometry by sieving) from about 0.1 mm to about 1 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 3 wt. % to about 6 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 70 kg/m$^3$ to about 105 kg/m$^3$;

(b) a compaction resistance, measured according to PI 306-80, of from about 60 PSI to about 75 PSI at 2"; and/or (c) a thermal conductivity, measured according to EN 12667, of from about 0.0360 W/mK to about 0.0430 W/mk.

It may be that the expanded silicate material is formed by heating an expandable granular material having a particle size (determined by granulometry by sieving) from about 0.5 mm to about 1 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 2.5 wt. % to about 4.5 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 20 kg/m$^3$ to about 30 kg/m$^3$;

(b) a compaction resistance, measured according to PI 306-80, of from about 5 PSI to about 10 PSI at 2"; and/or (c) a thermal conductivity, measured according to EN 12667, of from about 0.0310 W/mK to about 0.0360 W/mk.

It may be that the expanded silicate material is formed by heating an expandable granular material having a particle size (determined by granulometry by sieving) from about 0.125 mm to about 0.5 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 2.5 wt. % to about 4.5 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali compound; and water;

wherein the expanded silicate material has:

(a) a loose bulk density, measured according to PI 200-77, of from about 25 kg/m$^3$ to about 35 kg/m$^3$;

(b) a compaction resistance, measured according to PI 306-80, of from about 5 PSI to about 15 PSI at 2"; and/or (c) a thermal conductivity, measured according to EN 12667, of from about 0.0310 W/mK to about 0.0350 W/mk.

It may be that the expanded silicate material is formed by heating an expandable granular material having a particle size (determined by granulometry by sieving) less than about 0.3 mm, the expandable granular material having been formed from a silicate mixture comprising:

one or more silicate materials and/or reactive silica comprising: from about 42 wt. % to about 52 wt. % of $SiO_2$; from about 1.2 wt. % to about 2.4 wt. % $Na_2O$; from about 2.5 wt. % to about 4.5 wt. % $Al_2O_3$; from about 0.1 wt. % to about 1 wt. % $Fe_2O_3$; from about 0.1 wt. % to about 1 wt. % CaO; less than about 0.2 wt. % MgO; from about 1 wt. % to about 2 wt. % $K_2O$; from about 1 wt. % to about 3 wt. % $B_2O_3$; and from about 0.5 to about 1.5 wt. % of water and/or volatile substances (i.e. substances which contribute to "loss on ignition" (LOI));

an alkali salt; and water;

wherein the expanded silicate material has:

(a) a loose bulk density, measured according to PI 200-77, of from about 30 kg/m$^3$ to about 40 kg/m$^3$;

(b) a compaction resistance, measured according to PI 306-80, of from about 8 PSI to about 16 PSI at 2"; and/or (c) a thermal conductivity, measured according to EN 12667, of from about 0.0300 W/mK to about 0.0350 W/mk.

It may be that the expanded silicate material is formed by heating an expandable granular material having a particle size (determined by granulometry by sieving) from about 0.5 mm to about 1 mm, the expandable granular material having been formed from a silicate mixture comprising: from about 10 wt. % to about 15 wt. % of borosilicate glass; from about 35 wt. % to about 45 wt. % of silica fume; from about 15 wt. % to about 20 wt. % of sodium hydroxide; and from about 25 wt. % to about 32 wt. % of water; and wherein the expanded silicate material has:

(a) a loose bulk density, measured according to PI 200-77, of from about 18 kg/m$^3$ to about 25 kg/m$^3$;

(b) a compaction resistance, measured according to PI 306-80, of from about 4 PSI to about 8 PSI at 2"; and/or (c) a thermal conductivity, measured according to EN 12667, of from about 0.0320 W/mK to about 0.0360 W/mk.

It may be that the expanded silicate material is formed by heating an expandable granular material having a particle size (determined by granulometry by sieving) from about 0.125 mm to about 0.5 mm, the expandable granular material having been formed from a silicate mixture comprising: from about 10 wt. % to about 15 wt. % of borosilicate glass; from about 35 wt. % to about 45 wt. % of silica fume; from about 15 wt. % to about 20 wt. % of sodium hydroxide; and from about 25 wt. % to about 32 wt. % of water; and wherein the expanded silicate material has:

(a) a loose bulk density, measured according to PI 200-77, of from about 25 kg/m$^3$ to about 30 kg/m$^3$;

(b) a compaction resistance, measured according to PI 306-80, of from about 4 PSI to about 8 PSI at 2"; and/or (c) a thermal conductivity, measured according to EN 12667, of from about 0.0310 W/mK to about 0.0350 W/mk.

It may be that the expanded silicate material is formed by heating an expandable granular material having a particle size (determined by granulometry by sieving) from about 0.3 mm to about 2 mm, the expandable granular material having been formed from a silicate mixture comprising: from about 12 wt. % to about 18 wt. % of borosilicate glass; from about 5 wt. % to about 15 wt. % of silica fume; from about 10 wt. % to about 15 wt. % of sodium hydroxide; and from about 20 wt. % to about 30 wt. % of water; and the expanded silicate material has:

(a) a loose bulk density, measured according to PI 200-77, of from about 55 kg/m$^3$ to about 65 kg/m$^3$;

(b) a compaction resistance, measured according to PI 306-80, of from about 35 PSI to about 40 PSI at 2"; and/or (c) a thermal conductivity, measured according to EN 12667, of from about 0.0360 W/mK to about 0.0400 W/mk.

It may be that the expanded silicate material is formed by heating an expandable granular material having a particle size (determined by granulometry by sieving) less than about 0.3 mm, the expandable granular material having been formed from a silicate mixture comprising: from about 12 wt. % to about 18 wt. % of borosilicate glass; from about 5 wt. % to about 15 wt. % of silica fume; from about 10 wt. % to about 15 wt. % of sodium hydroxide; and from about 20 wt. % to about 30 wt. % of water; and the expanded silicate material has:

(a) a loose bulk density, measured according to PI 200-77, of from about 90 kg/m$^3$ to about 100 kg/m$^3$;

(b) a compaction resistance, measured according to PI 306-80, of from about 70 PSI to about 80 PSI at 2"; and/or (c) a thermal conductivity, measured according to EN 12667, of from about 0.0370 W/mK to about 0.0420 W/mk.

It may be that the expanded silicate material is formed by heating an expandable granular material having a particle size (determined by granulometry by sieving) from about 0.5 mm to about 1 mm, the expandable granular material having been formed from a silicate mixture comprising: from about 12 wt. % to about 18 wt. % of borosilicate glass; from about 5 wt. % to about 10 wt. % of silica fume; from about 8 wt. % to about 16 wt. % of sodium hydroxide; and from about 20 wt. % to about 32 wt. % of water; wherein the expanded silicate material has:

(a) a loose bulk density, measured according to PI 200-77, of from about 75 kg/m$^3$ to about 85 kg/m$^3$;

(b) a compaction resistance, measured according to PI 306-80, of from about 40 PSI to about 50 PSI at 2"; and/or (c) a thermal conductivity, measured according to EN 12667, of from about 0.0370 W/mK to about 0.0410 W/mk.

It may be that the expanded silicate material is formed by heating an expandable granular material having a particle size (determined by granulometry by sieving) from about 0.125 mm to about 0.5 mm, the expandable granular material having been formed from a silicate mixture comprising: from about 12 wt. % to about 18 wt. % of borosilicate glass; from about 5 wt. % to about 10 wt. % of silica fume; from about 8 wt. % to about 16 wt. % of sodium hydroxide; and from about 20 wt. % to about 32 wt. % of water; wherein the expanded silicate material has:

(a) a loose bulk density, measured according to PI 200-77, of from about 78 kg/m$^3$ to about 86 kg/m$^3$;

(b) a compaction resistance, measured according to PI 306-80, of from about 60 PSI to about 74 PSI at 2"; and/or (c) a thermal conductivity, measured according to EN 12667, of from about 0.0360 W/mK to about 0.0420 W/mk.

It may be that the expanded silicate material is formed by heating an expandable granular material having a particle size (determined by granulometry by sieving) from about 0.1 mm to about 1 mm, the expandable granular material having been formed from a silicate mixture comprising: from about 12 wt. % to about 18 wt. % of borosilicate glass; from about 5 wt. % to about 10 wt. % of silica fume; from about 8 wt. % to about 16 wt. % of sodium hydroxide; and from about 20 wt. % to about 32 wt. % of water; wherein the expanded silicate material has:

(a) a loose bulk density, measured according to PI 200-77, of from about 70 kg/m$^3$ to about 105 kg/m$^3$;

(b) a compaction resistance, measured according to PI 306-80, of from about 60 PSI to about 75 PSI at 2"; and/or (c) a thermal conductivity, measured according to EN 12667, of from about 0.0360 W/mK to about 0.0430 W/mk.

It may be that the expanded silicate material is formed by heating an expandable granular material having a particle size (determined by granulometry by sieving) from about 0.5 mm to about 1 mm, the expandable granular material having been formed from a silicate mixture comprising: from about 10 wt. % to about 20 wt. % of borosilicate glass; from about 10 wt. % to about 20 wt. % of silica fume; from about 10 wt. % to about 20 wt. % of sodium hydroxide; and from about 20 wt. % to about 30 wt. % of water; wherein the expanded silicate material has:

(a) a loose bulk density, measured according to PI 200-77, of from about 20 kg/m$^3$ to about 30 kg/m$^3$;

(b) a compaction resistance, measured according to PI 306-80, of from about 5 PSI to about 10 PSI at 2"; and/or (c) a thermal conductivity, measured according to EN 12667, of from about 0.0310 W/mK to about 0.0360 W/mk.

It may be that the expanded silicate material is formed by heating an expandable granular material having a particle size (determined by granulometry by sieving) from about 0.125 mm to about 0.5 mm, the expandable granular material having been formed from a silicate mixture comprising: from about 10 wt. % to about 20 wt. % of borosilicate glass; from about 10 wt. % to about 20 wt. % of silica fume; from about 10 wt. % to about 20 wt. % of sodium hydroxide; and from about 20 wt. % to about 30 wt. % of water; wherein the expanded silicate material has:

(a) a loose bulk density, measured according to PI 200-77, of from about 25 kg/m$^3$ to about 35 kg/m$^3$;

(b) a compaction resistance, measured according to PI 306-80, of from about 5 PSI to about 15 PSI at 2"; and/or (c) a thermal conductivity, measured according to EN 12667, of from about 0.0310 W/mK to about 0.0350 W/mk.

It may be that the expanded silicate material is formed by heating an expandable granular material having a particle size (determined by granulometry by sieving) less than about 0.3 mm, the expandable granular material having been formed from a silicate mixture comprising: from about 10 wt. % to about 20 wt. % of borosilicate glass; from about 10 wt. % to about 20 wt. % of silica fume; from about 10 wt. % to about 20 wt. % of sodium hydroxide; and from about 20 wt. % to about 30 wt. % of water; wherein the expanded silicate material has:

(a) a loose bulk density, measured according to PI 200-77, of from about 30 kg/m$^3$ to about 40 kg/m$^3$;

(b) a compaction resistance, measured according to PI 306-80, of from about 8 PSI to about 16 PSI at 2"; and/or (c) a thermal conductivity, measured according to EN 12667, of from about 0.0300 W/mK to about 0.0350 W/mk.

Additionally or alternatively, the thermally insulating filler may comprise expanded natural products such as expanded natural minerals (for example expanded natural perlite) or expanded synthetic polymers (such as expanded polystyrene) or glasses such as glass beads (for example, expanded glass beads) or agricultural waste products (such as poppy husk particles, straw, barley straw, corn pith, rice husk, maize-cob, paddy-straw, coconut pith, hemp fibres or wood materials such as spruce, pine, wood chip, locust tree bark, eucalyptus, spruce or fir fibres, waste pine plywood, or cork powder).

Method

As discussed hereinabove, the method may comprise combining solvent and gel networker former, and optionally foaming agent and/or one or more additives, to form a gel. The method may further comprise aerating the gel. It will be appreciated that aerating the gel comprises foaming the gel, that is to say, the formation of bubbles of gas (such as air) in the gel. Aeration of the gel may be accomplished by mechanically agitating the gel, for example by whisking the gel.

The method may comprise shaping the mixture prior to drying. Shaping the mixture may comprise any suitable shaping processes known in the art including moulding (for example, in a mould), rolling, cutting, extruding and/or smoothing the mixture prior to drying. The method may comprise shaping the mixture into the form of a panel or board. It will be appreciated that shaping steps typically take place after dispersing the thermally insulating filler in the mixture.

It may be that drying the mixture to form the thermally insulating product comprises forming an aerated matrix. It will be appreciated that an aerated matrix is a porous matrix, for example a matrix comprises a plurality of cavities or bubbles, which may be filled with a gas (such as air). The aerated matrix may be a foam. The aerated matrix may be a xerogel, that is to say a solid formed from a liquid-containing gel by drying with unhindered shrinkage. The aerated matrix may be an aerogel, that is to say a solid formed from a liquid containing gel by drying under supercritical conditions such that the shrinkage of the gel network structure is hindered (e.g. (substantially) prevented). The aerogel may be a clay aerogel, i.e. an aerogel in which the gel network structure comprises clay mineral (such as clay mineral reinforced by reinforcing agent), sometimes to referred to as an aeroclay. The aerogel (e.g. clay aerogel) may be a foamed aerogel (e.g. a foamed clay aerogel). A foamed aerogel (e.g. foamed clay aerogel) may be formed by agitating (e.g. foaming or frothing) the mixture before drying to form the aerogel (e.g. clay aerogel), thereby incorporating gas bubbles into the mixture and, consequently, the resultant aerogel (e.g. clay aerogel).

Drying the mixture may comprise freeze-drying the mixture. It will be appreciated that freeze-drying is a low-temperature drying process in which a mixture is frozen, for example at a temperature below about −30° C., or down to about −196° C. (i.e. such that solvent in the mixture freezes), the pressure is reduced (for example, by placing the mixture in a vacuum) and then the solvent is removed from the mixture by sublimation, for example by heat the frozen mixture at the low pressure. Freeze-drying may better preserve a gel network structure, in particular an aerated gel network structure such as the structure of a clay aerogel.

Alternatively, drying the mixture may comprise drying the mixture at ambient conditions (i.e. at ambient (i.e. room) temperature and pressure, for example, at a temperature of about 20° C. and at a pressure of about 1 atmosphere (i.e. about 101.325 kPa)). Further alternatively, drying the mixture may comprise drying the mixture at an elevated temperature, for example up to about 25° C., or from about 25° C. to about 50° C. Drying at ambient conditions or at elevated temperatures may be faster than freeze-drying.

Thermally Insulating Product

The thermally insulating product typically comprises the thermally insulating filler dispersed in an aerated matrix.

The aerated matrix may be a foam. The foam may be a flexible foam. For example, the foam may have a modulus (such as a Young's modulus or a flexural modulus) less than about 5 GPa, for example, less than about 4 GPa, or less than about 3 GPa, or less than about 2 GPa, or less than about 1 GPa. For example, the foam may comprise (e.g. be formed predominantly of) binding agent, such as polymeric (e.g. elastomeric) binding agent. The foam may comprise (e.g. be formed predominantly of) foamed natural binding agent, for example foamed cellulose or foamed gelatine.

In embodiments in which the aerated matrix is a foam (such as a flexible foam, for example a foam comprising (i.e. formed predominantly of) foamed binding agent), the thermally insulating product may have a thermal conductivity (λ, lambda value), measured according to EN 12667, of no less than about 0.010 W/mK, for example, no less than about 0.0125 W/mK, or no less than about 0.015 W/mK. In embodiments in which the aerated matrix is a foam (such as a flexible foam, for example a foam comprising (i.e. formed predominantly of) foamed binding agent), the thermally insulating product may have a thermal conductivity (λ, lambda value), measured according to EN 12667, of no greater than about 0.045 W/mK, for example, no greater than about 0.040 W/mK., or no greater than about 0.037 W/mK. In embodiments in which the aerated matrix is a foam (such as a flexible foam, for example a foam comprising (i.e. formed predominantly of) foamed binding agent), the thermally insulating product may have a thermal conductivity (λ, lambda value), measured according to EN 12667, of from about 0.010 W/mK to about 0.045 W/mk, for example, from about 0.010 W/mK to about 0.040 W/mK, or from about 0.015 W/mK to about 0.037 W/mK.

In embodiments in which the aerated matrix is a foam (such as a flexible foam, for example a foam comprising (i.e. formed predominantly of) foamed binding agent), the thermally insulating product may have a density of less than about 0.035 g/cm$^3$, for example, less than about 0.02 g/cm$^3$. In embodiments in which the aerated matrix is a foam (such as a flexible foam, for example a foam comprising (i.e. formed predominantly of) foamed binding agent), the thermally insulating product may have a density of no less than about 0.01 g/cm$^3$. In embodiments in which the aerated matrix is a foam (such as a flexible foam, for example a foam comprising (i.e. formed predominantly of) foamed binding agent), the thermally insulating product may have a density of from about 0.01 g/cm$^3$ to about 0.035 g/cm$^3$, for example, from about 0.01 g/cm$^3$ to about 0.02 g/cm$^3$.

The aerated matrix may be an aerogel, for example a clay aerogel, such as a foamed aerogel, for example a foamed clay aerogel. The aerogel (for example the foamed aerogel, clay aerogel or foamed clay aerogel) may be rigid. For example, the aerogel (for example the foamed aerogel, clay aerogel or foamed clay aerogel) may have a modulus (such as a Young's modulus or a flexural modulus) greater than about 5 GPa, for example, greater than about 10 GPa, or greater than about 15 GPa, or greater than about 20 GPa, or greater than about 25 GPa. For example, the aerogel (e.g. the foamed aerogel, clay aerogel or foamed clay aerogel) may comprise (e.g. consist predominantly of) of clay mineral, for example a smectite clay mineral, bentonite, hectorite or montmorillonite, and optionally a reinforcing agent, for example a polymer.

In embodiments in which the aerated matrix is an aerogel (e.g. a foamed aerogel, clay aerogel or foamed clay aerogel, for example a rigid aerogel such as a rigid foamed aerogel, rigid clay aerogel or rigid foamed clay aerogel) the thermally insulating product may have a thermal conductivity (λ, lambda value), measured according to EN 12667, of no less than about 0.020 W/mK, for example, no less than about 0.025 W/mK, or no less than about 0.030 W/mK. In embodiments in which the aerated matrix is an aerogel (e.g. a foamed aerogel, a clay aerogel or a foamed clay aerogel, for example a rigid aerogel such as a rigid foamed aerogel, rigid clay aerogel or rigid foamed clay aerogel), the thermally insulating product may have a thermal conductivity (λ, lambda value), measured according to EN 12667, of no greater than about 0.050 W/mK, for example, no greater than about 0.045 W/mK, or no greater than about 0.040 W/mK. In embodiments in which the aerated matrix is an aerogel (e.g. a foamed aerogel, clay aerogel or foamed clay aerogel, for example a rigid aerogel such as a rigid foamed aerogel, rigid clay aerogel or rigid foamed clay aerogel), the thermally insulating product may have a thermal conductivity (λ, lambda value), measured according to EN 12667, of from about 0.020 W/mK to about 0.050 W/mk, for example, from about 0.025 W/mK to about 0.045 W/mK, or from about 0.030 W/mK to about 0.040 W/mK.

In embodiments in which the aerated matrix is an aerogel (e.g. a foamed aerogel, a clay aerogel or a foamed clay aerogel, for example a rigid aerogel such as a rigid foamed aerogel, rigid clay aerogel or rigid foamed clay aerogel), the thermally insulating product may have a density of no less than about 0.02 g/cm$^3$, for example, no less than about 0.03 g/cm$^3$. In embodiments in which the aerated matrix is an aerogel (e.g. a foamed aerogel, a clay aerogel or a foamed clay aerogel, for example a rigid aerogel such as a rigid foamed aerogel, a rigid clay aerogel or a rigid foamed clay aerogel), the thermally insulating product may have a density of no greater than about 0.1 g/cm$^3$, for example, no greater than about 0.09 g/cm$^3$, or no greater than about 0.08 g/cm$^3$. In embodiments in which the aerated matrix is an aerogel (e.g. a foamed aerogel, clay aerogel or foamed clay aerogel, for example a rigid aerogel such as a rigid foamed aerogel, rigid clay aerogel or rigid foamed clay aerogel), the thermally insulating product may have a density from about 0.02 g/cm$^3$ to about 0.1 g/cm$^3$, for example, from about 0.03 g/cm$^3$ to about 0.09 g/cm$^3$, or from about 0.03 to about 0.07 g/cm$^3$.

The thermally insulating product (regardless of whether the aerated matrix is a flexible foam or a rigid aerogel) may have a total intrusion volume, as measured in a mercury porosimeter, of no less than about 8 mL/g, for example, no less than about 9 mL/g, or no less than about 10 mL/g. The thermally insulating product (regardless of whether the aerated matrix is a flexible foam or a rigid aerogel) may have a total intrusion volume, as measured in a mercury porosimeter, of no greater than about 20 mL/g, for example, no greater than about 17 mL/g, or no greater than about 13 mL/g. The thermally insulating product (regardless of whether the aerated matrix is a flexible foam or a rigid aerogel) may have a total intrusion volume, as measured in a mercury porosimeter, of from about 8 mL/g to about 20 mL/g, for example, from about 9 mL/g to about 17 mL/g, or from about 10 mL/g to about 13 mL/g.

The thermally insulating product (regardless of whether the aerated matrix is a flexible foam or a rigid aerogel) may have a total open porosity, as measured in a mercury porosimeter, of greater than about 70%, for example, greater than about 80%, or greater than about 85%, or greater than about 89%. The thermally insulating product (regardless of whether the aerated matrix is a flexible foam or a rigid aerogel) may have a total open porosity, as measured in a mercury porosimeter, of no less than about 99%, for example, no less than about 96%, or no less than about 95%, or no less than about 94%. The thermally insulating product (regardless of whether the aerated matrix is a flexible foam or a rigid aerogel) may have a total open porosity, as measured in a mercury porosimeter, 70% to about 99%, for example from about 80% to about 96%, or from about 89% to about 94%.

For the avoidance of doubt, the present application is directed to the subject-matter described in the following numbered paragraphs:

1. Method of manufacturing a thermally insulating product, the method comprising:

(a) forming a mixture comprising solvent and gel network former and optionally foaming agent;

(b) dispersing a thermally insulating filler in the mixture; and (c) drying the mixture to form the thermally insulating product.

2. The method according to paragraph 1 further comprising shaping the mixture prior to drying.

3. The method according to any preceding paragraph, wherein the gel network former comprises a binding agent, for example a natural binding agent such as cellulose or gelatine.

4. The method according to any preceding paragraph, wherein the gel network former comprises:

(i) a clay mineral, for example a smectite clay mineral, bentonite, montmorillonite or hectorite; and (ii) a reinforcing agent (e.g. one or more reinforcing agents), for example a polymer.

5. The method according to any preceding paragraph, wherein the foaming agent is a surfactant, for example sodium dodecyl sulphate (SDS).

6. The method according to any preceding paragraph, wherein the mixture of step (a) further comprises at least one additive, for example at least one additive chosen from an anti-mould agent such as propionic acid, an antibacterial agent, a fire retardant such as aluminium hydroxide, a hydrophobic agent such as silicone oil, stearic acid, and a thermal conductivity regulating agent such as graphite.

7. The method according to any preceding paragraph, wherein the thermally insulating filler is a granular material, for example a porous granular material such as an expanded silicate material.

8. The method according to paragraph 7, wherein the expanded silicate material:

(a) has:

a loose bulk density, measured according to PI 200-77, of from about 15 kg/m$^3$ to about 450 kg/m$^3$, for example from about 20 kg/m$^3$ to about 100 kg/m$^3$, or from about 20 kg/m$^3$ to about 30 kg/m$^3$, or from about 20 kg/m$^3$ to about 40 kg/m$^3$, or from about 55 kg/m$^3$ to about 100 kg/m$^3$, or from about 70 kg/m$^3$ to about 100 kg/m$^3$, or from about 30 to about 60 kg/m$^3$, preferably from about 30 to about 60 kg/m$^3$;

a compaction resistance, measured according to PI 306-80, of from about 3 PSI to about 350 PSI at 2", for example from about 3 PSI to about 200 PSI at 2", or from about 3 PSI to about 100 PSI at 2", or from about 3 PSI to about 10 PSI at 2", or from about 30 PSI to about 80 PSI at 2", or from about 40 PSI to about 75 PSI at 2", or from about 5 PSI to about 20 PSI at 2"; and/or a thermal conductivity, measured according to EN 12667, of from about 0.0300 W/mK to about 0.0700 W/mk, for example from about 0.0320 W/mK to about 0.0420 W/mK, from about 0.0350 W/mK to about 0.0400 W/mK, or from about 0.0360 W/mK to about 0.0410 W/mK, or from about 0.0320 W/mK to about 0.0340 W/mK, or from about 0.042 W/mK to about 0.055 W/mK, or from about 0.055 W/mK to about 0.070 W/mK;

(b) comprises:

from about 3 wt. % to about 30 wt. %, for example from about 8 wt. % to about 30 wt. %, or from about 13 wt. % to about 22 wt. %, or from about 3.5 wt. % to about 22 wt. %, of $X_2O$, X being an alkali metal such as Na or Li;

from about 0 wt. % to about 20 wt. %, for example from about 0 wt. % to about 15 wt. %, or from about 5 wt. % to about 9 wt. %, or from about 5 wt. % to about 15 wt. %, of $Al_2O_3$; and from about 50 wt. % to about 90 wt. %, for example from about 50 wt. % to about 80 wt. %, or from about 60 wt.

% to about 75 wt. %, or from about 60 wt. % to about 80 wt. %, of $SiO_2$; and optionally from about 0 wt. % to about 10 wt. %, for example from about 0.5 wt. % to about 5 wt. % of $H_2O$;

and optionally wherein the expanded silicate material comprises less than about 5 wt. %, for example less than about 3.5 wt. %, of $B_2O_3$;

(c) is manufactured by:

forming a silicate mixture comprising:

a (e.g. at least one) silicate material;

an alkali compound; and water;

curing the silicate mixture to form a solid precursor;

crushing and/or milling the solid precursor to form a granular expandable silicate material; and heating the granular expandable silicate material to form an expanded silicate material; and/or (d) is expanded natural perlite.

9. The method according to any preceding paragraph, wherein the mixture formed by combining solvent and gel network former, and optionally foaming agent and/or at least one additive, is a gel.

10. The method according to paragraph 9 further comprising aerating the gel, for example by mechanically agitating the gel, to form an aerated gel.

11. The method according to any preceding paragraph, wherein drying the mixture to form the thermally insulating product comprises forming an aerated matrix, such as a foam or an aerogel, for example a clay aerogel, such as a foamed aerogel or a foamed clay aerogel, in which the thermally insulating filler is dispersed.

12. The method according to any preceding paragraph, wherein drying the mixture comprises:

(i) freeze-drying the mixture;

(ii) drying the mixture at ambient conditions; or (iii) drying the mixture at an elevated temperature.

13. The method according to any preceding paragraph, wherein the solvent is water or an alcohol such as ethanol.

14. A thermally insulating product comprising a thermally insulating filler dispersed in an aerated matrix.

15. The thermally insulating product according to paragraph 14, wherein the thermally insulating filler is a granular material, for example a porous granular material such as an expanded silicate material.

16. The thermally insulating product according to paragraph 15, wherein the expanded silicate material:

(a) has:

a loose bulk density, measured according to PI 200-77, of from about 15 kg/$m^3$ to about 450 kg/$m^3$, for example from about 20 kg/$m^3$ to about 100 kg/$m^3$, or from about 30 to about 60 kg/$m^3$, or from about 20 kg/$m^3$ to about 30 kg/$m^3$, or from about 20 kg/$m^3$ to about 40 kg/$m^3$, or from about 55 kg/$m^3$ to about 100 kg/$m^3$, or from about 70 kg/$m^3$ to about 100 kg/$m^3$, preferably from about 30 to about 60 kg/$m^3$;

a compaction resistance, measured according to PI 306-80, of from about 3 PSI to about 350 PSI at 2", for example from about 3 PSI to about 200 PSI at 2", or from about 3 PSI to about 100 PSI at 2", or from about 3 PSI to about 10 PSI at 2", or from about 30 PSI to about 80 PSI at 2", or from about 40 PSI to about 75 PSI at 2", or from about 5 PSI to about 20 PSI at 2"; and/or a thermal conductivity, measured according to EN 12667, of from about 0.0300 W/mK to about 0.0700 W/mk, for example from about 0.0320 W/mK to about 0.0420 W/mK, from about 0.0350 W/mK to about 0.0400 W/mK, or from about 0.0360 W/mK to about 0.0410 W/mK, or from about 0.0320 W/mK to about 0.0340 W/mK, or from about 0.042 W/mK to about 0.055 W/mK, or from about 0.055 W/mK to about 0.070 W/mK;

(b) comprises:

from about 3 wt. % to about 30 wt. %, for example from about 8 wt. % to about 30 wt. %, or from about 13 wt. % to about 22 wt. %, or from about 3.5 wt. % to about 22 wt. %, of $X_2O$, X being an alkali metal such as Na or Li;

from about 0 wt. % to about 20 wt. %, for example from about 0 wt. % to about 15 wt. %, or from about 5 wt. % to about 9 wt. %, or from about 5 wt. % to about 15 wt. %, of $Al_2O_3$; and from about 50 wt. % to about 90 wt. %, for example from about 50 wt. % to about 80 wt. %, or from about 60 wt. % to about 75 wt. %, or from about 60 wt. % to about 80 wt. %, of $SiO_2$; and optionally from about 0 wt. % to about 10 wt. %, for example from about 0.5 wt. % to about 5 wt. % of $H_2O$;

and optionally wherein the expanded silicate material comprises less than about 5 wt. %, for example less than about 3.5 wt. %, of $B_2O_3$;

(c) is manufactured by:

forming a silicate mixture comprising:

a silicate material;

an alkali compound; and water;

curing the silicate mixture to form a solid precursor;

crushing and/or milling the solid precursor to form a granular expandable silicate material; and heating the granular expandable silicate material to form the expanded silicate material; and/or (d) is expanded natural perlite.

17. The thermally insulating product according to any of paragraphs 14 to 16, wherein the aerated matrix is a foam, for example a flexible foam.

18. The thermally insulating product according to paragraph 17, wherein the foam comprises foamed natural binding agent, for example foamed cellulose or foamed gelatine.

19. The thermally insulating product according to paragraph 17 or paragraph 18 having a thermal conductivity (λ, lambda value), measured according to EN 12667, of from about 0.010 W/mK to about 0.040 W/mk, for example, from about 0.015 W/mK to about 0.037 W/mK.

20. The thermally insulating product according to any of paragraphs 17 to 19 having a density of less than about 0.035 g/$cm^3$, for example, less than about 0.02 g/$cm^3$, or from about 0.01 g/$cm^3$ to about 0.02 g/$cm^3$.

21. The thermally insulating product according to any of paragraphs 14 to 16, wherein the aerated matrix is an aerogel, for example a clay aerogel, such as a foamed aerogel or a foamed clay aerogel.

22. The thermally insulating product according to paragraph 21, wherein the aerogel, for example clay aerogel, foamed aerogel or foamed clay aerogel, is rigid.

23. The thermally insulating product according to paragraph 21 or paragraph 22, wherein the aerogel is a clay aerogel, such as a foamed clay aerogel, formed from a clay mineral, for example a smectite clay mineral, bentonite, hectorite or montmorillonite, and a (e.g. at least one) reinforcing agent, for example a polymer.

24. The thermally insulating product according to any of paragraphs 20 to 22 having a thermal conductivity (λ, lambda value), measured according to EN 12667, of from about 0.020 W/mK to about 0.050 W/mk, for example, from about 0.030 W/mK to about 0.040 W/mK.

25. The thermally insulating product according to any of paragraphs 21 to 24 having a density from about 0.02 g/cm$^3$ to about 0.1 g/cm$^3$, for example, from about 0.03 g/cm$^3$ to about 0.09 g/cm$^3$, or from about 0.03 to about 0.07 g/cm$^3$.

26. A thermally insulating product manufactured by the method according to any of paragraphs 1 to 13.

27. The thermally insulating product according to any of paragraphs 14 to 26, wherein the thermally insulating product is a thermally insulating board.

28. The thermally insulating product according to any of paragraphs 14 to 27 having: a total intrusion volume, as measured in a mercury porosimeter, of from about 9 mL/g to about 17 mL/g, for example, from about 10 mL/g to about 13 mL/g; and/or a total open porosity, as measured in a mercury porosimeter, of greater than about 80%, for example, from about 80% to about 96%, or from about 89% to about 94%.

EXAMPLES

Example 1

A mixture was prepared by dissolving 6% w/w gelatine with 0.66% w/w sodium dodecyl sulfate (SDS) in deionised water at about 60° C. The mixture was frothed to form an aerated gel. A thermally insulating filler in the form of expanded synthetic perlite was added to the mixture, which was then mixed until homogeneous. Two samples of the mixture were shaped in a mould and dried to form insulating panels. The first sample was dried by a freeze-drying process involving freezing the mixture to below about −30° C. The second sample was dried at room temperature.

The densities and thermal conductivities of the samples were measured. The first sample was found to have a density of 0.015 g/cm$^3$. The second sample was found to have a density of 0.02 gm/cm$^3$. Both samples were found to have thermal conductivities of 0.035 W/mK. Both panels were found to be flexible and could be bent around pipes without breaking. Both panels could also be easily cut by hand with scissors.

Example 2

Insulating panels were prepared by the same method as for Example 1, except that the concentration of SDS was increased from 0.66% w/w to 1% w/w. The thermal conductivity and mechanical behaviour of the panels were found to the same as those of Example 1. The densities of the panels were found to be 10% lower than those of Example 1.

Example 3

A mixture was prepared by mixing 3% w/w sodium montmorillonite (MMT) clay mineral with 3% w/w polyvinyl alcohol (PVA) and deionised water. A sample of the mixture was shaped in a mould and dried by freeze-drying process involving freezing the mixture to below about −30° C. to form a clay-aerogel-based insulating panel.

The density of the sample following freeze-drying was found to be 0.05 g/cm$^3$ and the thermal conductivity was found to be 0.035 W/mK. The panel was found to be rigid.

Example 4

An insulating panel was prepared by the same method as for Example 3, except that the concentrations of MMT and PVA were both increased to 5% w/w. The density of the panel was found to increase by 35%.

Example 5

An insulating panel was prepared by the same method as for Example 3, except that 12% w/w thermally insulating filler in the form of expanded synthetic perlite (having a density of 0.0833 g/cm$^3$ and a thermal conductivity less than 0.04 W/mK) was incorporated into the mixture prior to drying. The panel was found to have a density of 0.078 g/cm$^3$ and a thermal conductivity of 0.036 W/mK.

Example 6

An insulating panel was prepared by the same method as for Example 3, except that 8% w/w thermally insulating filler in the form of expanded polystyrene saturated with water (having a density of 0.0833 g/cm$^3$ and a thermal conductivity less than 0.04 W/mK) was incorporated into the mixture prior to drying. The panel was found to have a density of 0.06 g/cm$^3$.

Example 7

Mixtures were prepared by dissolving sodium montmorillonite (MMT) clay mineral with reinforcement agent (polyvinyl alcohol (PVA) and/or sodium polyacrylate) and deionized water. The mixture was foamed by agitating, molded, frozen at −40° C. and freeze dried. The results are presented in Table 1.

TABLE 1

| MMT* | PVA* | Na polyacrylate* | Density (kg/m$^3$) | Thermal conductivity (W/mK) |
|---|---|---|---|---|
| 2.1 | — | 1 | 33.3 | 0.0400 |
| 2.5 | 1.5 | 1 | 33.0 | 0.0374 |
| 2.5 | 2.5 | 0.0075 | 37.8 | 0.0364 |
| 2.5 | 1.25 | 0.0075 | 24.5 | 0.0368 |

*% w/w content in the starting mixture

Example 8

A mixture was prepared by dissolving sodium montmorillonite (MMT) clay mineral with reinforcement agent (polyvinyl alcohol (PVA) and sodium polyacrylate), dispersing agent (Sodium Hexametaphosphate (Na-Hexam)) and deionized water. The mixture was foamed by agitating, molded, frozen at −40° C. and freeze dried. The result is presented in Table 2.

TABLE 2

| MMT* | PVA* | Na-Hexam* | Density (kg/m$^3$) | Thermal conductivity (W/mK) |
|---|---|---|---|---|
| 2.5 | 2.5 | 0.0125 | 51.0 | 0.0353 |

*% w/w content in the starting mixture

Example 9

Mixtures were prepared as described in Example 7, except that thermally insulating filler in the form of expanded synthetic perlite (USP) (having a density of 43 kg/m$^3$) was incorporated into the foamed mixture prior to freezing. The results are presented in the Table 3.

TABLE 3

| MMT* | PVA* | Na polyacrylate* | USP* | Density (kg/m$^3$) | Thermal conductivity (W/mK) |
|---|---|---|---|---|---|
| 2.2 | 1.83 | 0.0075 | 3 | 47.4 | 0.0398 |
| 2.2 | 2.2 | 0.0075 | 3 | 50.5 | 0.0390 |
| 2.1 | 2.1 | 0.0075 | 3 | 46.7 | 0.0383 |
| 2.0 | 2.0 | 0.0075 | 3 | 46.3 | 0.0393 |

*% w/w content in the starting mixture

Example 10

Mixtures were prepared as described in Example 7, except that different contents of thermally insulating filler in the form of expanded synthetic perlite (USP) (having a density of 43 kg/m$^3$) were incorporated into the foamed mixture prior to freezing. The results are presented in Table 4.

TABLE 4

| MMT* | PVA* | Na polyacrylate* | USP* | Density (kg/m$^3$) | Thermal conductivity (W/mK) |
|---|---|---|---|---|---|
| 2.1 | 2.1 | 0.0075 | 2 | 40.0 | 0.0386 |
| 2.1 | 2.1 | 0.0075 | 2.5 | 44.6 | 0.0393 |
| 2.1 | 2.1 | 0.0075 | 3 | 45.35 | 0.0383 |

*% w/w content in the starting mixture

Example 11

Mixtures were prepared as described in Example 7, except that 76% v/v thermally insulating filler in the form of expanded synthetic perlite (USP) of various densities was incorporated into the foamed mixture prior to freezing. The results are presented in Table 5.

TABLE 5

| MMT* | PVA* | Na polyacrylate* | USP's Density (kg/m$^3$) | Density (kg/m$^3$) | Thermal conductivity (W/mK) |
|---|---|---|---|---|---|
| 2.2 | 2.2 | 0.0075 | 43.0 | 50.5 | 0.0390 |
| 2.2 | 2.2 | 0.0075 | 42.1 | 46.9 | 0.0389 |
| 2.2 | 2.2 | 0.0075 | 37.2 | 45.9 | 0.0392 |
| 2.2 | 2.2 | 0.0075 | 57.7 | 53.5 | 0.0391 |

*% w/w content in the starting mixture

Example 12

A mixture was prepared as described in Example 7, except that 76% v/v of hydrophobic thermally insulating filler in the form of expanded synthetic perlite (USP) (having a density of 49.3 kg/m$^3$) was incorporated into the foamed mixture prior to freezing. The result is presented in Table 6. Water vapor sorption was defined according to ASTM C 1104/C 1104M.

TABLE 6

| MMT* | PVA* | Na polyacrylate* | Density (kg/m$^3$) | Water vapor sorption (% w/w) |
|---|---|---|---|---|
| 2.0 | 2.0 | 0.0075 | 52.88 | 72.64 |

*% w/w content in the starting mixture

Example 13

Mixtures were prepared as described in Example 7, except that 76% v/v of thermally insulating filler in the form of expanded synthetic perlite (USP) (having a density of 43 kg/m$^3$) was incorporated into the foamed mixture prior to freezing. Hydrophobic agents were added. The results are presented in the Table 7. Water vapor sorption was defined according to ASTM C 1104/C 1104M.

TABLE 7

| MMT* | PVA* | Na polyacrylate* | Hydrophobic agent* | Density (kg/m$^3$) | Water vapor sorption (% w/w) |
|---|---|---|---|---|---|
| 2 | 2 | 0.0075 | silicone oil: 0.3 | 50.5 | 66.5 |
| 2.1 | 2.1 | 0.0075 | silicone oil: 0.3 | 50.6 | 52.5 |
| 2.1 | 2.1 | 0.0075 | Ca Stearate: 2 | 47.7 | 85 |
| 2.1 | 2.1 | 0.0075 | Stearic acid: 2 | 52.1 | 66.7 |
| 2.1 | 2.1 | 0.0075 | Oleic acid: 0.3 | 57.7 | 98.8 |

*% w/w content in the starting mixture

Example 14

Mixtures were prepared as described in Example 7, except that 76% v/v of thermally insulating filler in the form of expanded synthetic perlite (USP) (having a density of 43 kg/m$^3$) was incorporated into the foamed mixture prior to freezing. Graphite of different granulometry (A and B) was also added to the mixture prior to freezing. The results are presented in Table 8.

TABLE 8

| MMT* | PVA* | Na polyacrylate* | Graphite A*† | Graphite B*‡ | Density (kg/m$^3$) | Thermal conductivity (W/mK) |
|---|---|---|---|---|---|---|
| 2.1 | 2.1 | 0.0075 | 0.036 | | 42.5 | 0.0375 |
| 2.1 | 2.1 | 0.0075 | 0.072 | | 43.6 | 0.0381 |
| 2.1 | 2.1 | 0.0075 | 0.216 | | 49.0 | 0.0384 |
| 2.1 | 2.1 | 0.0075 | | 0.036 | 44.4 | 0.0376 |

TABLE 8-continued

| MMT* | PVA* | Na polyacrylate* | Graphite A*† | Graphite B*‡ | Density ($kg/m^3$) | Thermal conductivity (W/mK) |
|---|---|---|---|---|---|---|
| 2.1 | 2.1 | 0.0075 | | 0.072 | 46.2 | 0.0379 |
| 2.1 | 2.1 | 0.0075 | | 0.216 | 46.9 | 0.0378 |

*% w/w content in the starting mixture

†natural graphite having a $d_{90}$ particle size of about 10 μm

‡natural graphite having a $d_{90}$ particle size of about 150 μm

The invention claimed is:

1. A method of manufacturing a thermally insulating product, the method comprising:

(a) forming a mixture comprising a solvent and a gel network former;

(b) dispersing a thermally insulating filler in the mixture; and (c) drying the mixture to form the thermally insulating product;

wherein the thermally insulating filler is an expanded silicate material having:

a loose bulk density, measured according to PI 200-77, of from about 15 to about 450 $kg/m^3$;

a compaction resistance, measured according to PI 306-80, of from about 3 PSI to about 350 PSI at 2"; and a thermal conductivity, measured according to EN 12667, of from about 0.0300 W/mK to about 0.0700 W/mK.

2. The method according to claim 1 further comprising shaping the mixture prior to drying.

3. The method according to claim 1, wherein the gel network former comprises:

(i) a binding agent;

(ii) a smectite clay mineral, bentonite, montmorillonite or hectorite; and (iii) one or more reinforcing agents.

4. The method according to claim 1, wherein the mixture of step (a) further comprises sodium dodecyl sulphate (SDS) or another surfactant.

5. The method according to claim 1, wherein:

the mixture of step (a) further comprises at least one additive selected from the group consisting of an anti-mould agent, an antibacterial agent, a fire retardant, a hydrophobic agent and a thermal conductivity regulating agent.

6. The method according to claim 1, wherein the expanded silicate material comprises:

from about 3 wt. % to about 30 wt. % of $X_2O$, X being an alkali metal;

from about 0 wt. % to about 20 wt. % of $Al_2O_3$;

from about 50 wt. % to about 90 wt. % of $SiO_2$;

from 0 wt. % to about 10 wt. % of $H_2O$; and from 0 wt % to about 5 wt. % of $B_2O_3$; and/or the expanded silicate material is manufactured by:

forming a silicate mixture comprising:

at least one silicate material;

an alkali compound; and water;

curing the silicate mixture to form a solid precursor;

crushing and/or milling the solid precursor to form a granular expandable silicate material; and heating the granular expandable silicate material to form an expanded silicate material.

7. The method according to claim 1, wherein the mixture of step (a) is a gel, and wherein the method further comprises aerating the gel.

8. The method according to claim 1, wherein drying the mixture to form the thermally insulating product comprises forming a foam, an aerogel, or another aerated matrix in which the thermally insulating filler is dispersed.

9. The method according to claim 1, wherein drying the mixture comprises:

(i) freeze-drying the mixture;

(ii) drying the mixture at ambient conditions;

(iii) drying the mixture at an elevated temperature of up to 25° C.; or (iv) drying the mixture at a temperature of from 25° C. to 60° C.

10. The method according to claim 1, wherein the solvent is water or an alcohol.

11. A thermally insulating product manufactured by the method according to claim 1.

12. The method according to claim 1 wherein the mixture of step (a) further comprises propionic acid, aluminum hydroxide, silicone oil, stearic acid, and/or graphite.

13. A method of manufacturing a thermally insulating product, the method comprising:

(a) forming a mixture comprising a solvent and a gel network former;

(b) dispersing a thermally insulating filler in the mixture; and (c) drying the mixture to form the thermally insulating product, wherein the thermally insulating filler is an expanded natural perlite having:

a loose bulk density, measured according to PI 200-77, of from about 30 to about 60 $kg/m^3$;

a compaction resistance, measured according to PI 306-80, of from about 5 PSI to about 20 PSI at 2"; and a thermal conductivity, measured according to EN 12667, of from about 0.055 W/mK to about 0.070 W/mK.

14. The method according to claim 13, wherein the expanded natural perlite comprises:

from about 3.5 wt. % to about 22 wt. % of $X_2O$, X being an alkali metal;

from about 5 wt. % to about 15 wt. % of $Al_2O_3$; and from about 60 wt. % to about 80 wt. % of $SiO_2$; and optionally from 0.5 wt. % to about 5 wt. % of $H_2O$; and from 0 wt % to about 3.5 wt. %, of $B_2O_3$.

15. The method according to claim 14, wherein the gel network former comprises:

(i) a binding agent;

(ii) a smectite clay mineral, bentonite, montmorillonite or hectorite; and (iii) one or more reinforcing agents.

* * * * *